US012613438B2

(12) United States Patent
Teraoka et al.

(10) Patent No.: US 12,613,438 B2
(45) Date of Patent: Apr. 28, 2026

(54) VIDEO DISPLAY DEVICE

(71) Applicant: Sharp Display Technology Corporation, Kameyama City (JP)

(72) Inventors: Yuko Teraoka, Kameyama City (JP); Takehisa Yoshida, Kameyama City (JP); Fumikazu Shimoshikiryoh, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 103 days.

(21) Appl. No.: 18/667,156

(22) Filed: May 17, 2024

(65) Prior Publication Data

US 2024/0427179 A1 Dec. 26, 2024

(30) Foreign Application Priority Data

Jun. 21, 2023 (JP) ................................. 2023-101787

(51) Int. Cl.
| | |
|---|---|
| *G02F 1/13* | (2006.01) |
| *G02F 1/1333* | (2006.01) |
| *G02F 1/1335* | (2006.01) |
| *G02F 1/1343* | (2006.01) |
| *G02F 1/137* | (2006.01) |

(52) U.S. Cl.
CPC ...... *G02F 1/1323* (2013.01); *G02F 1/133345* (2013.01); *G02F 1/133528* (2013.01); *G02F 1/133601* (2021.01); *G02F 1/134309* (2013.01); *G02F 1/13725* (2013.01)

(58) Field of Classification Search
CPC ............. G02F 1/1323; G02F 1/133345; G02F 1/133528; G02F 1/133601; G02F 1/134309; G02F 1/13725; G02F 1/133531
See application file for complete search history.

(56) References Cited

U.S. PATENT DOCUMENTS

| | | |
|---|---|---|
| 2005/0174529 A1 | 8/2005 | Fukushima et al. |
| 2019/0162991 A1* | 5/2019 | Hagiwara ............. G02F 1/1333 |
| 2020/0064666 A1 | 2/2020 | Xin |
| 2021/0018778 A1* | 1/2021 | Matsushima ..... G02F 1/133528 |
| 2023/0015664 A1* | 1/2023 | Matsushima .......... B60K 35/81 |

FOREIGN PATENT DOCUMENTS

| | | |
|---|---|---|
| JP | 2005-221756 A | 8/2005 |
| JP | 2007-206373 A | 8/2007 |
| WO | 2008/047754 A | 4/2008 |

* cited by examiner

*Primary Examiner* — Mariam Qureshi
(74) *Attorney, Agent, or Firm* — ScienBiziP, P.C.

(57) ABSTRACT

Provided are a liquid crystal panel capable of controlling the viewing angle with less increase in thickness and a video display device including the liquid crystal panel. The video display device includes: a display panel displaying an image; and a liquid crystal panel. The display panel includes at least a polarizer. The polarizer in the display panel is opposite to the liquid crystal panel on the display panel side of the liquid crystal panel. The liquid crystal panel includes, between a pair of transparent substrates, electrodes A arranged at intervals in plan view, a liquid crystal layer, and an electrode B opposite to the electrodes A with the liquid crystal layer interposed therebetween, and includes a voltage application unit which applies voltage between the electrodes A and the electrode B.

19 Claims, 43 Drawing Sheets

232     232     232     240

241    242    241    242    241

(i)

(ii)

(Observation surface side)

(Back surface side)

FIG.4A (Observation surface side)

(Back surface side)

(Observation surface side)

(Back surface side)

232    232    232    232

232    232    232    232

232      232      232      240 c   a   c   b   c   a   c   b   c   a   c

2401

(Back surface side)

(Back surface side)

(Observation surface side)

(Back surface side)

FIG.18A (Back surface side)

(Observation surface side)

(Back surface side)

(Observation surface side)

(Back surface side)

VIDEO DISPLAY DEVICE

CROSS-REFERENCE TO RELATED APPLICATIONS

The present application claims priority under 35 U.S.C. § 119 to Japanese Patent Application No. 2023-101787 filed on Jun. 21, 2023, the contents of which are incorporated herein by reference in their entirety.

BACKGROUND OF THE INVENTION

Field of the Invention

The following disclosure is related to a video display device.

Description of Related Art

A liquid crystal panel which is a main part of a video display device is generally configured so that a liquid crystal layer is sealed between a pair of substrates, and controls the light transmission amount by applying a voltage to the liquid crystal layer to change the alignment state of liquid crystal molecules according to the applied voltage. Such a liquid crystal panel is widely used in various applications taking advantage of the features, such as thinness, lightness in weight, and low power consumption.

In recent years, the enhancement of viewing angle characteristics has been examined in a video display device so that images can be observed at similar levels in either a case where the images are observed in a narrow viewing angle range or a case where the images are observed in a wide viewing angle range. From the viewpoint of maintaining privacy, a display method has been examined which allows the images to be observed in a narrow viewing angle range, but makes the images difficult to observe in a wide viewing angle range. Thus, a display device has been demanded which can be switched between a public mode (also referred to as a wide viewing angle mode) and a privacy mode (also referred to as a narrow viewing angle mode), wherein the public mode allows images to be observed both in the narrow viewing angle range and the wide viewing angle range and the privacy mode allows images to be observed in the narrow viewing angle range and but makes images difficult to be observed in the wide viewing angle range.

With regard to a technology of switching between the viewing angle modes, JP 2007-206373 A, for example, discloses a display device including a liquid crystal display element, a light source, and an optical element disposed therebetween, and describes, as an example, a form in which the optical element has, between a pair of transparent substrates, first regions containing a light-transmitting material and second regions arranged between the first regions and containing a composite material selectively switched between a light-transmitting state and a light scattering or absorption state, and the composite material contains a material obtained by adding a dichroic black dye to a polymer-dispersed liquid crystal. JP 2005-221756 A discloses a video display device in which a viewing angle control element is arranged on the front surface, for example, of the video display device, and describes, as an example, a form in which the viewing angle control element includes a first region and a second region opposite to one pixel, the first region which has first transmittance and the second region in which the transmittance can be switched between a second transmittance and a third transmittance smaller than the first transmittance and the second transmittance, and the second region (light-shielding region) is formed of a guest-host liquid crystal containing a dichroic dye.

WO 2008/047754 discloses a display including a viewing angle control device including a liquid crystal layer to which a dichroic dye is added and a drive circuit that enables switching the display state by changing the alignment state of liquid crystal molecules of the liquid crystal layer, and a display device having a polarizer on the device side. US 2020/0064666 A discloses a display panel including a first display, a second display including a liquid crystal layer interposed between a pair of electrodes, and a polarizer interposed therebetween, in which the liquid crystal layer possessed by the second display is a guest-host liquid crystal cell containing liquid crystal molecules as a host and dye molecules as a guest, and the major axis direction of the liquid crystal molecule and the major axis direction of the dye molecule are parallel to each other.

BRIEF SUMMARY OF THE INVENTION

FIG. 27 is a schematic cross-sectional view of a video display device 1R found by the applicant. As illustrated in FIG. 27, the video display device 1R includes a liquid crystal panel 20R, a display panel 10R, and a backlight 40 in order from the observation surface side to the back surface side. Between the display panel 10R and the liquid crystal panel 20R, an adhesive layer 150 for attaching the display panel 10R and the liquid crystal panel 20R together is provided. The liquid crystal panel 20R includes a first transparent substrate 210, a first electrode 231, a liquid crystal layer 240 containing a guest-host liquid crystal obtained by adding a dichroic dye (guest) to a liquid crystal material (host), second electrodes 232, an interlayer insulating film 250, a third electrode 233, and a second transparent substrate 220 in order from the observation surface side. The display panel 10R includes a polarizer 141, a color filter (CF) substrate 110 including a CF layer, a liquid crystal layer 130, a thin film transistor (TFT) substrate 120 including TFTs, and a polarizer 142 in order from the observation surface side.

The liquid crystal layer 240 possessed by the liquid crystal panel 20R has overlapping regions 241 overlapping the second electrodes 232 and non-overlapping regions 242 not overlapping the second electrodes 232. The liquid crystal layer 240 has the features of being the guest-host (GH) liquid crystal layer containing a dichroic dye and having the overlapping regions 241 and the non-overlapping regions 242, so that the liquid crystal layer 240 has transparent regions and switching regions switched between a transmission state and an absorption state. Such a video display device 1R has a function of controlling the viewing angle by applying or not applying a voltage to the liquid crystal layer 240, and, in addition to this function, also has a louver function in which the liquid crystal layer 240 itself functions as a louver. Therefore, the video display device 1R is extremely useful in the field of display devices.

However, the inventors of this application have further examined the video display device 1R, and have found that the louver function cannot be sufficiently obtained depending on the polarization direction of light incident on the liquid crystal panel 20R from the back surface side in some cases. The inventors of this application have found that, even when the video display device 1R includes the display panel 10R, the liquid crystal panel 20R, and the backlight 40 in order from the observation surface side to the back surface side, the louver function cannot be sufficiently obtained in some cases. Thus, the inventors of this application have found that the video display device 1R, which is extremely useful, has still room for improvement to more effectively control the viewing angle.

The inventors of this application have conducted a more detailed examination, and have found that the cause thereof is that light orthogonal to the alignment direction of the liquid crystal molecules in the liquid crystal layer 240 (GH liquid crystal layer) out of the light incident on the liquid crystal layer 240 is transmitted without being absorbed. In this case, it is considered that the liquid crystal layer 240 still has problems with the absorption function due to the switching regions and the transmission function due to the transparent regions. Specifically, it is considered that, in a state where a voltage is applied between the first electrode 231 and the second electrodes 232 (262) and a voltage is not applied between the first electrode 231 and the third electrode 233 (261) (state where a voltage is applied), for example, the switching regions are not switched to the absorption state, so that omnidirectional light is transmitted (see FIG. 28A), or the transparent regions also enter the absorption state, so that omnidirectional light is blocked (see FIG. 28B). FIGS. 28A and 28B are views with which problems that can occur in the video display device 1R found by the applicant of this application were examined.

JP 2007-206373 A does not describe anything about having examined the polarization direction of light incident on the optical element. Further, in the optical element described in JP 2007-206373 A, the first region in the transmission state and the second region in which the transmission state and the scattering or absorption state are selectively switched are physically distinguished by differentiating materials used for these regions. The optical element described in JP 2007-206373 A has had various problems in putting it into practical use, such as difficulty in narrowing the viewing angle in common liquid crystal processes and complexity of the manufacturing process.

In the viewing angle control element described in JP 2005-221756 A, the first region having the first transmittance and the second region in which the transmittance can be switched are physically distinguished by differentiating materials used for these regions. The viewing angle control element described in JP 2005-221756 A is extremely useful in the field of display devices because the element can prevent deterioration of the image quality due to a reduction in luminance of the video display device at a wide viewing angle while achieving both a wide viewing angle and a narrow viewing angle. However, the element has had room for contrivance to more effectively achieve the viewing angle control.

The display described in WO 2008/047754 is also extremely useful in the field of display devices because the device is applicable to various usage environments or applications by switching the display state between a wide viewing angle and a narrow viewing angle. However, the device has had room for contrivance to further reduce a light transmission loss in order to further enhance the display luminance. The display panel described in US 2020/0064666 A has been concerned about deterioration of the image quality due to a reduction in luminance at a wide viewing angle, and also has had room for contrivance to facilitate the viewing angle control.

The present invention has been made in view of the above-described circumstances, and aims to provide a liquid crystal panel capable of controlling the viewing angle with less or no increase in thickness and a video display device including the liquid crystal panel.

(1) In one embodiment of the present invention, a video display device includes: a display panel configured to display an image; and a liquid crystal panel, the display panel including at least a polarizer, the polarizer provided in the display panel being arranged opposite to the liquid crystal panel on a display panel side of the liquid crystal panel, the liquid crystal panel including, between a pair of transparent substrates, electrodes A arranged at intervals in plan view, a liquid crystal layer, and an electrode B arranged opposite to the electrodes A with the liquid crystal layer between the electrodes A and the electrode B, and including a voltage application unit configured to apply a voltage between the electrodes A and the electrode B, the liquid crystal layer being a guest-host liquid crystal layer containing a dichroic dye and liquid crystal molecules, and including overlapping regions overlapping the electrodes A and non-overlapping regions not overlapping the electrodes A, a transmission axis of the polarizer being substantially vertical to an initial alignment direction of the liquid crystal molecules in plan view.

(2) In an embodiment of the present invention, the video display device includes the structure (1) above, and the liquid crystal layer includes a transparent region and a switching region switchable between a transmission state and an absorption state.

(3) In an embodiment of the present invention, the video display device includes the structure (2) above, and the transparent regions and the switching regions are formed of the same material.

(4) In an embodiment of the present invention, the video display device includes the structure (1), (2), or (3) above, and the electrodes A are arranged in a stripe shape in plan view.

(5) In an embodiment of the present invention, the video display device includes the structure (1), (2), (3), or (4) above, the liquid crystal panel includes a first transparent substrate, a first electrode, the liquid crystal layer, a second electrode, an interlayer insulating film, a third electrode, and a second transparent substrate in the stated order, the second electrode corresponds to the electrodes A, the first electrode corresponds the electrode B, and the liquid crystal panel further includes a voltage application unit configured to apply a voltage between the first electrode and the third electrode.

(6) In an embodiment of the present invention, the video display device includes the structure (1), (2), (3), or (4) above, the liquid crystal panel includes a first transparent substrate, a first electrode, a first interlayer insulating film, a second electrode, the liquid crystal layer, a third electrode, a second interlayer insulating film, a fourth electrode, and a second transparent substrate in the stated order, one of the second electrode and the third electrode corresponds to the electrodes A and the other of the second electrode and the third electrode corresponds to the electrode B, the voltage application unit is a unit configured to apply a voltage between the second electrode and the third electrode, and the liquid crystal panel further includes a voltage application unit configured to apply a voltage between the first electrode and the fourth electrode.

(7) In an embodiment of the present invention, the video display device includes the structure (1), (2), (3), or (4) above, the liquid crystal panel includes a first transparent substrate, a first electrode, a first interlayer insulating film, a second electrode, the liquid crystal layer, a third electrode, a second interlayer insulating film, a fourth electrode, and a second transparent substrate in the stated order, at least one of the second electrode or the third electrode corresponds to the electrodes A, at least one of the first electrode or the fourth electrode corresponds to the electrode B, and the voltage application unit includes a first voltage application unit configured to apply a voltage between the second electrode and the fourth electrode and a second voltage application unit configured to apply a voltage between the first electrode and the third electrode.

(8) In an embodiment of the present invention, the video display device includes the structure (1), (2), (3), (4), (5), (6), or (7) above, and the non-overlapping regions have a thickness of 30 μm or less.

(9) In an embodiment of the present invention, the video display device includes the structure (1), (2), (3), (4), (5), (6), (7), or (8) above, and the electrodes A and the electrode B are transparent electrodes.

(10) In an embodiment of the present invention, the video display device includes the structure (5), (8), or (9) above, and the first electrode, the second electrode, and the third electrode are transparent electrodes.

(11) In an embodiment of the present invention, the video display device includes the structure (6), (7), (8), or (9) above, and the first electrode, the second electrode, the third electrode, and the fourth electrodes are transparent electrodes.

(12) In an embodiment of the present invention, the video display device includes the structure (1), (2), (3), (4), (5), (6), (7), (8), (9), (10), or (11) above, and further includes a backlight.

(13) In an embodiment of the present invention, the video display device includes the structure (12) above, and the backlight has a local dimming function.

(14) In an embodiment of the present invention, the video display device includes the structure (1), (2), (3), (4), (5), (6), (7), (8), (9), (10), (11), (12), or (13) above, and the display panel is a liquid crystal display panel or a self-luminous display panel.

The present invention can provide a liquid crystal panel capable of controlling the viewing angle with less or no increase in thickness and a video display device including the liquid crystal panel.

BRIEF DESCRIPTION OF THE DRAWINGS

FIG. 4A is a schematic cross-sectional view illustrating a narrow viewing angle mode of the video display device of Embodiment 1.

FIG. 18A is a schematic cross-sectional view illustrating the narrow viewing angle mode of the video display device of Embodiment 6.

DETAILED DESCRIPTION OF THE INVENTION

Definition of Terms

In this specification, an observation surface side means a side closer to a screen (display surface) of a video display device, and a back surface side means a side farther from the screen (display surface) of the video display device.

A polar angle means an angle formed between a target direction (e.g., measurement direction) and the normal direction of the panel surface of a liquid crystal panel. An azimuth ($\varphi$) means a direction when the target direction is projected on the screen of the liquid crystal panel, and is expressed by an angle (azimuthal angle) formed between the target direction and the azimuth serving as the reference.

Herein, the direction serving as the reference ($\varphi=0°$) is set to the horizontal right direction of the screen of the liquid crystal panel. For the angle and the azimuthal angle, an angle counterclockwise from the azimuth serving as the reference is a positive angle, an angle clockwise from the azimuth serving as the reference is a negative angle. Both the counterclockwise direction and the clockwise direction indicate the rotation directions when the screen of the liquid crystal panel is viewed from the observation surface side (front). The angle indicates a value measured in a state where the screen of the liquid crystal panel is viewed in plan view.

A state where no voltage is applied means a state where a voltage applied to the liquid crystal layer is less than the threshold voltage (including no voltage application). A state where a voltage is applied means a state where a voltage applied to the liquid crystal layer is equal to or more than the threshold voltage. In this specification, the state where no voltage is applied is also referred to as "when no voltage is applied", and the state where a voltage is applied is also referred to as "when a voltage is applied".

The initial alignment direction of liquid crystal molecules means the major axis direction of the liquid crystal molecules when no voltage is applied.

Hereinafter, video display devices according to embodiments of the present invention are described. The present invention is not limited to the description given in the embodiments described below, and can be subject to changes in design as appropriate insofar as the configurations of the present invention are satisfied.

Embodiment 1

Figure 1:
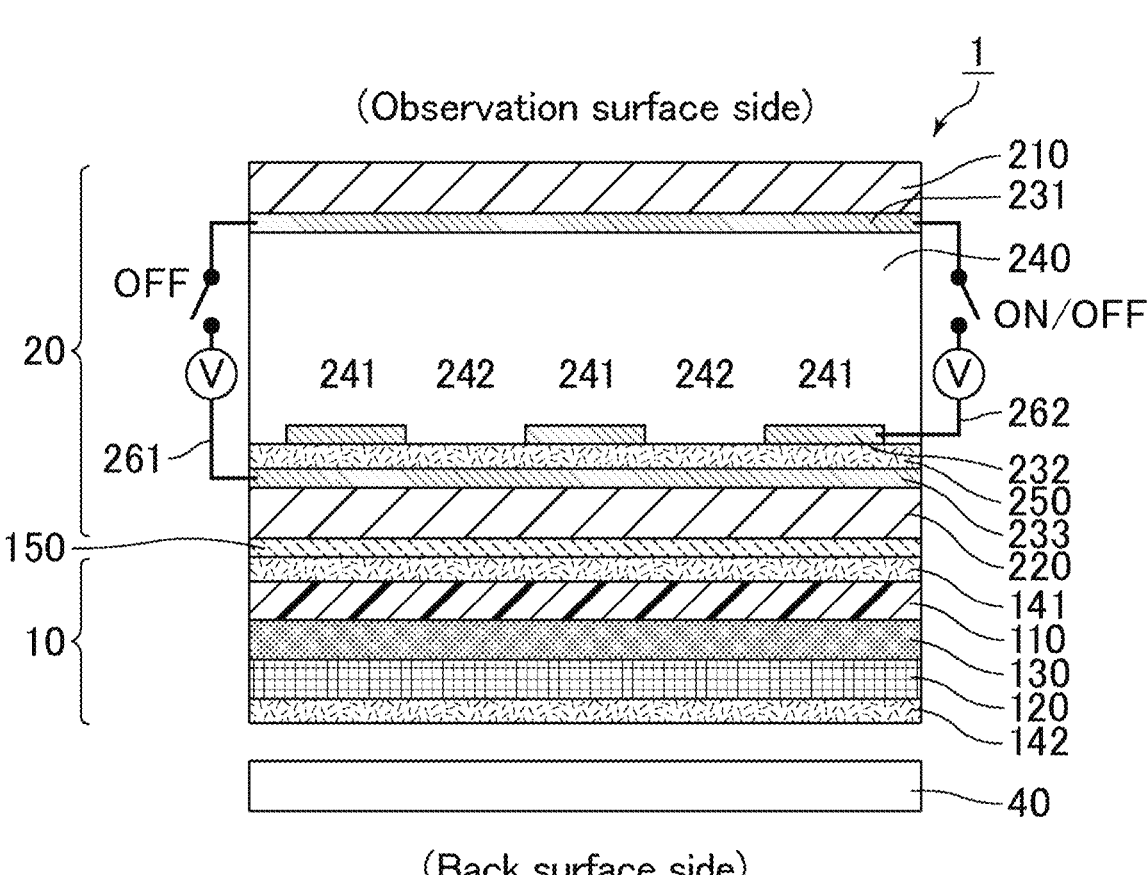
FIG. 1 is a schematic cross-sectional view of a video display device of Embodiment 1.
Figure 2A:
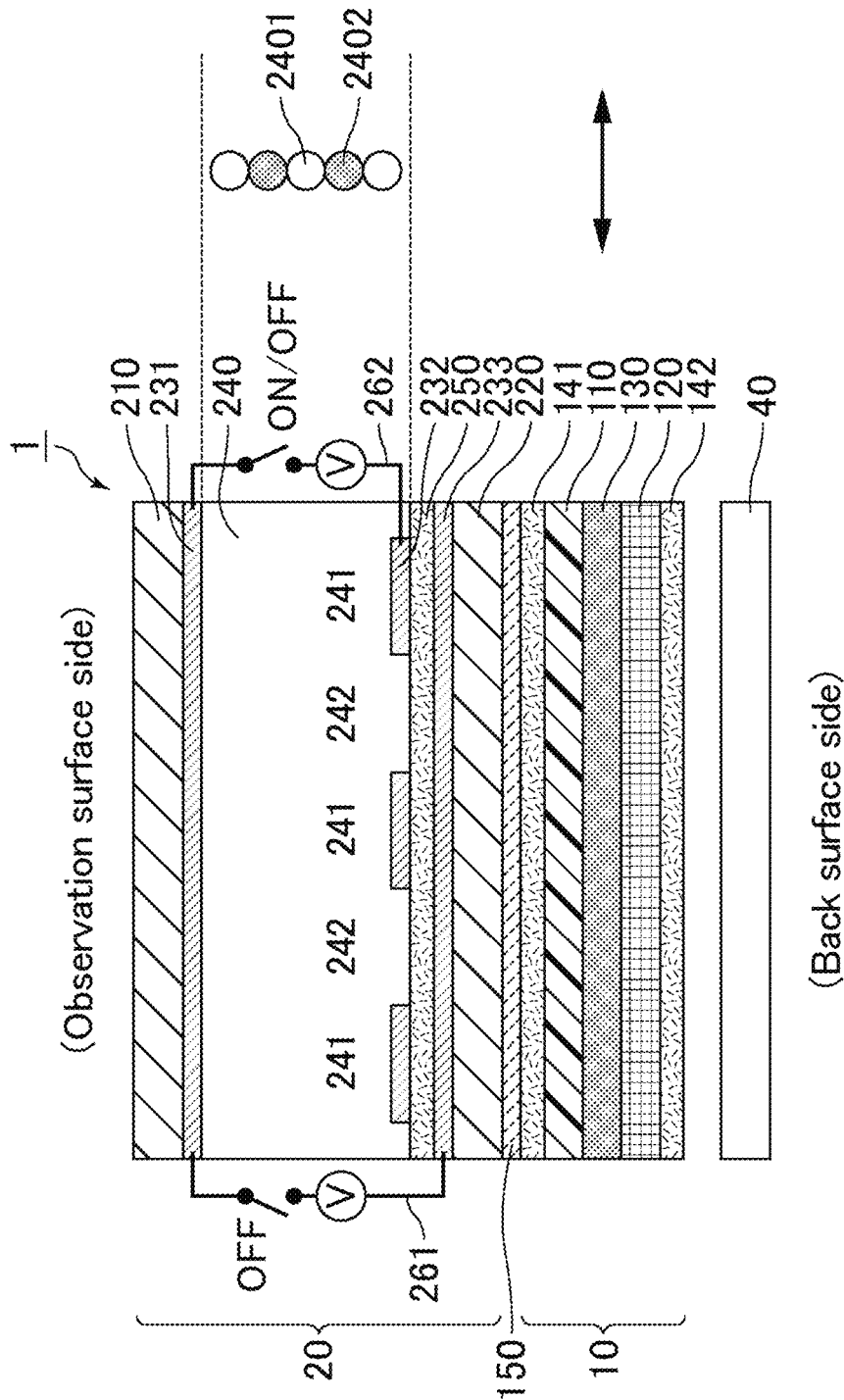
FIG. 2A is a schematic cross-sectional view of the video display device of Embodiment 1.
Figure 3A:
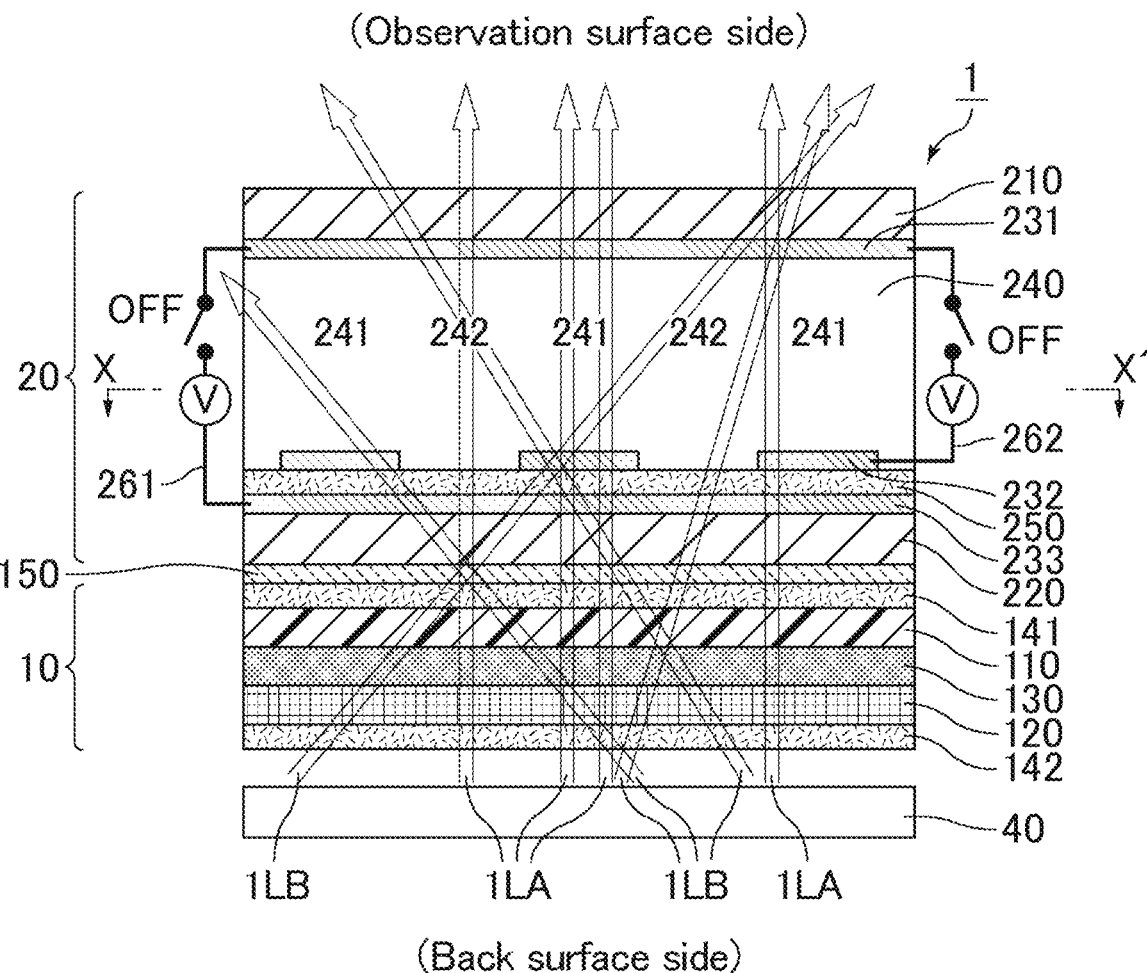
FIG. 3A is a schematic cross-sectional view illustrating a wide viewing angle mode of the video display device of Embodiment 1.
Figure 4A:
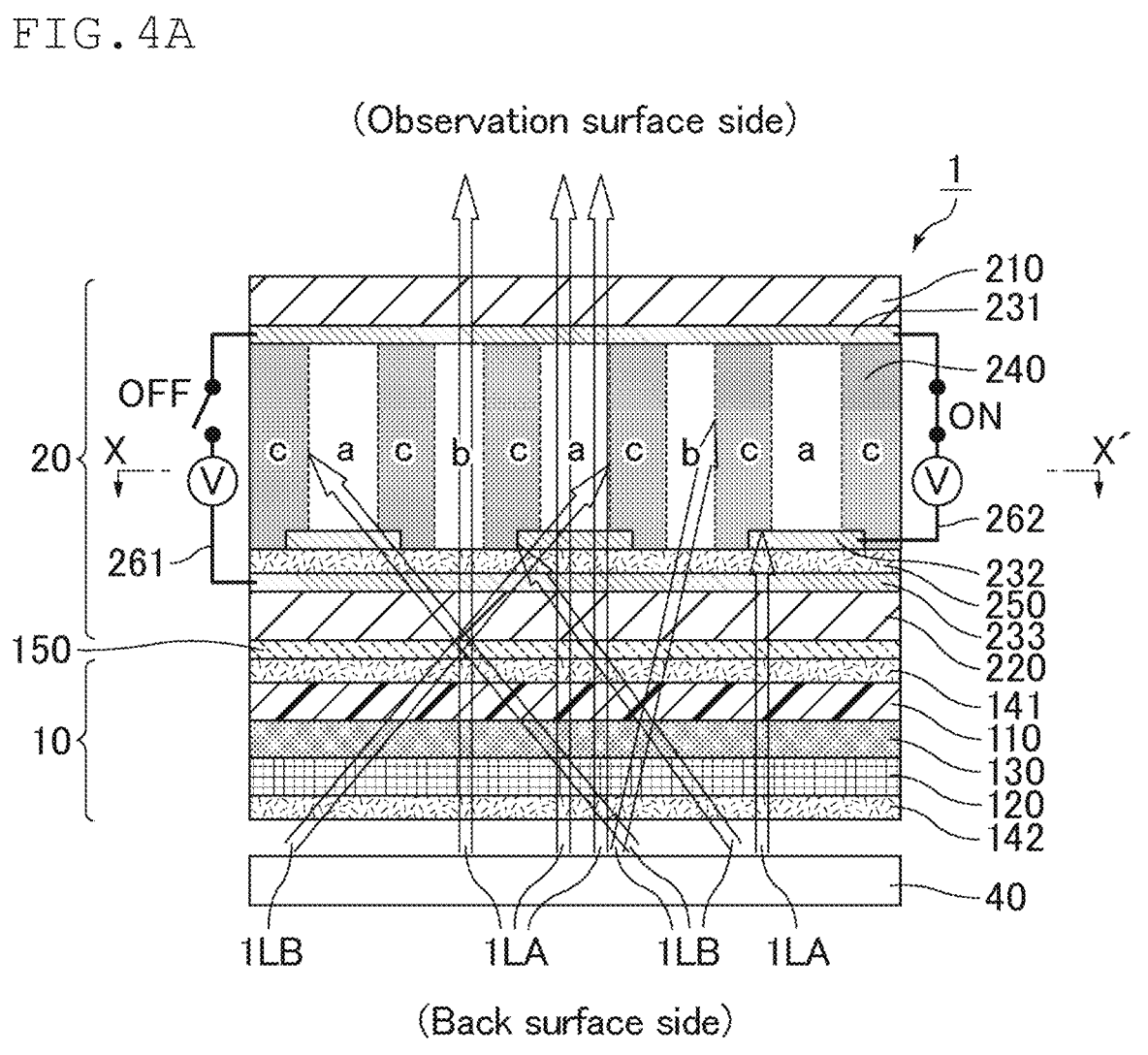

FIGS. 1 and 2A are schematic cross-sectional views of a video display device of this embodiment. FIG. 3A is a schematic cross-sectional view illustrating a wide viewing angle mode of the video display device of this embodiment. FIG. 4A is a schematic cross-sectional view illustrating a narrow viewing angle mode of the video display device of this embodiment.

A video display device 1 of this embodiment includes a liquid crystal panel 20, a display panel 10 displaying an image, and a backlight 40 in order from the observation surface side to the back surface side as illustrated in FIGS. 1, 2A, 3A, and 4A. This embodiment can achieve a video display device capable of displaying an image of the display panel 10 using light from the backlight 40 and capable of controlling the viewing angle with less increase in thickness. Between the display panel 10 and the liquid crystal panel 20, an adhesive layer 150 for attaching the display panel 10 and the liquid crystal panel 20 together is usually provided.

<Liquid Crystal Panel>

The liquid crystal panel 20 includes a first transparent substrate 210, a first electrode 231, a liquid crystal layer 240, second electrodes 232, an interlayer insulating film 250, a third electrode 233, and a second transparent substrate 220 in order from the observation surface side to the back surface side as illustrated in FIG. 1. The second electrodes 232 are arranged at intervals in plan view, and the second electrodes 232 and the first electrode 231 are arranged opposite to each other with the liquid crystal layer 240 interposed therebetween. The liquid crystal panel 20 further includes a first voltage application unit 262 which applies a voltage between the first electrode 231 and the second electrodes 232 and a second voltage application unit 261 which applies a voltage between the first electrode 231 and the third electrode 233. On the display panel side (back surface side in this embodiment) of the liquid crystal panel 20, a polarizer 141 provided in the display panel 10 is arranged opposite to the liquid crystal panel 20. The liquid crystal panel 20 has a function of controlling the viewing angle, and therefore can be referred to as a "viewing angle control cell".

The first transparent substrate 210 and the second transparent substrate 220 may be substrates transparent to visible light. Examples of the substrate include glass substrates, plastic substrates, and the like.

The first electrode 231 is arranged in a planar manner over the entire surface of the first transparent substrate 210. More specifically, the first electrode 231 is a solid electrode covering the first transparent substrate 210. This allows the entire liquid crystal panel to be switched between the wide viewing angle mode and the narrow viewing angle mode. The first electrode 231 may be a transparent electrode. The transparent electrode can be formed of a transparent conductive material such as indium tin oxide (ITO), indium zinc oxide (IZO), zinc oxide (ZnO), or tin oxide (SnO), or an alloy thereof, for example.

The second electrodes 232 are arranged at intervals in plan view. In this specification, the electrodes A mean electrodes arranged at intervals in plan view, and the electrode B means an electrode arranged opposite to the electrode A with the liquid crystal layer 240 interposed therebetween. In this embodiment, the second electrodes 232 correspond to the electrodes A, and the first electrode 231 corresponds to the electrode B. The second electrodes 232 are arranged at intervals in plan view, so that the liquid crystal layer 240 has overlapping regions 241 overlapping the second electrodes 232 and non-overlapping regions 242 not overlapping the second electrodes 232.

Figure 2B:
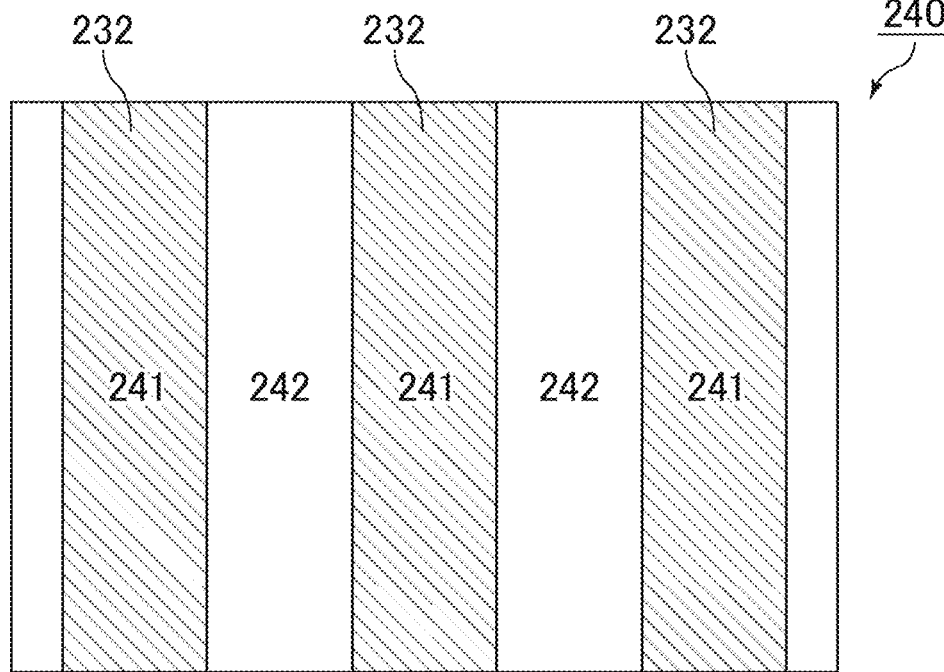
FIG. 2B is a schematic plan view illustrating the arrangement form of second electrodes 232 in a liquid crystal layer 240 possessed by a liquid crystal panel 20 of Embodiment 1.
Figure 5A:
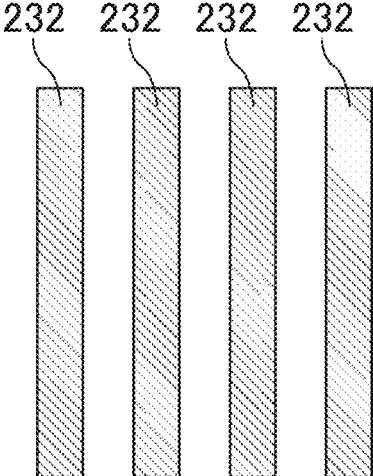
FIG. 5A is a schematic plan view illustrating a specific example of a stripe shape.
Figure 5B:
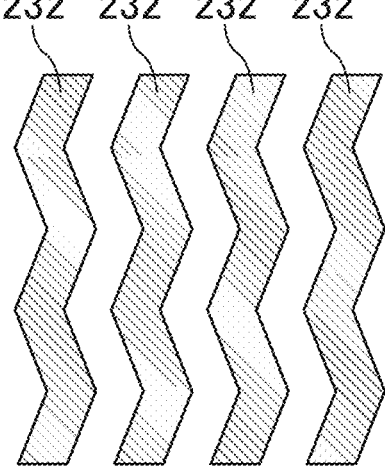
FIG. 5B is a schematic plan view illustrating a specific example of the stripe shape.

In this embodiment, the electrodes A (second electrodes 232 in this embodiment) are arranged in a stripe shape (also referred to as a slit shape) in plan view as illustrated in FIG. 2B. FIG. 2B is a schematic plan view illustrating the arrangement form of the second electrodes 232 (electrodes A) in the liquid crystal layer 240 possessed by the liquid crystal panel 20 of this embodiment. Examples of the stripe shape include a straight shape illustrated in FIG. 5A and a doglegged shape illustrated in FIG. 5B. FIGS. 5A and 5B are schematic plan views each illustrating a specific example of the stripe shape. The arrangement of the electrodes A in a stripe shape in plan view as described above can secure sufficient switching regions that can be switched between a transmission state and an absorption state, and therefore the viewing angle in the right-and-left direction of the screen can be effectively controlled. When the electrodes A are arranged in a grid shape in plan view, for example, the switching regions decrease, and the effect of switching between the transmission state and the absorption state cannot be sufficiently obtained.

Herein, the "overlapping the electrodes A" means directly or indirectly contacting the electrodes A. Examples of an aspect of indirectly contacting the electrodes A include an aspect in which the overlapping regions 241 and the electrodes A contact each other via an alignment film. The alignment film is a film having a function of controlling the alignment of liquid crystal molecules contained in the liquid crystal layer 240. The non-overlapping regions 242 mean regions not overlapping the electrodes A of the liquid crystal layer 240.

The width of the electrodes A can be appropriately set considering the desired switching effect or the desired viewing angle. For example, a ratio (W1/W2) between a width W1 of the non-overlapping regions 242 not overlapping the electrode A and a width W2 of the overlapping regions 241 overlapping the electrode A may be 100/1 to 100/500 or may be 100/50 to 100/300.

A thickness D of the non-overlapping regions 242 is preferably 100 μm or less, for example. The thickness is more preferably 50 μm or less, still more preferably 30 μm or less, particularly preferably 20 μm or less, most preferably 10 μm or less. Thus, the liquid crystal panel of this embodiment is applicable to common liquid crystal processes (generally within 10 μm), and has excellent viewing angle performance. The lower limit of the thickness is not limited, and is preferably 1 μm or more, for example.

Figure 6:
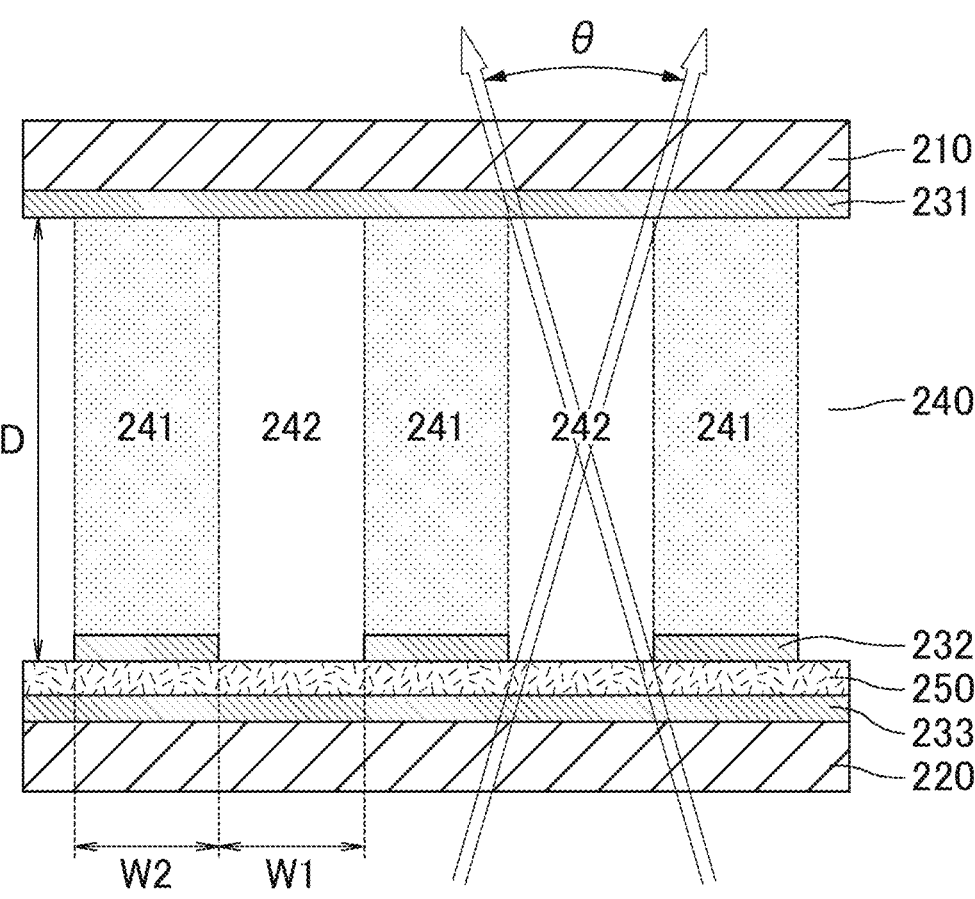
FIG. 6 is a conceptual view for explaining a thickness D of a non-overlapping region, a width W1 of a non-overlapping region, a width W2 of an overlapping region, and a viewing angle θ.

The thickness of the non-overlapping regions 242 is also referred to as the height of the non-overlapping regions 242. The thickness of the non-overlapping regions 242 corresponds to a distance D between the first electrode 231 and the interlayer insulating film 250 in FIG. 6. FIG. 6 is a conceptual diagram for explaining the thickness D of the non-overlapping region, the width W1 of the non-overlapping region, the width W2 of the overlapping region, and the viewing angle θ.

The pitch between the non-overlapping regions 242 is preferably smaller than the pixel pitch of the display panel 10. This can sufficiently suppress the occurrence of a moire. In particular, the pixel pitch of the display panel 10 is suitably an integral multiple of the pitch between the non-overlapping regions 242. The pixel pitch is more preferably 1 to 50 times, still more preferably 6 to 24 times the pitch between the non-overlapping region.

The viewing angle θ of the liquid crystal panel 20 in the narrow viewing angle mode can be optionally set by the thickness D and the width W1 of the non-overlapping regions 242. Specifically, the viewing angle θ can be set by Equation (2) below:

$$\theta = 2 \tan^{-1}(W1/D) \tag{2}$$

For the second electrodes 232, a transparent electrode is used in this embodiment. Examples of the transparent electrode are as described above.

The third electrode 233 is arranged in a planar manner over the entire surface of the second transparent substrate 220 in this embodiment. More specifically, the third electrode 233 is a solid electrode covering the second transparent substrate 220. The third electrode 233 may be a transparent electrode. Examples of the transparent electrode are as described above.

The liquid crystal layer 240 is a guest-host liquid crystal layer (also referred to as a GH liquid crystal layer) including dichroic dye (guest) 2402 and liquid crystal (host) molecules 2401. The proportion of the dichroic dye 2402 is preferably 0.5 to 15% by mass based on the total amount (100% by mass) of the liquid crystal layer 240. The proportion is more preferably 1 to 10% by mass, still more preferably 2 to 5%. The color of the dichroic dye 2402 is not limited, and may be a black color or a red color, or may be adjusted to be a black color by combining two or more types of dyes with different colors. The dichroic dye 2402 are aligned in the same direction as that of the liquid crystal molecules 2401. More specifically, the dichroic dye 2402 can absorb light vibrating in the same direction as that of the liquid crystal molecules 2401.

In this embodiment, as the liquid crystal molecules (also referred to as liquid crystal components) 2401, liquid crystal molecules in which a dielectric anisotropy ($\Delta\varepsilon$) has a positive value are used, the dielectric anisotropy ($\Delta\varepsilon$) being defined by Equation L below:

$\Delta\varepsilon$=(Dielectric constant in major axis direction of liquid crystal molecules)−(Dielectric constant in short axis direction of liquid crystal molecules) (L). However, liquid crystal molecules in which a dielectric anisotropy ($\Delta\varepsilon$) has a negative value may be acceptable (see Embodiment 2 below). The liquid crystal molecules having a positive dielectric anisotropy are aligned in a direction parallel to the electric field direction. The liquid crystal molecules having a negative dielectric anisotropy are aligned in a direction vertical to the electric field direction. The liquid crystal molecules having a positive dielectric anisotropy are also referred to as positive liquid crystals (or positive liquid crystal molecules). The liquid crystal molecules having a negative dielectric anisotropy are also referred to as negative liquid crystals (or negative liquid crystal molecules).

The initial alignment direction of the liquid crystal molecules 2401 is directed in a substantially vertical direction to the transmission axis of a polarizer (polarizer 141 in this embodiment) arranged on the liquid crystal panel 20 side opposite to the liquid crystal panel 20 among polarizers possessed by the display panel 10 in plan view. More specifically, the transmission axis (also referred to as a polarization transmission axis) of the polarizer 141 possessed by the display panel 10 is directed substantially vertical to the initial alignment direction of the liquid crystal molecules 2401 contained in the liquid crystal layer 240 possessed by the liquid crystal panel 20 in plan view. Specifically, when the polarizer 141 has a shape having a rectangular plane surface and having a thickness, and the direction of one side of the plane surface of the polarizer 141 is set as the x-axis direction and the other side thereof is set as the y-axis direction, and the thickness direction is set as the z-axis direction, for example, one of the following forms is suitable: (1) a form in which the transmission axis of the polarizer 141 is directed along the x-axis direction and the initial alignment direction of the liquid crystal molecules 2401 is directed along the y-axis direction; or (2) a form in which the transmission axis of the polarizer 141 is directed along the y-axis direction and the initial alignment direction of the liquid crystal molecules 2401 is directed along the x-axis direction.

In this specification, the "substantially vertical (also referred to as substantially orthogonal)" and the "substantially vertical arrangement (also referred to as substantially orthogonal arrangement)" with respect to the arrangement angle formed between the initial alignment direction of liquid crystal molecules and the transmission axis direction of a polarizer means forming an angle (absolute value) in the range of 90°±10°. This angle is preferably in the range of 90°±5°, more preferably in the range of 90°±3°, still more preferably in the range of 90°±1°, particularly preferably 90° (completely vertical).

Figure 2C:
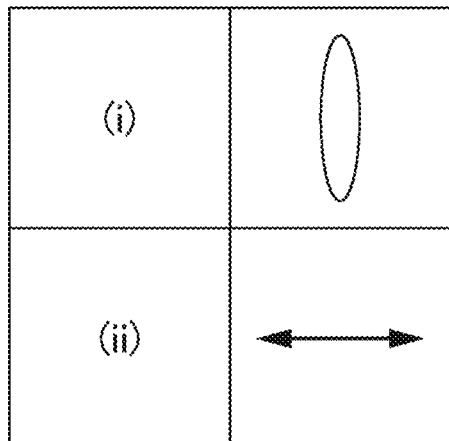
FIG. 2C is a view (schematic plan view) in which the alignment (i) of liquid crystal molecules 2401 in the liquid crystal layer 240 when no voltage is applied and the transmission axis direction (ii) of a polarizer 141 possessed by the display panel 10 are viewed from directly above (observation surface side) according to Embodiments 1 and 3 to 9.

In this embodiment, both the alignment of the liquid crystal molecules 2401 and the dichroic dye 2402 in the liquid crystal layer 240 when no voltage is applied (wide viewing angle mode) and the transmission axis direction (indicated by the arrow) of the polarizer 141 possessed by the display panel 10 are indicated on the right side of FIG. 2A (front view). A view (plan view) in which the alignment of the liquid crystal molecules 2401 in the liquid crystal layer 240 when no voltage is applied is viewed from directly above (observation surface side) is illustrated in a column (i) of FIG. 2C. A view (plan view) in which the transmission axis direction of the polarizer 141 possessed by the display panel 10 is viewed from the observation surface side is illustrated in a column (ii) of FIG. 2C. It is found from FIG. 2C that the initial alignment direction (up-and-down direction in the drawing) of the liquid crystal molecules 2401 and the transmission axis direction (right-and-left direction in the drawing) of the polarizer 141 are arranged in a substantially vertical arrangement in plan view.

Figure 27:
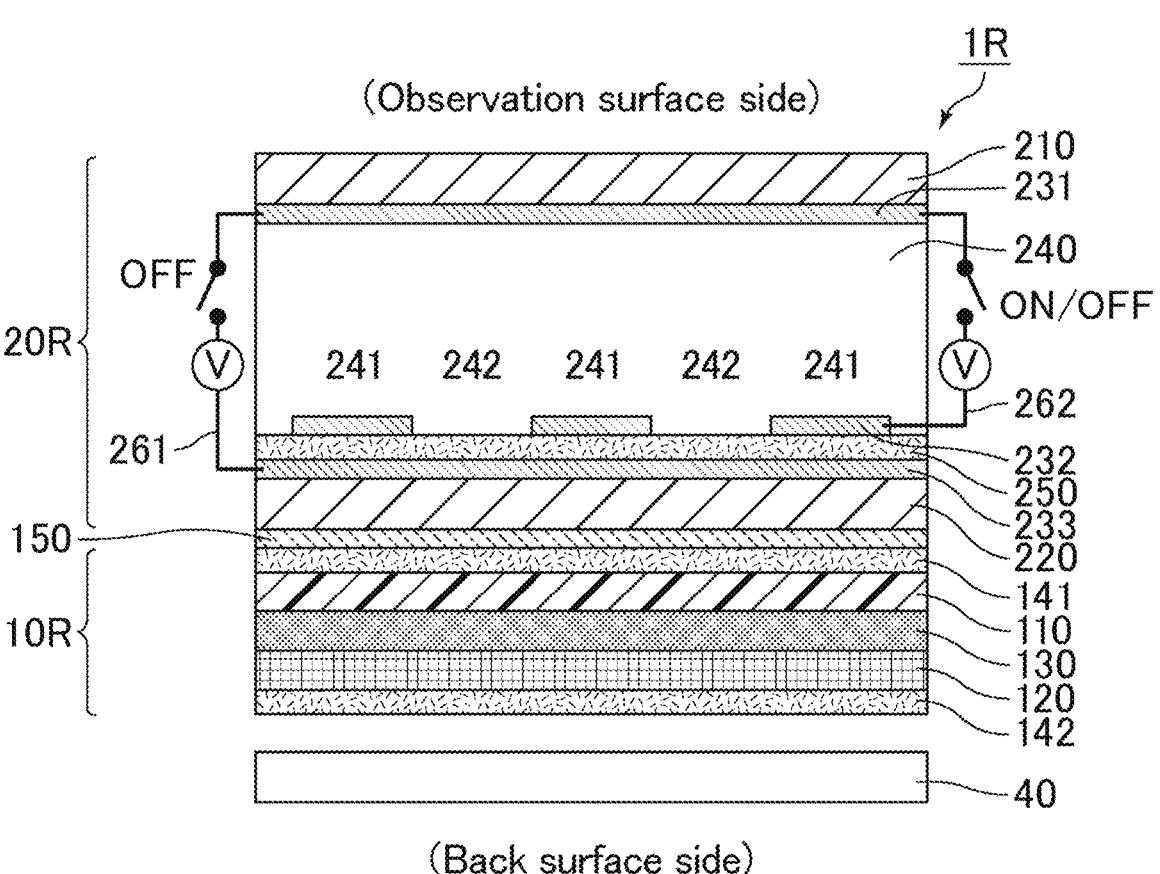
FIG. 27 is a schematic cross-sectional view of a video display device 1R found by the applicant.
Figure 28A:
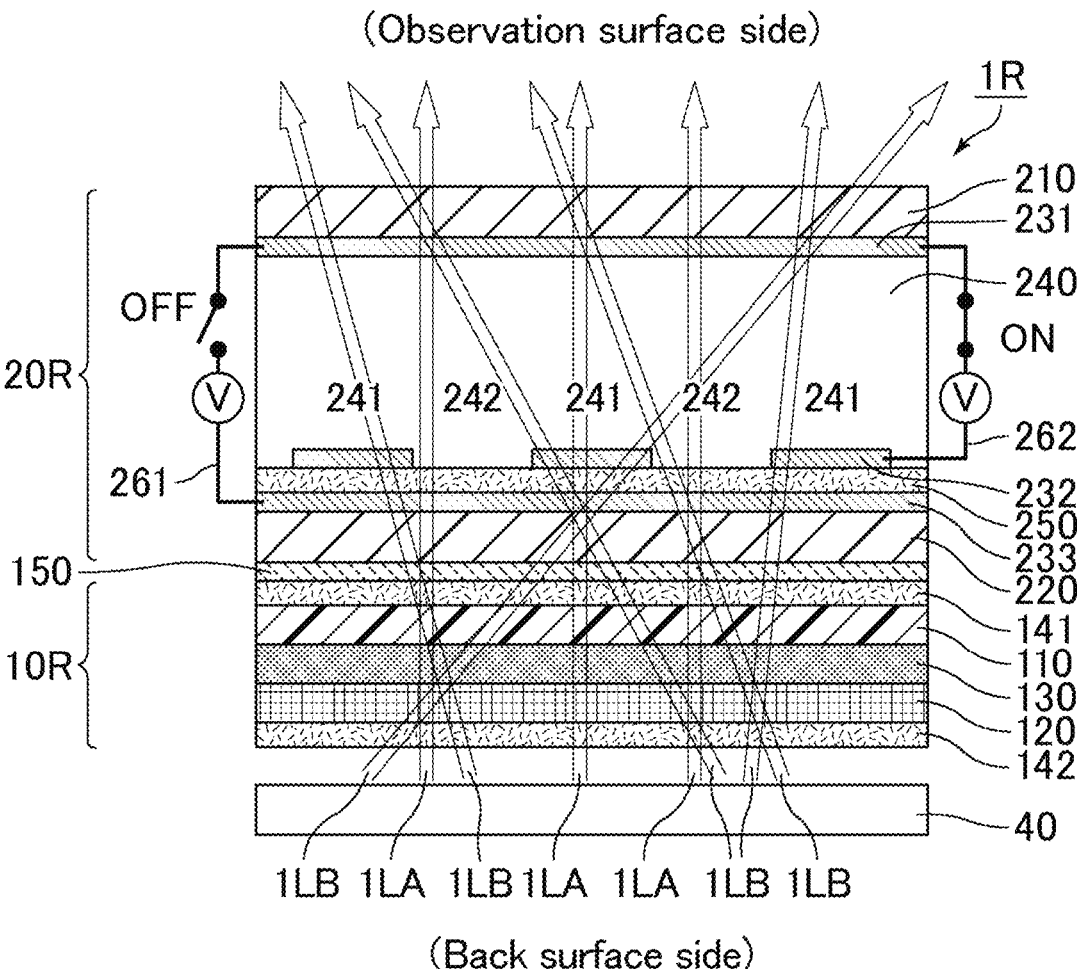
FIG. 28A is a view with which problems that can occur in the video display device 1R were examined.
Figure 28B:
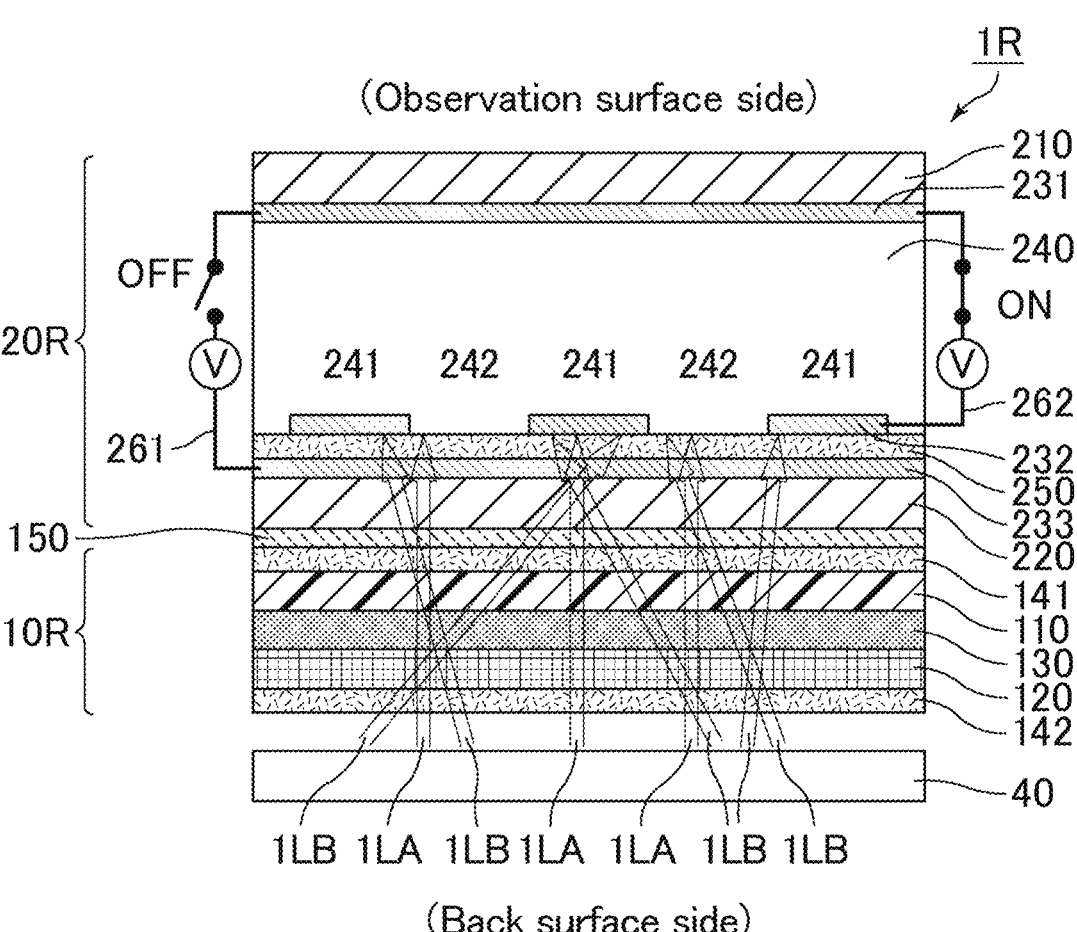
FIG. 28B is a view with which problems that can occur in the video display device 1R were examined.

Herein, the inventors of this application have found that the video display device 1R cannot sufficiently obtain a louver function depending on the polarization direction of incident light in some cases as described above. Then, the inventors of this application have found that the cause thereof is that light orthogonal to the alignment direction of liquid crystal molecules in the liquid crystal layer 240 (GH liquid crystal layer) out of the light incident on the liquid crystal layer 240 is transmitted without being absorbed (see also FIGS. 27, 28A, and 28B). Thus, the inventors of this application have solved the problem by arranging the initial alignment direction of the liquid crystal molecules 2401 and the transmission axis direction of the polarizer 141 in the substantially vertical arrangement in plan view as described above. This arrangement allows the liquid crystal layer 240 itself to effectively act as the louver that can be switched on and off. Thus, the video display device 1 of the present invention has also the louver function in addition to the function of controlling the viewing angle by applying or not applying a voltage. Therefore, the thickness, weight, and manufacturing cost of the liquid crystal panel 20 or the video display device 1 including the liquid crystal panel 20 can be reduced as compared with those of a video display device having a louver layer separately from a liquid crystal panel. To further enhance the louver function, it is better for the liquid crystal molecules 2401 to have a higher degree of order. For example, the liquid crystal molecules 2401 preferably have physical property values, such as a high transition point temperature Tni and a small scattering parameter.

As described above, the liquid crystal layer 240 has the overlapping regions 241 overlapping the second electrodes 232 and the non-overlapping regions 242 not overlapping the second electrodes 232. The liquid crystal layer 240 has the features of being the GH liquid crystal layer containing the liquid crystal molecules having a predetermined initial alignment direction and having the overlapping regions 241 and the non-overlapping regions 242, so that the liquid crystal layer 240 has transparent regions and switching regions that are switched between the transmission state and the absorption state.

This embodiment is designed to switch the switching regions between the transmission state and the absorption state by applying or not applying a voltage between the first electrode 231 and the second electrodes 232 (262). Boundary portions (corresponding to c in FIG. 4A) between the overlapping regions 241 and the non-overlapping regions 242 serve as the switching regions. Portions (corresponding to a in FIG. 4A) obtained by excluding the boundary portions c from the overlapping regions 241 and portions (corresponding to b in FIG. 4A) obtained by excluding the boundary portions c from the non-overlapping regions 242 serve as the transparent regions. The voltage application unit may be a power supply that can be turned on and off.

The boundary portions between the overlapping regions 241 and the non-overlapping regions 242 serving as the switching regions include not only strict boundaries between the overlapping regions 241 and the non-overlapping regions 242, but the overlapping regions 241 and the non-overlapping regions 242 around the boundaries. More specifically, the switching region include parts of the overlapping regions 241 and the non-overlapping regions 242 (see a to c in FIG. 4).

Herein, the important point in the present invention is that the liquid crystal layer 240 is the GH liquid crystal layer containing the liquid crystal molecules having a predetermined initial alignment direction, and includes the overlapping regions 241 overlapping the electrodes A (second electrodes 232 in this embodiment) and the non-overlapping regions 242 not overlapping the electrodes A, so that the liquid crystal layer 240 has the transparent regions and the switching regions that are switched between the transmission state and the absorption state. More specifically, the important features of the present invention are that the application of a voltage to each electrode forms the transparent region having high transmittance and the absorption regions having low transmittance in the liquid crystal layer 240, so that the liquid crystal layer 240 itself can act as the louver that can be switched on and off. Therefore, the degree of overlap between the switching regions and the overlapping regions 241 or the non-overlapping regions 242 is not limited insofar as the transparent region having high transmittance and the absorption regions having low transmittance are formed when a voltage is applied. The transparent regions and the switching regions are not limited to the form illustrated in FIG. 4A, and can be controlled as appropriate by the width and the pitch of the electrodes A, the cell thickness (i.e., thickness D of the non-overlapping regions 242), the application of a voltage to each electrode, or the like.

In this embodiment, the second electrodes 232 and third electrode 233 are arranged with the interlayer insulating film 250 interposed therebetween. In this case, the first electrode 231 functions as a common electrode, the second voltage application unit 261 between the first electrode 231 and the third electrode 233 controls the voltage application or the no-voltage-application to the non-overlapping regions 242, and the first voltage application unit 262 between the first electrode 231 and the second electrodes 232 can control the voltage application or the no-voltage-application to the overlapping regions 241. Such an electrode structure is extremely useful because the electrode structure is applicable to various drive systems in the field of video display devices.

The transparent region is a region exhibiting the transmission state both when a voltage is applied and when no voltage is applied. The transmission state is a state having transparency to light. The switching region is a region that is switched between the transmission state and the absorption state. The absorption state is a state where light is absorbed and a state where the transmittance is lower than that of the transmission state. The liquid crystal layer 240 in the absorption state is in a state similar to that of light blocking glass.

In this embodiment, the liquid crystal layer 240 has a certain degree of transmittance (also referred to as visible light transmittance or light transmittance) T1 in the wide viewing angle mode (see FIGS. 3A and 3B) as described later. In the narrow viewing angle mode (see FIGS. 4A and 4B), the transparent regions a and b in FIG. 4A have transmittances T2 and T3, respectively, and the switching regions c in FIG. 4A have a transmittance T4 due to the absorption. T1, T2, T3, and T4 satisfy the relationships of "T1≥T2>T4" and "T1≥T3>T4". The relative magnitudes of T2 and T3 are not limited.

The transmittance T1 may be 100%. The transmittance T4 may be 0%.

Figure 3B:
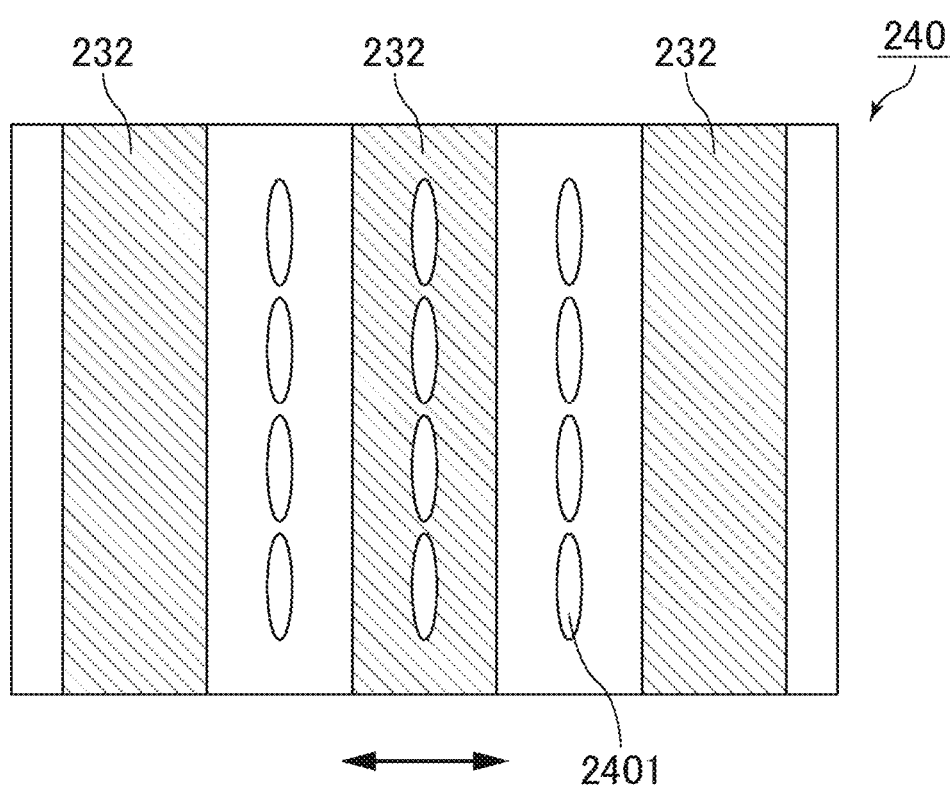
FIG. 3B is a view for explaining the alignment direction of liquid crystal molecules 2401 in the wide viewing angle mode according to the video display device of Embodiment 1.
Figure 4B:
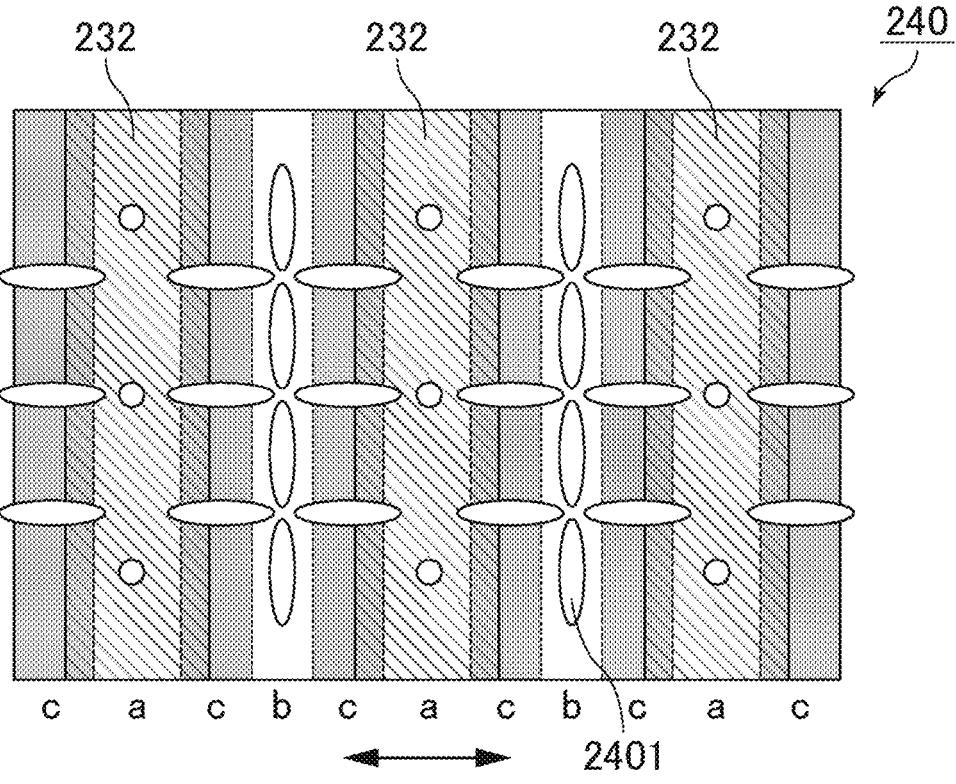
FIG. 4B is a view for explaining the alignment direction of the liquid crystal molecules 2401 in the narrow viewing angle mode according to the video display device of Embodiment 1.
Figure 4C:
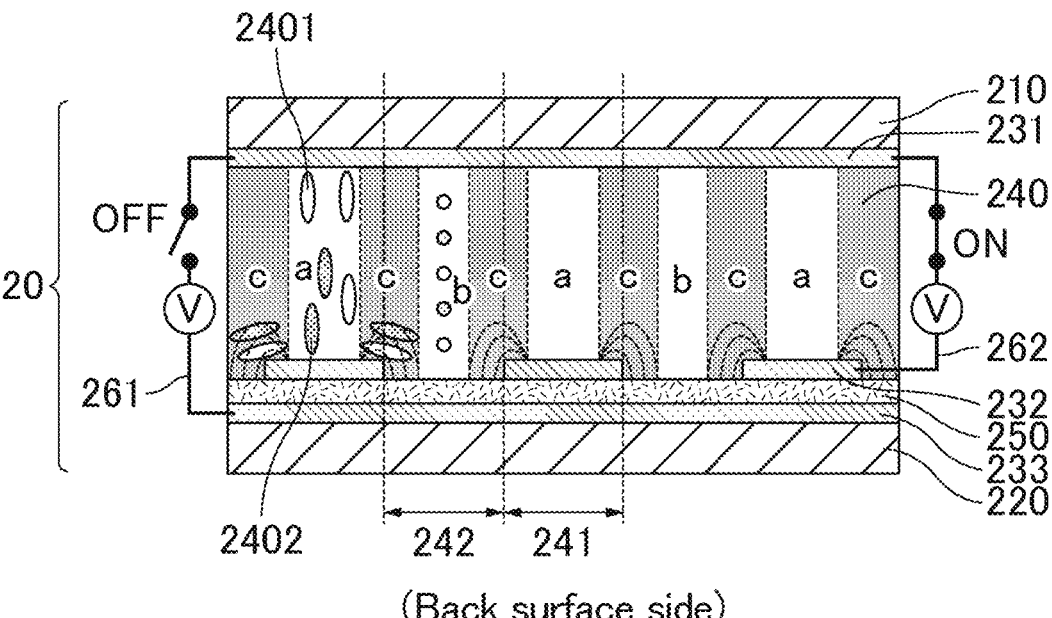
FIG. 4C is a view for explaining the alignment direction of the liquid crystal molecules 2401 in the narrow viewing angle mode according to the video display device of Embodiment 1.

FIG. 3B is a view for explaining the alignment direction (initial alignment direction) of the liquid crystal molecules 2401 in the wide viewing angle mode (FIG. 3A) of this embodiment. Specifically, FIG. 3B is a view (plan view) of a X-X' portion of the liquid crystal layer 240 in FIG. 3A viewed from the observation surface side. At the bottom of FIG. 3B, the transmission axis direction (plan view) of the polarizer 141 possessed by the display panel 10 is indicated by the arrow. FIGS. 4B and 4C are views for explaining the alignment direction of the liquid crystal molecules 2401 in the narrow viewing angle mode (FIG. 4A) of this embodiment. Specifically, FIG. 4B is a view (plan view) of a X-X' portion of the liquid crystal layer 240 in FIG. 4A viewed from the observation surface side. At the bottom of FIG. 4B, the transmission axis direction (plan view) of the polarizer 141 possessed by the display panel 10 is indicated by the arrow. FIG. 4C is a view (cross-sectional view) in which only the liquid crystal panel 20 is extracted from FIG. 4A and with which the alignment of the liquid crystal molecules 2401 is examined. The dotted lines in FIG. 4C indicate lines of electric force.

As illustrated in FIGS. 3A and 4A, light is incident on the liquid crystal panel 20 via the display panel 10 from the back surface side (specifically the backlight 40). In a state where no voltage is applied between the first electrode 231 and the second electrodes 232 (262) and no voltage is applied also between the first electrode 231 and the third electrode 233 (261) (state where no voltage is applied), the polarization direction of the light incident on the liquid crystal layer 240 and the alignment direction of the liquid crystal molecules 2401 in the liquid crystal layer 240 are arranged in a substantially orthogonal arrangement (also referred to as substantially vertical arrangement) in plan view (see FIG. 3B), and therefore the incident light is not absorbed in the liquid crystal layer 240. More specifically, the liquid crystal layer 240 is integrated, and the entire liquid crystal layer 240 enters the transmission state (constitutes a transparent region) (see FIG. 3A). More specifically, the liquid crystal layer 240 enters a state of having the transmittance T1. In this case, omnidirectional light from the backlight 40 is transmitted through the liquid crystal panel 20 (see FIG. 3A). As a result, light from the back surface side can be transmitted without loss from the low polar angle side to the high polar angle side, and therefore the wide viewing angle mode can be achieved with high luminance.

In a state where a voltage is applied between the first electrode 231 and the second electrodes 232 (262) and no voltage is applied between the first electrode 231 and the third electrode 233 (261) (state where a voltage is applied), the liquid crystal layer 240 itself acts as the louver. More specifically, light 1LB in the oblique direction and part of light 1LA in the front direction out of the light incident on the liquid crystal layer 240 from the backlight 40 are absorbed (attenuated) in the boundary portions (c regions in FIG. 4A) between the overlapping regions 241 and the non-overlapping regions 242 and are transmitted as the attenuated light through the liquid crystal panel 20 (see FIG. 4A). Specifically, mainly in the regions (a regions in FIG. 4A) corresponding to the overlapping regions 241, longitudinal electric fields are generated between the first electrode 231 and the second electrodes 232, and the liquid crystal molecules 2401 are aligned substantially vertically (front view) to the transmission axis of the polarizer 141 of the liquid panel 10 (see a regions in FIG. 4C), and therefore the incident light is transmitted without being absorbed. Mainly in the regions (b regions in FIG. 4A) corresponding to the non-overlapping regions 242, no voltage is applied, i.e., the first electrode 231 and the third electrode 233 have the same potential. Thus, the liquid crystal molecules 2401 maintain the substantially horizontal alignment (front view) to the transmission axis of the polarizer 141 of the display panel 10 (see b regions in FIG. 4C), and therefore the incident light is transmitted without being absorbed. In contrast thereto, in the boundary portions (c regions in FIG. 4A) between the overlapping regions 241 and the non-overlapping regions 242, transverse electric fields are generated between the second electrodes 232 and the third electrode 233, so that the alignment direction of the liquid crystal molecules 2401 is changed by about 90° in plan view (see c regions in FIG. 4C). Therefore, the liquid crystal molecules 2401 are aligned along the electric field direction. In this case, the polarization direction of light incident through the polarizer 141 of the display panel 10 and the alignment direction of the liquid crystal molecules 2401 are matched with each other, and therefore the incident light is absorbed.

By switching the voltages as described above, the regions in the absorption state (switching regions) and the regions in the transmission state (transparent regions) can be formed. Specifically, the a and b regions in FIG. 4A remain in the transmission state, while the c regions in FIG. 4A enter the absorption state. More specifically, the liquid crystal layer 240 enters a state in which the transparent regions a and b in FIG. 4A have the transmittances T2 and T3, respectively, and the switching regions c in FIG. 4A have the transmittance T4 due to the absorption (T1≥T2>T4 and T1≥T3>T4). Further, the light 1LA in the front direction out of the light incident on the liquid crystal panel 20 from the backlight 40 is transmitted through the liquid crystal panel 20 without being attenuated (see FIG. 4A). As a result, the light from the backlight 40 is attenuated on the high polar angle side, and the light from the back surface side can be transmitted with the same luminance only on the low polar angle side, and therefore the narrow viewing angle mode can be achieved.

In this specification, with respect to the change angle between the initial alignment direction of liquid crystal molecules and the alignment direction of liquid crystal molecules when a voltage is applied, the "substantially 90°" means an angle (absolute value) in the range of 90°±10°. This angle is preferably in the range of 90°±5°, more preferably in the range of 90°±3°, still more preferably in the range of 90°±1°, particularly preferably 90° (completely vertical).

As the interlayer insulating film 250, any of an organic insulating film, an inorganic insulating film, or a laminate of an organic insulating film and an inorganic insulating film is usable. As the organic insulating film, an organic film (relative dielectric constant $\zeta$=2 to 5), such as acrylic resin, polyimide resin, or novolac resin, or a laminate thereof is usable, for example. The film thickness of the organic insulating film is not limited, and is 2 μm or more and 4 μm or less, for example. As the inorganic insulating film, an inorganic film (relative dielectric constant $\zeta$=5 to 7), such as silicon nitride (SiNx) or silicon oxide (SiO$_2$), or a laminated film thereof is usable, for example. The film thickness of the inorganic insulating film is not limited, and is 1500 Å or more and 3500 Å or less, for example.

The film thickness of the interlayer insulating film 250 is preferably 0.1 μm or more and 4 μm or less. The film thickness is more preferably 0.15 μm or more and 0.35 μm or less.

Figure 11:
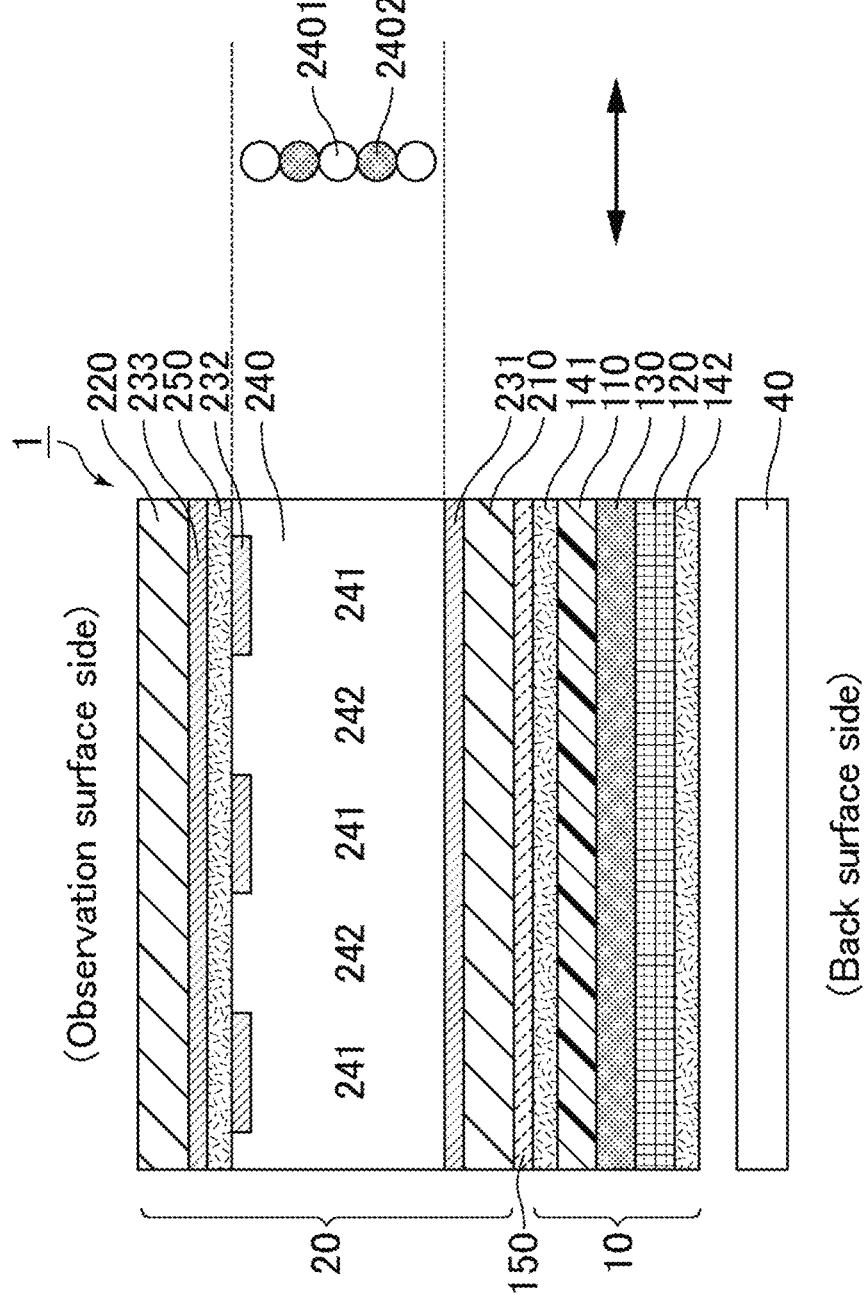
FIG. 11 is a schematic cross-sectional view of a video display device of Embodiment 4.

As described above, the liquid crystal panel 20 is applicable to common liquid crystal processes (generally within 10 μm), and therefore can easily achieve the narrow viewing angle mode and has excellent viewing angle performance. In this embodiment, the transparent regions and the switching regions are not physically distinguished by materials, but distinguished by the design of a power supply (e.g., arrangement of electrodes or the like). The transparent regions and the switching regions are formed of the same material. Therefore, this embodiment does not require a UV curing process to fix the state to the transmission state (transparent region) in advance in manufacturing as illustrated in FIG. 11 of JP 2007-206373 A, for example. Thus, the liquid crystal panel 20 of this embodiment is also advantageous in that a manufacturing process of the liquid crystal panel or the video display device can be simplified.

The liquid crystal panel 20 may not have a polarizer. More specifically, the display panel 10 has the polarizer (polarizer 141 in this embodiment) on the liquid crystal panel 20 side, and the polarizer is also usable as the polarizer of the liquid crystal panel 20. This eliminates the necessity of adding a polarizer to the liquid crystal panel 20, making it possible to further suppress the transmission loss.

<Display Panel>

The display panel 10 may be one having a function of displaying images. The display panel 10 can turn on and off the display of images. This embodiment gives a description taking a case where the display panel 10 is a liquid crystal display panel as an example.

As illustrated in FIG. 1, the display panel 10 includes the polarizer 141, a color filter (CF) substrate 110 including a CF layer, a liquid crystal layer 130, a thin film transistor (TFT) substrate 120 including TFTs, and a polarizer 142 in order from the observation surface side to the back surface side. In this embodiment, the display panel 10 functions as a liquid crystal display panel, and therefore the video display device of this embodiment is a liquid crystal display device.

Among the polarizers possessed by the display panel 10, the polarizer (polarizer 141 in this embodiment) arranged on the liquid crystal panel 20 side opposite to the liquid crystal panel 20 has the transmission axis arranged substantially vertically to the initial alignment direction of the liquid crystal molecules 2401 contained in the liquid crystal layer 240 of the liquid crystal panel 20 in plan view.

The polarizers 141 and 142 may be arranged so that the transmission axes are parallel to each other or may be arranged so that the transmission axes are orthogonal to each other. More specifically, the arrangement of the polarizers 141 and 142 may be a parallel Nicols arrangement or a crossed Nicols arrangement.

Herein, the "parallel to each other" means that the transmission axes form an angle in the range of 0°±10°. This angle is preferably in the range of 0°±5°. The "orthogonal to each other" means that the transmission axes form an angle in the range of 90°±10°. This angle is preferably in the range of 90°±5°.

The axis azimuth of the polarizers 141 and 142 can be set as appropriate, and are preferably set in the range of 0°±10± or 90°±10°, for example. In particular, the axis azimuths are more preferably set in the range of 0°±5° or 90°±5°, still more preferable substantially set to 0° or 90°. This can achieve a bright display in the normal direction and in the up-and-down and right-and-left directions.

The polarizers 141 and 142 are linear polarizers. The linear polarizer is a polarizer having a function of extracting polarized light (linearly polarized light) vibrating only in a specific direction from unpolarized light (natural light), partially polarized light, or polarized light. The polarizer (polarizer 142 in this embodiment) arranged on the backlight 40 side is a polarizer corresponding to the wavelength of light from the backlight 40. The light from the backlight 40 is incident on the polarizer 142, and only linearly polarized light vibrating along the polarization transmission axis of the polarizer 142 is transmitted.

The polarizers 141 and 142 may be absorption polarizers or reflection polarizers. Both the polarizers 141 and 142 may be absorption polarizers or one of the polarizers 141 and 142 may be a reflection polarizer and the other one of them may be an absorption polarizer.

Specifically, the absorption polarizer includes a polarizer obtained by dyeing a polyvinyl alcohol film with an anisotropic material such as an iodine complex (or colorant), and making the anisotropic material adsorbed onto the polyvinyl alcohol film, and then stretching and aligning the resultant polyvinyl alcohol film, for example. In general, to ensure mechanical strength and moist heat resistance, the polyvinyl alcohol film is put into practical use with a protective film such as a triacetyl cellulose film being laminated on both sides. Specifically, the reflective polarizer includes a film in which a plurality of dielectric thin films is laminated, a film in which a plurality of thin films different in refractive index anisotropy is laminated, a nanowire grid polarizer, and a polarizer using selective reflection of cholesteric liquid crystals, for example.

As the CF substrate 110, those commonly used in the field of liquid crystal display panels are usable, and may be configured so that members, such as a color filter and a black matrix (BM) layer, are arranged on the surface of a transparent substrate such as a glass substrate, for example. More specifically, the CF substrate 110 includes, on an insulating substrate, a black matrix provided in a lattice shape to correspond to gate lines and source lines, color filters of a plurality of colors including a red layer, a green layer, and a blue layer arranged periodically between the lattices of the black matrix, an overcoat layer formed of a transparent insulating resin provided to cover the black matrix and each color filter, and a photo spacer provided in a columnar shape on the overcoat layer.

The TFT substrate 120 has an insulating substrate, and includes a plurality of gate lines provided to extend in parallel to each other, and a plurality of source lines provided to extend in parallel to each other in a direction intersecting the gate lines via the insulating film on the insulating substrate in a display region. The plurality of gate lines and the plurality of source lines are formed in a lattice shape as a whole so as to partition each pixel. At the intersection between each source line and each gate line, a thin film transistor is arranged as a switching element.

The TFT substrate 120 has a planar common electrode arranged on the surface on the liquid crystal layer 130 side of the insulating substrate, an insulating film covering the common electrode, and pixel electrodes arranged on the surface on the liquid crystal layer 130 side of the insulating film and each provided with a slit. The pixel electrode is arranged in each region surrounded by two adjacent source lines and two adjacent gate lines. The pixel electrodes are electrically connected to the corresponding source lines via a semiconductor layer provided in the thin film transistor. More specifically, the display panel 10 of this embodiment is a liquid crystal display panel in a fringe field switching (FFS) mode. The arrangement of the common electrode and the pixel electrodes may be interchanged. In that case, the common electrode provided with slits is arranged on the planar pixel electrode formed to occupy each pixel region via the insulating film.

In this embodiment, the display panel 10 in a horizontal alignment mode in which the pixel electrodes and the common electrode are provided on one of the substrates. The horizontal alignment mode refers to a mode in which liquid crystal molecules are aligned in a direction substantially horizontal to the principal surface of each of a pair of substrates when no voltage is applied to a liquid crystal layer, and includes, in addition to the above-described FFS mode, an IPS (In-Plane Switching) mode, for example. The display panel 10 may also be in a vertical alignment mode in which the pixel electrodes are provided on the TFT substrate 120 and the common electrode is provided on the CF substrate 110. The vertical alignment mode refers to a mode in which liquid crystal molecules are aligned in a direction substantially vertical to the principal surface of each of a pair of substrates when no voltage is applied to a liquid crystal layer and includes a vertical alignment (VA) mode, a twisted nematic (TN) mode, and the like, for example.

Between the TFT substrate 120 and the liquid crystal layer 130 and between the CF substrate 110 and the liquid crystal layer 130, alignment films having a function of controlling the alignment of liquid crystal molecules contained in the liquid crystal layer 130 are arranged. In the state where no voltage is applied, in which no voltage is applied between the pixel electrodes and the common electrode, the liquid crystal molecules contained in the liquid crystal layer 130 are aligned substantially horizontally to the principal surface of each of the pair of substrates.

The display panel 10 further includes a source driver electrically connected to the source lines, a gate driver electrically connected to the gate lines, and a controller. The gate driver sequentially supplies scanning signals to the gate lines under the control of the controller. The source driver supplies data signals to the source lines under the control of the controller at the timing when the TFT enters the state where a voltage is applied due to the scanning signals. The pixel electrodes each are set to a potential according to the data signal supplied via the corresponding TFT, and a fringe electric field is generated between the pixel electrodes and the common electrode, causing the liquid crystal molecules of the liquid crystal layer to rotate. Thus, the magnitude of the voltage applied between the pixel electrodes and the common electrode is controlled, the retardation of the liquid crystal layer is changed, and the transmission of light and the non-transmission of light are controlled.

The adhesive layer 150 (OCA, for example) is not limited, and those used in common liquid crystal display devices are also usable. For the liquid crystal layer 130, those used in common liquid crystal display devices are also usable. Therefore, descriptions of the adhesive layer 150 and the liquid crystal layer 130 are omitted.

<Backlight>

The backlight 40 is not limited insofar as it emits light to the liquid crystal panel 20 and/or the display panel 10. Examples include a configuration in which the backlight 40 has a light source and a reflective sheet. As the light source, common backlight light sources, i.e., a cold cathode fluorescent lamp (CCFL), a light emitting diode (LED), and the like, are usable, for example.

The backlight 40 may also be a direct-lit one or an edge-lit one. Taking the edge-lit backlight as an example, examples include a configuration in which the backlight 40 has a light source, a reflective sheet, and a light guiding plate. The light source is arranged on the end surface of the light guiding plate, and the reflective sheet is arranged on the back surface side of the light guiding plate. For the light guiding plate, those commonly used in the field of video display devices are usable. Examples of the reflective sheet include an aluminum plate, a white polyethylene terephthalate (PET) film, and a reflective film (e.g., enhanced specular reflector (ESR) film manufactured by 3M).

As the backlight 40, a local dimming driving backlight is also usable. The local dimming drive is a function of controlling light for each area, the area being obtained by dividing an image display region of a display device into a plurality of areas (also referred to as segments). The use of the local dimming driving backlight enables the local control of the luminance of the backlight, making it possible to achieve a high contrast ratio and low power consumption of the display device. However, in general, the display device in which the viewing angle is controlled by the backlight is difficult to achieve both the control of the viewing angle and the local dimming drive. In contrast thereto, the present invention can control the viewing angle by the liquid crystal panel 20, and therefore a method for driving the backlight is not limited. Therefore, the liquid crystal panel 20 and the local dimming driving backlight can be combined, which is very useful.

<Other Configurations>

The video display device of this embodiment contains, in addition to the above-described members, external circuits such as a tape carrier package (TCP) and a printed wiring substrate (PCB); optical films such as a viewing angle expansion film and a luminance enhancement film; and a bezel (frame), and some members may be incorporated into other members. Members other than those previously described are not limited, and those commonly used in the field of video display devices are usable, and therefore descriptions thereof are omitted.

Embodiment 2

This embodiment mainly describes the features peculiar to this embodiment, and omits a description overlapping with the description in Embodiment 1 given above. This embodiment is substantially the same as Embodiment 1, except that liquid crystal molecules in which the dielectric anisotropy ($\Delta\varepsilon$) has a negative value are used as the liquid crystal molecules 2401 contained in the liquid crystal layer 240 of the liquid crystal panel 20.

Figure 7A:
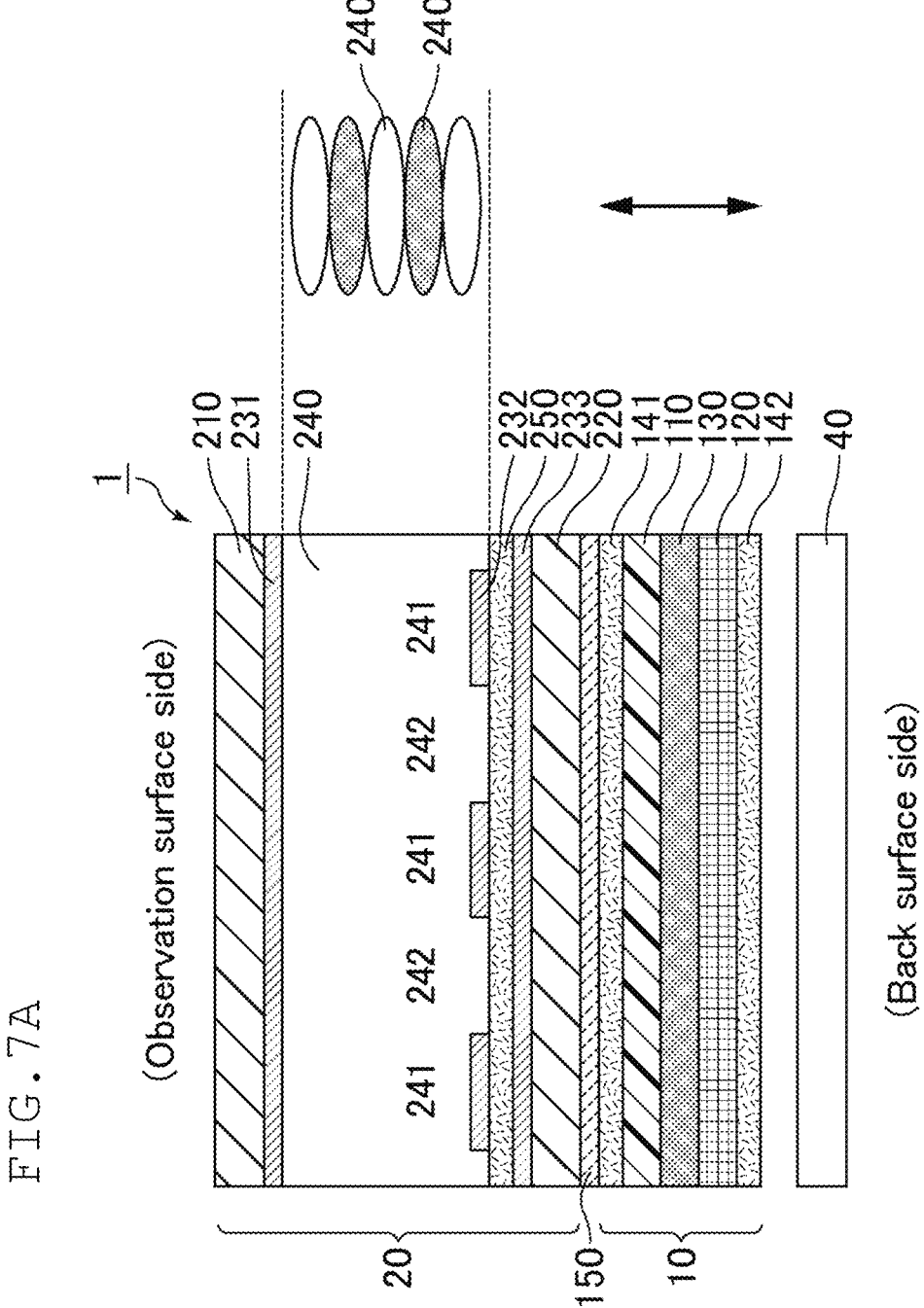
FIG. 7A is a schematic cross-sectional view of a video display device of Embodiment 2.
Figure 8A:
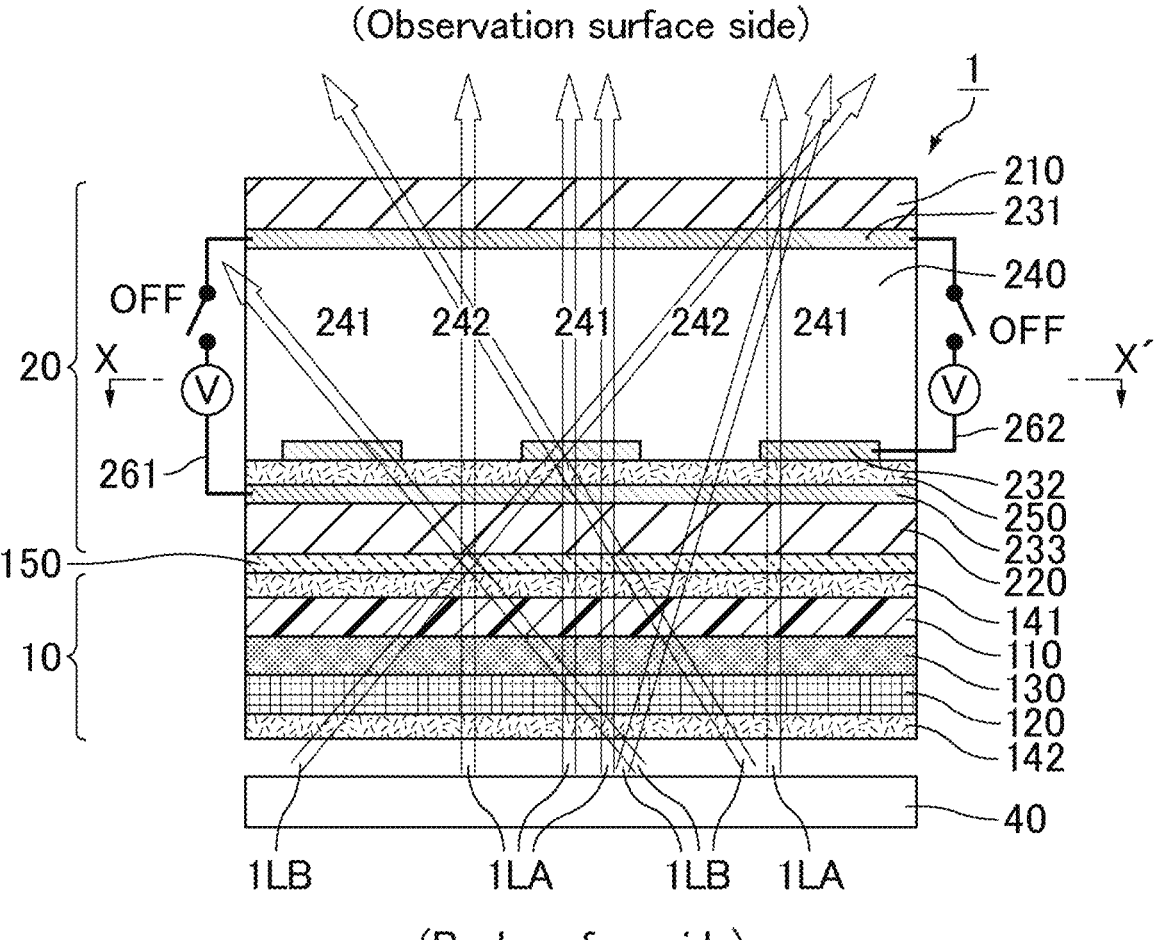
FIG. 8A is a schematic cross-sectional view illustrating the wide viewing angle mode of the video display device of Embodiment 2.
Figure 9A:
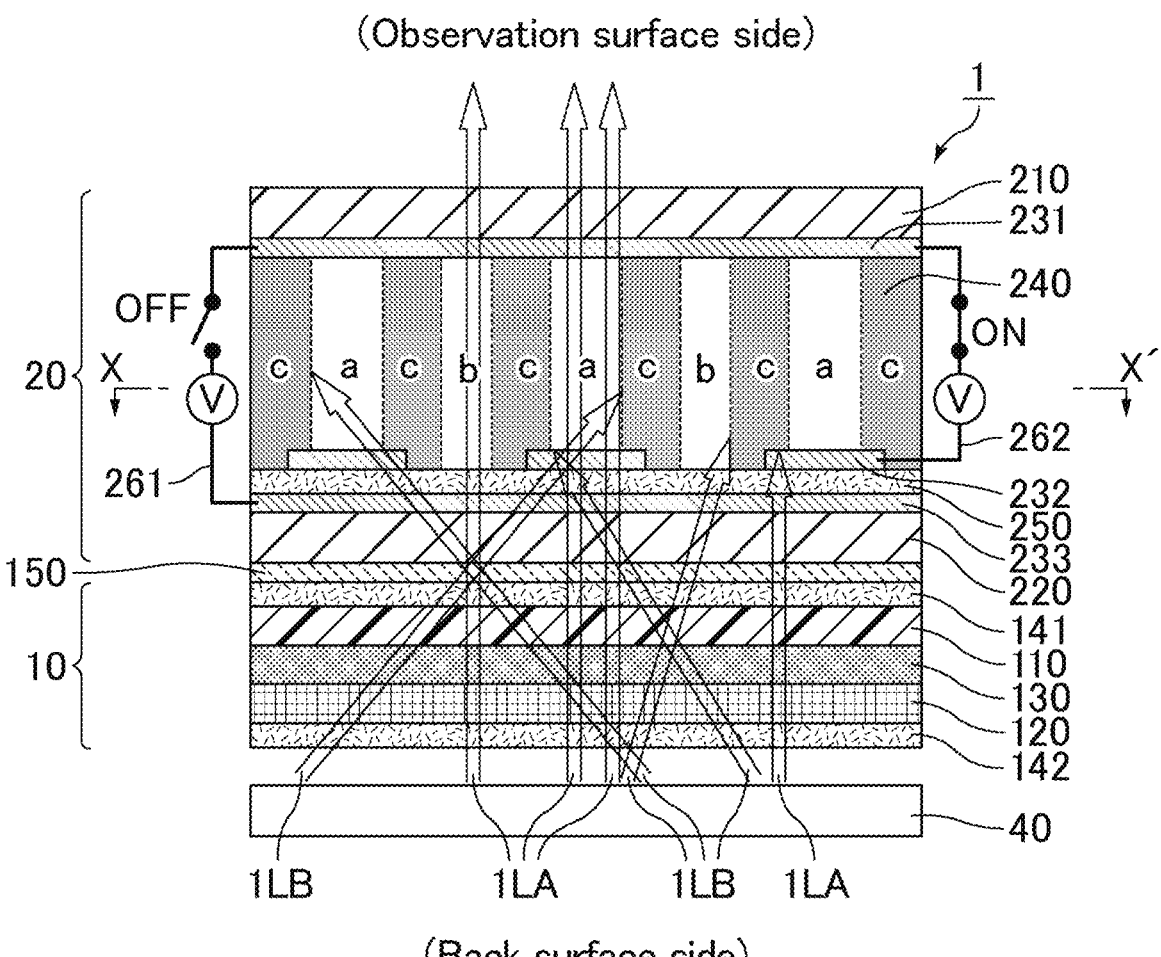
FIG. 9A is a schematic cross-sectional view illustrating the narrow viewing angle mode of the video display device of Embodiment 2.

FIG. 7A is a schematic cross-sectional view of a video display device of this embodiment. FIG. 8A is a schematic cross-sectional view illustrating the wide viewing angle mode of the video display device of this embodiment. FIG. 9A is a schematic cross-sectional view illustrating the narrow viewing angle mode of the video display device of this embodiment.

Figure 7B:
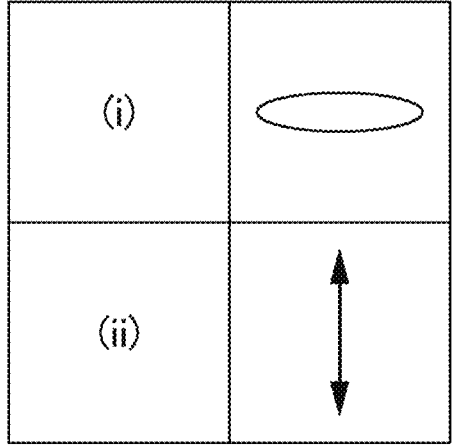
FIG. 7B is a view (schematic plan view) in which the alignment (i) of the liquid crystal molecules 2401 in the liquid crystal layer 240 when no voltage is applied and the transmission axis direction (ii) of the polarizer 141 possessed by the display panel 10 are viewed from directly above (observation surface side) according to Embodiment 2.

In this embodiment, the alignment of the liquid crystal molecules 2401 and the dichroic dye molecules 2402 in the liquid crystal layer 240 when no voltage is applied and the transmission axis direction (indicated by the arrow) of the polarizer 141 possessed by the display panel 10 are also indicated on the right side of FIG. 7A (front view). A view (plan view) in which the alignment of the liquid crystal molecules 2401 in the liquid crystal layer 240 when no voltage is applied is viewed from the observation surface side is illustrated in a column (i) of FIG. 7B. A view (plan view) in which the transmission axis direction of the polarizer 141 possessed by the display panel 10 is viewed from the observation surface side is illustrated in a column (ii) of FIG. 7B. It is found from FIG. 7B that the initial alignment direction (right-and-left direction in the drawing) of the liquid crystal molecules 2401 and the transmission axis direction (up-and-down direction in the drawing) of the polarizer 141 are arranged in the substantially vertical arrangement in plan view.

Figure 8B:
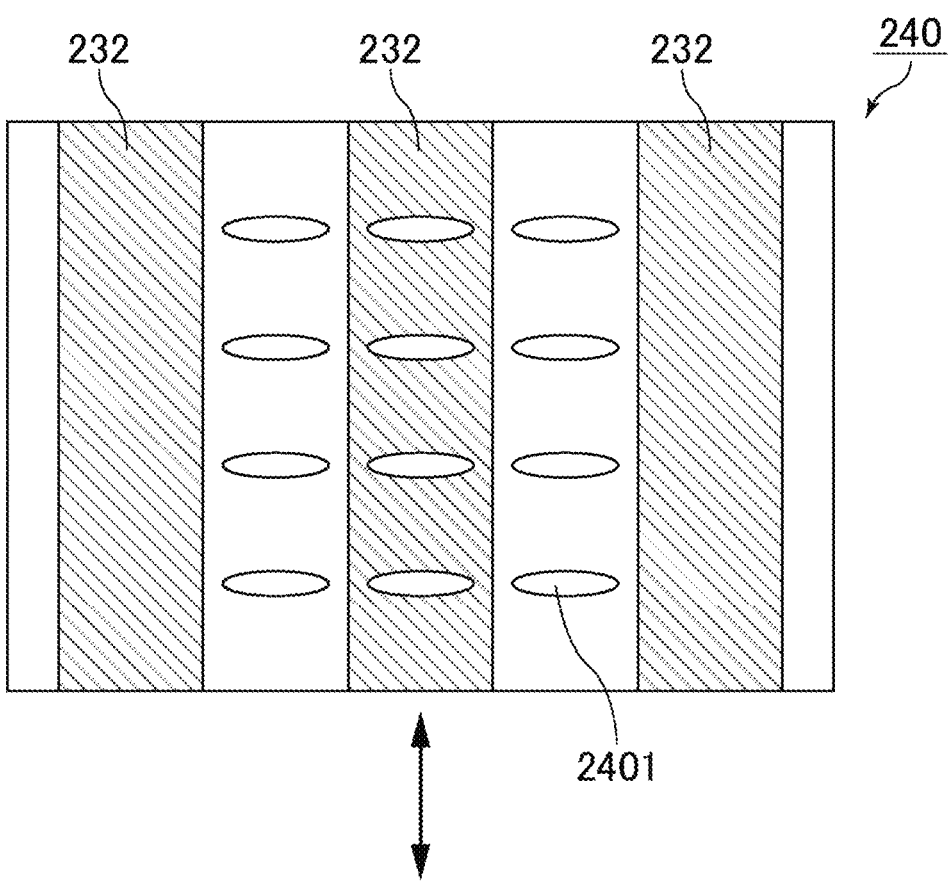
FIG. 8B is a view for explaining the alignment direction of the liquid crystal molecules 2401 in the wide viewing angle mode according to the video display device of Embodiment 2.
Figure 9B:
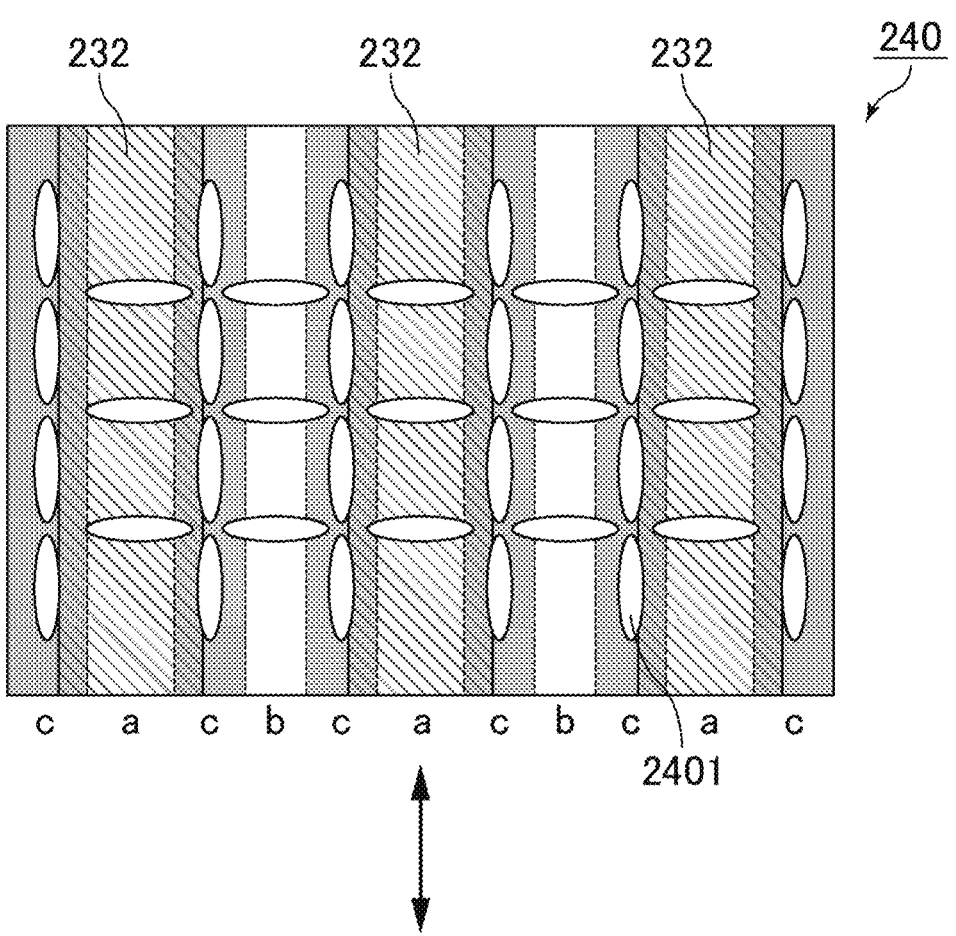
FIG. 9B is a view for explaining the alignment direction of the liquid crystal molecules 2401 in the narrow viewing angle mode according to the video display device of Embodiment 2.

FIG. 8B is a view for explaining the alignment direction (initial alignment direction) of the liquid crystal molecules 2401 in the wide viewing angle mode (FIG. 8A) of this embodiment. Specifically, FIG. 8B is a view (plan view) of a X-X' portion of the liquid crystal layer 240 in FIG. 8A viewed from the observation surface side. At the bottom of FIG. 8B, the transmission axis direction (plan view) of the polarizer 141 possessed by the display panel 10 is indicated by the arrow. FIG. 9B is a view for explaining the alignment direction of the liquid crystal molecules 2401 in the narrow viewing angle mode (FIG. 9A) of this embodiment.

Specifically, FIG. 9B is a view (plan view) of a X-X' portion of the liquid crystal layer 240 in FIG. 9A viewed from the observation surface side. At the bottom of FIG. 9B, the transmission axis direction (plan view) of the polarizer 141 possessed by the display panel 10 is indicated by the arrow.

In this embodiment, the liquid crystal layer 240 has a certain degree of transmittance T1 in the wide viewing angle mode (see FIGS. 8A and 8B) as described later. In the narrow viewing angle mode (see FIGS. 9A and 9B), the transparent regions a and b in FIG. 9A have transmittances T2 and T3, respectively, and the switching regions c in FIG. 9A have a transmittance T4 due to the absorption. T1, T2, T3, and T4 satisfy the relationships of "T1≥T2>T4" and "T1≥T3>T4". The relative magnitudes of T2 and T3 are not limited.

The transmittance T1 may be 100%. The transmittance T4 may be 0%.

As illustrated in FIGS. 8A and 9A, light is incident on the liquid crystal panel 20 via the display panel 10 from the back surface side (specifically the backlight 40). In a state where no voltage is applied between the first electrode 231 and the second electrodes 232 (262) and no voltage is applied also between the first electrode 231 and the third electrode 233 (261) (state where no voltage is applied), the polarization direction of the light incident on the liquid crystal layer 240 and the alignment direction of the liquid crystal molecules 2401 in the liquid crystal layer 240 are arranged in the substantially orthogonal arrangement (see FIG. 8B) in plan view, and therefore the incident light is not absorbed in the liquid crystal layer 240. More specifically, the liquid crystal layer 240 is integrated, and the entire liquid crystal layer 240 enters the transmission state (constitutes a transparent region) (see FIG. 8A). More specifically, the liquid crystal layer 240 enters a state of having the transmittance T1. In this case, omnidirectional light from the backlight 40 is transmitted through the liquid crystal panel 20 (see FIG. 8A). As a result, the light from the back surface side can be transmitted without loss from the low polar angle side to the high polar angle side, and therefore the wide viewing angle mode can be achieved with high luminance.

In a state where a voltage is applied between the first electrode 231 and the second electrodes 232 (262) and no voltage is applied between the first electrode 231 and the third electrode 233 (261) (state where a voltage is applied), the liquid crystal layer 240 itself acts as the louver. More specifically, the light 1LB in the oblique direction and part of the light 1LA in the front direction out of the light incident on the liquid crystal layer 240 from the backlight 40 are absorbed (attenuated) in the boundary portions (c regions in FIG. 9A) between the overlapping regions 241 and the non-overlapping regions 242 and are transmitted as the attenuated light through the liquid crystal panel 20 (see FIG. 9A). Specifically, mainly in the regions (a regions in FIG. 9A) corresponding to the overlapping regions 241, longitudinal electric fields are generated between the first electrode 231 and the second electrodes 232, and the liquid crystal molecules 2401 are aligned substantially vertically (front view) to the transmission axis of the polarizer 141 of the liquid panel 10, and therefore the incident light is transmitted without being absorbed. Mainly in the regions (b regions in FIG. 9A) corresponding to the non-overlapping regions 242, no voltage is applied, i.e., the first electrode 231 and third electrode 233 have the same potential. Thus, the liquid crystal molecules 2401 maintain the substantially horizontal alignment (front view) to the transmission axis of the polarizer 141 of the display panel 10, and therefore the incident light is transmitted without being absorbed. In contrast thereto, in the boundary portions (c regions in FIG. 9A) between the overlapping regions 241 and the non-overlapping regions 242, transverse electric fields are generated between the second electrodes 232 and the third electrode 233, so that the alignment direction of the liquid crystal molecules 2401 is changed by about 90° in plan view. Therefore, the liquid crystal molecules 2401 are aligned along the electric field direction. In this case, the polarization direction of the light incident through the polarizer 141 of the display panel 10 and the alignment direction of the liquid crystal molecules 2401 are matched with each other, and therefore the incident light is absorbed.

By switching the voltages as described above, the regions in the absorption state (switching regions) and the regions in the transmission state (transparent regions) can be formed. Specifically, the a and b regions in FIG. 9A remain in the transmission state, while the c regions in FIG. 9A enter the absorption state. More specifically, the liquid crystal layer 240 enters a state in which the transparent regions a and b in FIG. 9A have the transmittances T2 and T3, respectively, and the switching regions c in FIG. 9A have the transmittance T4 due to the absorption (T1≧T2>T4 and T1≧T3>T4). Further, the light 1LA in the front direction out of the light incident on the liquid crystal panel 20 from the backlight 40 is transmitted through the liquid crystal panel 20 without being attenuated (see FIG. 9A). As a result, the light from the backlight 40 is attenuated on the high polar angle side, and the light from the back surface side can be transmitted with the same luminance only on the low polar angle side, and therefore the narrow viewing angle mode can be achieved.

Embodiment 3

This embodiment mainly describes the features peculiar to this embodiment, and omits a description overlapping with the description in Embodiment 1 given above. This embodiment is substantially the same as Embodiment 1, except that the arrangement of the liquid crystal panel 20 and the display panel 10 is different.

Figure 10:
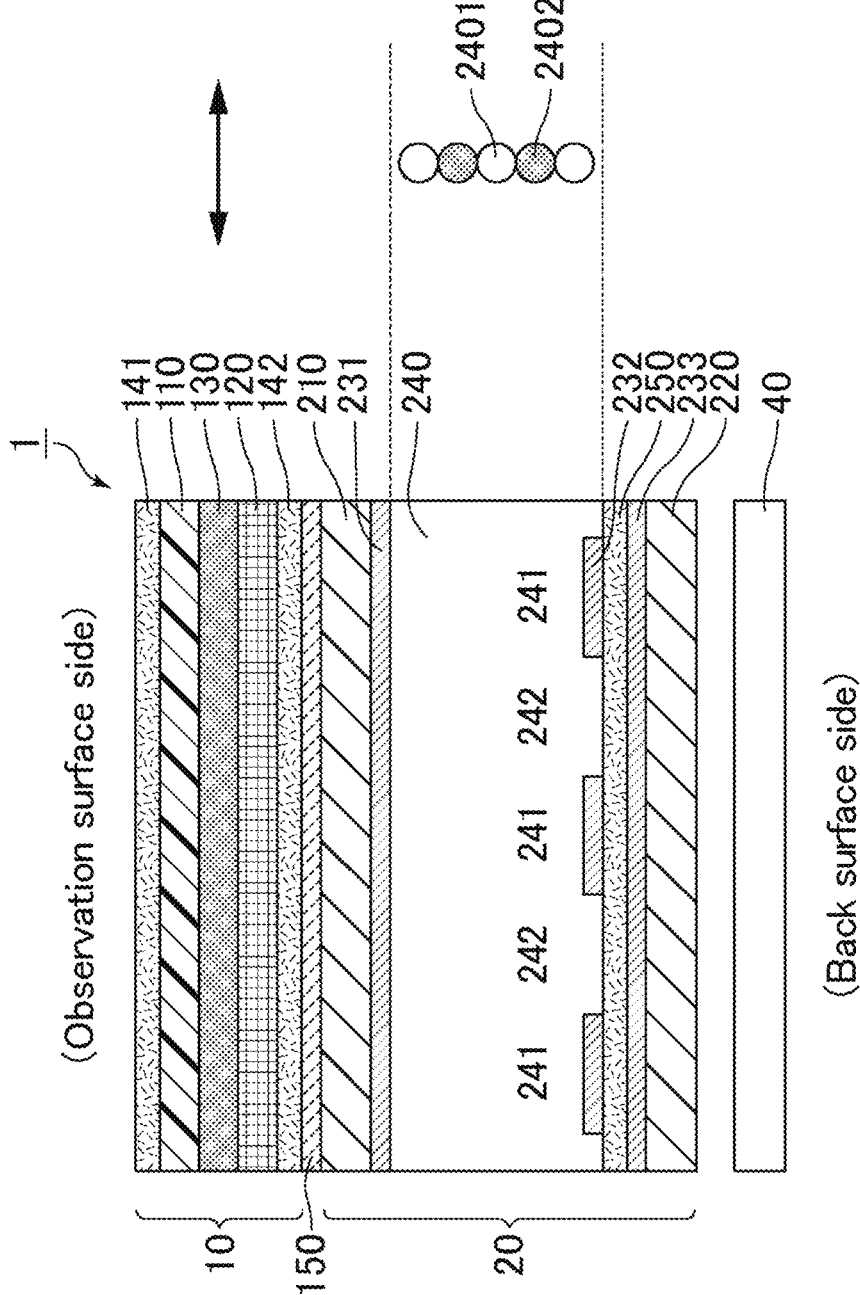
FIG. 10 is a schematic cross-sectional view of a video display device of Embodiment 3.

In the video display device 1 of Embodiment 1, the display panel 10 is arranged on the back surface side of the liquid crystal panel 20, but the display panel 10 may be arranged on the observation surface side of the liquid crystal panel 20. More specifically, the video display device 1 may be configured to include the display panel 10, the liquid crystal panel 20, and the backlight 40 in order from the observation surface side to the back surface side as illustrated in FIG. 10. FIG. 10 is a schematic cross-sectional view of a video display device of this embodiment.

In this embodiment, the polarizer (polarizer 142 in this embodiment) arranged on the liquid crystal panel 20 side opposite to the liquid crystal panel 20 of the polarizers possessed by the display panel 10 has the transmission axis arranged substantially vertically to the initial alignment direction of the liquid crystal molecules 2401 contained in the liquid crystal layer 240 of the liquid crystal panel 20 in plan view.

In this embodiment, the alignment of the liquid crystal molecules 2401 and the dichroic dye molecules 2402 in the liquid crystal layer 240 when no voltage is applied and the transmission axis direction (indicated by the arrow) of the polarizer 142 possessed by the display panel 10 are also indicated (front view) on the right side of FIG. 10 (schematic cross-sectional view). A view (plan view) in which the alignment of the liquid crystal molecules 2401 in the liquid crystal layer 240 when no voltage is applied is viewed from the observation surface side is illustrated in the column (i) of FIG. 2C. A view (plan view) in which the transmission axis direction of the polarizer 142 possessed by the display panel 10 is viewed from the observation surface side is illustrated in the column (ii) of FIG. 2C. It is found from FIG. 2C that the initial alignment direction (up-and-down direction in the drawing) of the liquid crystal molecules 2401 and the transmission axis direction (right-and-left direction in the drawing) of the polarizer 142 are arranged in the substantially vertical arrangement in plan view.

In this embodiment, light is incident on the liquid crystal panel 20 from the back surface side (specifically, backlight 40), and only light transmitting through the liquid crystal panel 20 is incident on the display panel 10. Also in this case, the wide viewing angle mode and the narrow viewing angle mode can be individually achieved substantially by the same principle as that of Embodiment 1.

Embodiment 4

This embodiment mainly describes the features peculiar to this embodiment, and omits a description overlapping with the description in Embodiment 1 given above. This embodiment is substantially the same as Embodiment 1, except that the liquid crystal panel 20 has a different layer structure (layer arrangement).

FIG. 11 is a schematic cross-sectional view of a video display device of this embodiment. In Embodiment 1, the liquid crystal panel 20 includes the first transparent substrate 210, the first electrode 231, the liquid crystal layer 240, the second electrodes 232, the interlayer insulating film 250, the third electrode 233, and the second transparent substrate 220 in order from the observation surface side to the back surface side (see FIG. 1, for example). In contrast thereto, in this embodiment, the liquid crystal panel 20 includes the first transparent substrate 210, the first electrode 231, the liquid crystal layer 240, the second electrodes 232, the interlayer insulating film 250, the third electrode 233, and the second transparent substrate 220 in order from the back surface side to the observation surface side (see FIG. 11). In other words, the liquid crystal panel 20 of this embodiment includes the second transparent substrate 220, the third electrode 233, the interlayer insulating film 250, the second electrodes 232, the liquid crystal layer 240, the first electrode 231, and the first transparent substrate 210 in order from the observation surface side to the back surface side.

The second electrodes 232 are arranged in a stripe shape in plan view, and the second electrodes 232 and the first electrode 231 are arranged opposite to each other with the liquid crystal layer 240 interposed therebetween. The liquid crystal panel 20 further includes the first voltage application unit 262 (not illustrated) which applies a voltage between the first electrode 231 and the second electrodes 232, and the second voltage application unit 261 (not illustrated) which applies a voltage between the first electrode 231 and the third electrode 233. On the display panel side (back surface side in this embodiment) of the liquid crystal panel 20, the polarizer 141 provided in the display panel 10 is arranged opposite to the liquid crystal panel 20.

In this embodiment, the polarizer (polarizer 141 in this embodiment) arranged on the liquid crystal panel 20 side opposite to the liquid crystal panel 20 of the polarizers possessed by the display panel 10 has the transmission axis arranged substantially vertically to the initial alignment direction of the liquid crystal molecules 2401 contained in the liquid crystal layer 240 of the liquid crystal panel 20 in plan view.

In this embodiment, the alignment of the liquid crystal molecules 2401 and the dichroic dye 2402 in the liquid crystal layer 240 when no voltage is applied and the transmission axis direction (indicated by the arrow) of the polarizer 142 possessed by the display panel 10 are also indicated (front view) on the right side of FIG. 11 (schematic cross-sectional view).

Modification of Embodiment 4

Figure 12:
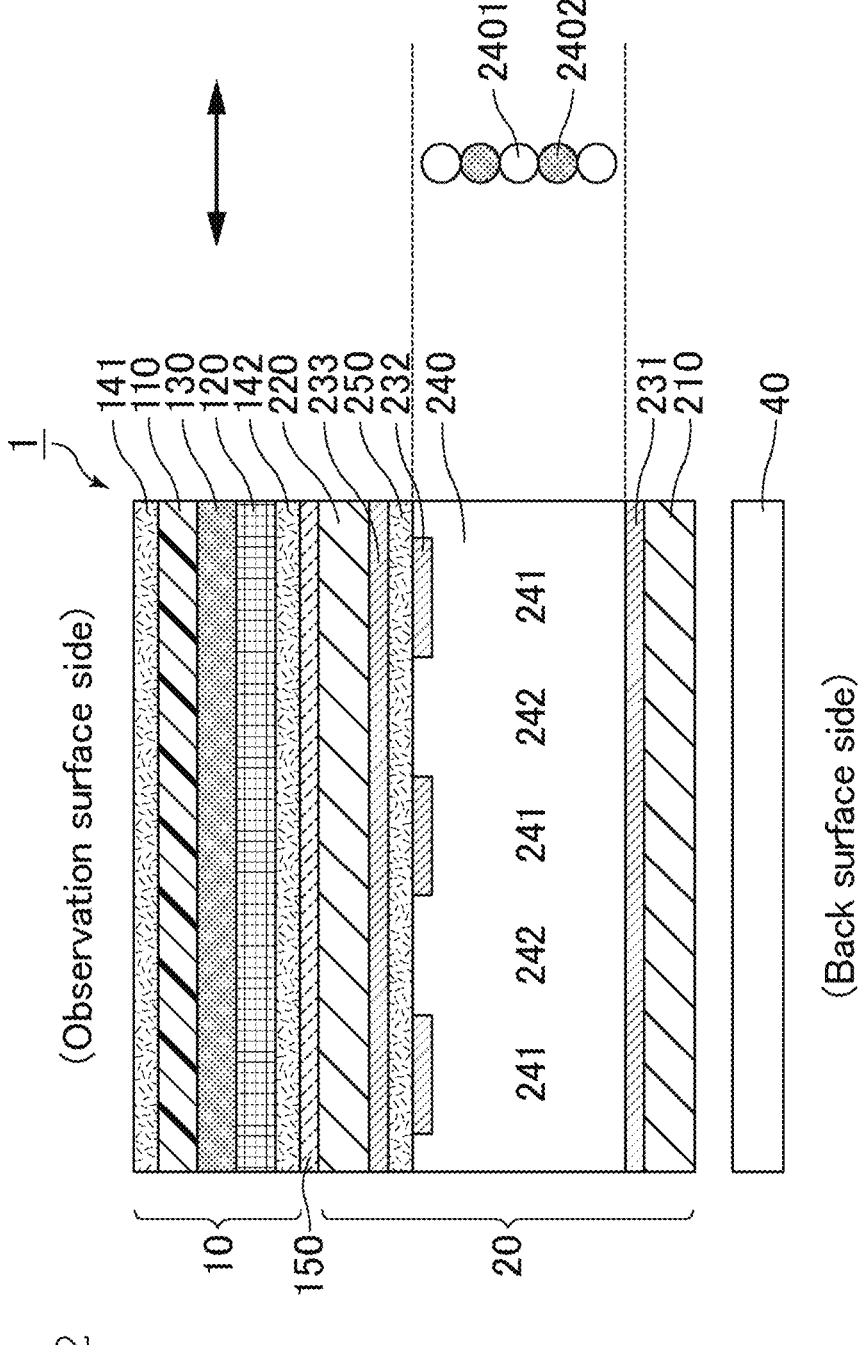
FIG. 12 is a schematic cross-sectional view of a video display device of a modified example of Embodiment 4.

Embodiment 4 describes the aspect in which the display panel 10 is arranged on the back surface side of the liquid crystal panel 20, but the display panel 10 may be arranged on the observation surface side of the liquid crystal panel 20. More specifically, an aspect may be acceptable in which the video display device 1 includes the display panel 10, the liquid crystal panel 20, and the backlight 40 in order from the observation surface side to the back surface side, and the liquid crystal panel 20 includes the second transparent substrate 220, the third electrode 233, the interlayer insulating film 250, the second electrodes 232, the liquid crystal layer 240, the first electrode 231, and the first transparent substrate 210 in order from the observation surface side to the back surface side (see FIG. 12). Also in this case, the polarizer (polarizer 142 in this embodiment) arranged on the liquid crystal panel 20 side opposite to the liquid crystal panel 20 of the polarizers possessed by the display panel 10 has the transmission axis arranged substantially vertically to the initial alignment direction of the liquid crystal molecules 2401 contained in the liquid crystal layer 240 of the liquid crystal panel 20 in plan view. FIG. 12 is a schematic cross-sectional view of the video display device in this example.

Embodiment 5

This embodiment mainly describes the features peculiar to this embodiment, and omits a description overlapping with the description in Embodiment 1 given above. This embodiment is substantially the same as Embodiment 1, except that the liquid crystal panel 20 has a different electrode structure.

Figure 13:
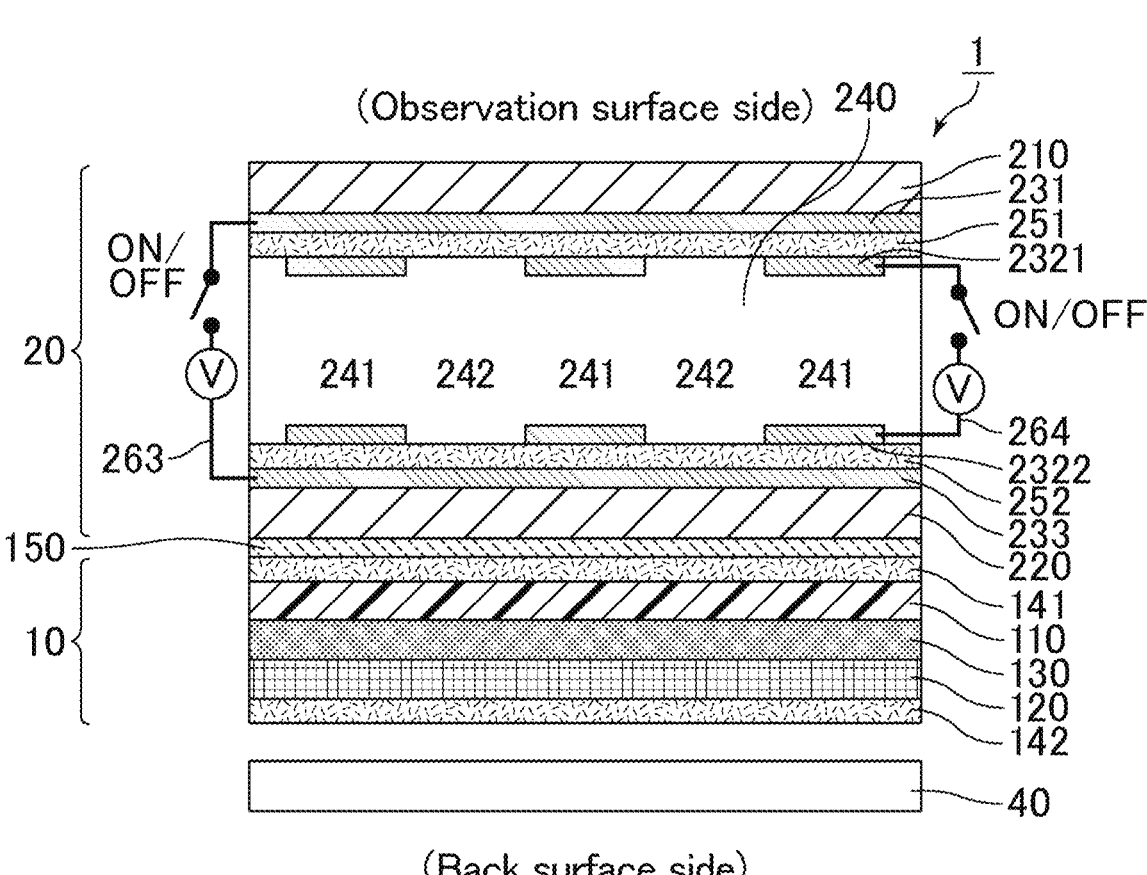
FIG. 13 is a schematic cross-sectional view of a video display device of Embodiment 5.
Figure 14A:
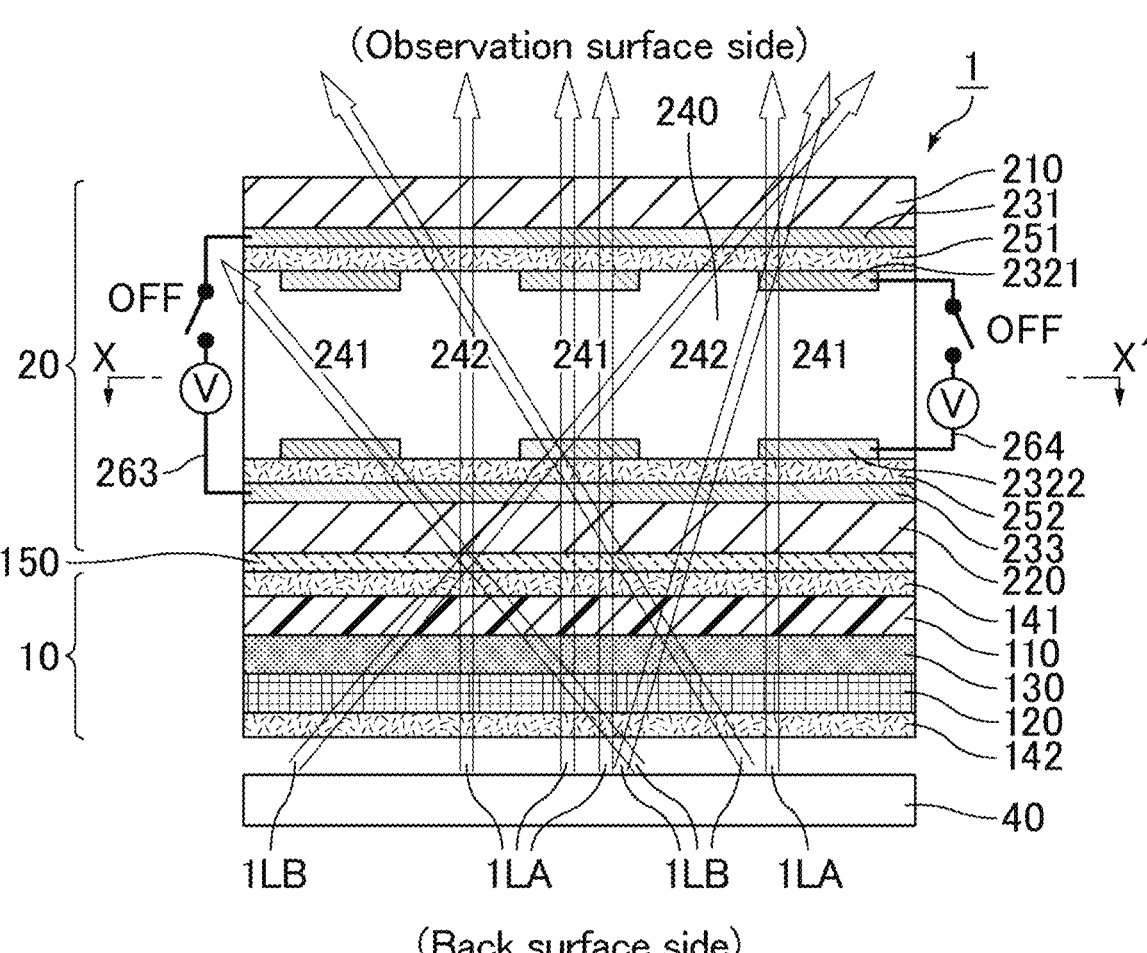
FIG. 14A is a schematic cross-sectional view illustrating the wide viewing angle mode of the video display device of Embodiment 5.
Figure 15A:
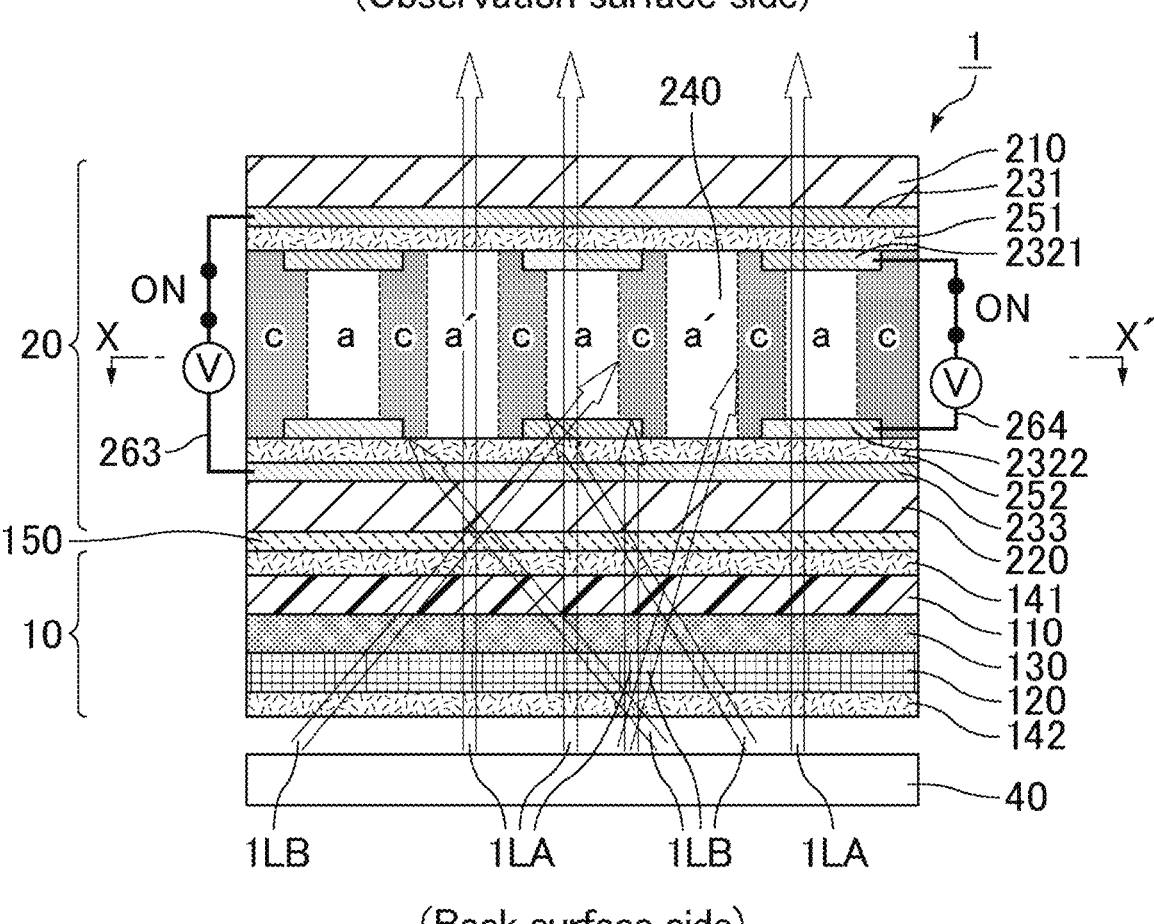
FIG. 15A is a schematic cross-sectional view illustrating the narrow viewing angle mode of the video display device of Embodiment 5.

FIG. 13 is a schematic cross-sectional view of a video display device of this embodiment. FIG. 14A is a schematic cross-sectional view illustrating the wide viewing angle mode of the video display device of this embodiment. FIG. 15A is a schematic cross-sectional view illustrating the narrow viewing angle mode of the video display device of this embodiment.

In this embodiment, the liquid crystal panel 20 includes the first transparent substrate 210, the first electrode 231, a first interlayer insulating film 251, second electrodes 2321, the liquid crystal layer 240, third electrodes 2322, a second interlayer insulating film 252, a fourth electrode 233, and the second transparent substrate 220 in order from the observation side to the back side as illustrated in FIG. 13. The liquid crystal panel 20 further includes a second voltage application unit 263 which applies a voltage between the first electrode 231 and the fourth electrode 233, and a first voltage application unit 264 which applies a voltage between the second electrodes 2321 and the third electrodes 2322. The polarizer 141 provided in the display panel 10 is arranged opposite to the liquid crystal panel 20 on the display panel 10 side (back surface side in this embodiment) of the liquid crystal panel 20.

The first electrode 231 is arranged in a planar manner over the entire surface of the first transparent substrate 210. More specifically, the first electrode 231 is a solid electrode covering the first transparent substrate 210. The fourth electrode 233 is arranged in a planar manner over the entire surface of the second transparent substrate 220. More specifically, the fourth electrode 233 is a solid electrode covering the second transparent substrate 220. The first electrode 231 and the fourth electrode 233 may be transparent electrodes. Examples of the transparent electrode are as described above.

The second electrodes 2321 are arranged in a stripe shape in plan view. The third electrodes 2322 are also arranged in a stripe shape in plan view. The second electrodes 2321 and the third electrodes 2322 are arranged substantially opposite to each other. In this embodiment, both the second electrodes 2321 and the third electrodes 2322 correspond to the electrodes A. Therefore, this embodiment also has a form in which the second electrodes 2321 correspond to the electrodes A and the third electrodes 2322 correspond to the electrode B or also has a form in which the third electrodes 2322 correspond to the electrodes A and the second electrodes 2321 correspond to the electrode B. The second electrodes 2321 and the third electrodes 2322 may be transparent electrodes. Examples of the transparent electrode are as described above.

The electrodes A (second electrodes 2321 and third electrodes 2322 in this embodiment) are arranged in a stripe shape in plan view and the second electrodes 2321 and the third electrodes 2322 are arranged substantially opposite to each other, so that the liquid crystal layer 240 has the overlapping regions 241 overlapping the second electrodes 2321 and the third electrodes 2322 and the non-overlapping regions 242 not overlapping the second electrodes 2321 and the third electrodes 2322.

This embodiment is designed to switch the switching regions between the transmission state and the absorption state by applying or not applying a voltage between the second electrodes 2321 and the third electrodes 2322 (264) and applying or not applying a voltage between the first electrode 231 and the fourth electrode 233 (263). Boundary portions (corresponding to c in FIG. 15A) between the overlapping regions 241 and the non-overlapping regions 242 serve as the switching regions. Portions (corresponding to a in FIG. 15A) obtained by excluding the boundary portions c from the overlapping regions 241 and portions (corresponding to a' in FIG. 15A) obtained by excluding the boundary portions c from the non-overlapping regions 242 serve as the transparent regions. The voltage application unit may be a power supply that can be turned on and off.

In this embodiment, the liquid crystal layer 240 has a certain degree of transmittance T1 in the wide viewing angle mode (see FIGS. 14A and 14B) as described later. In the narrow viewing angle mode (see FIGS. 15A and 15B), the transparent regions a and a' in FIG. 15A have transmittances T2 and T3, respectively, and the switching regions c in FIG. 15A have a transmittance T4 due to the absorption. T1, T2, T3, and T4 satisfy the relationships of "T1≥T2>T4" and "T1≥T3>T4". The relative magnitudes of T2 and T3 are not limited.

The transmittance T1 may be 100%. The transmittance T4 may be 0%.

Figure 14B:
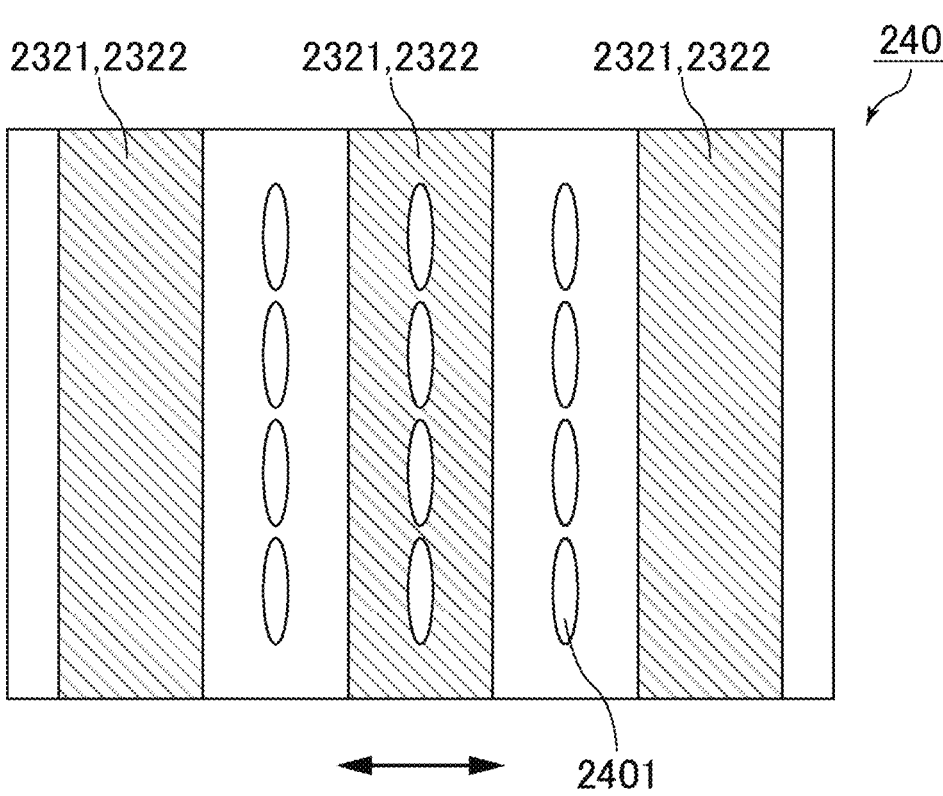
FIG. 14B is a view for explaining the alignment direction of the liquid crystal molecules 2401 in the wide viewing angle mode according to the video display device of Embodiment 5.
Figure 15B:
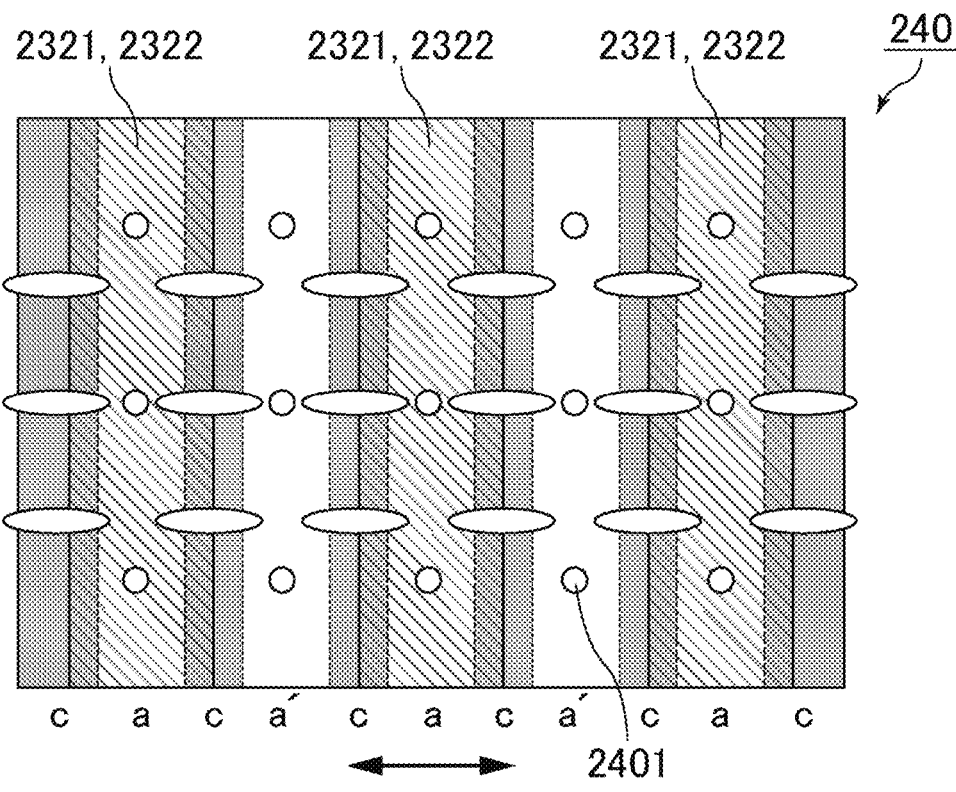
FIG. 15B is a view for explaining the alignment direction of the liquid crystal molecules 2401 in the narrow viewing angle mode according to the video display device of Embodiment 5.

FIG. 14B is a view for explaining the alignment direction (initial alignment direction) of the liquid crystal molecules 2401 in the wide viewing angle mode (FIG. 14A) of this embodiment. Specifically, FIG. 14B is a view (plan view) of a X-X' portion of the liquid crystal layer 240 in FIG. 14A viewed from the observation surface side. At the bottom of FIG. 14B, the transmission axis direction (plan view) of the polarizer 141 possessed by the display panel 10 is indicated by the arrow. FIG. 15B is a view for explaining the alignment direction of the liquid crystal molecules 2401 in the narrow viewing angle mode (FIG. 15A) of this embodiment. Specifically, FIG. 15B is a view (plan view) of a X-X' portion of the liquid crystal layer 240 in FIG. 15A viewed from the observation surface side. At the bottom of FIG. 15B, the transmission axis direction (plan view) of the polarizer 141 possessed by the display panel 10 is indicated by the arrow.

As illustrated in FIGS. 14A and 15A, light is incident on the liquid crystal panel 20 via the display panel 10 from the back surface side (specifically the backlight 40). Herein, the liquid crystal layer 240 itself acts as the louver in a state where a region different in the alignment of the liquid crystal molecules 2401 appears in the liquid crystal layer 240 (i.e., region different in the electric field appears in the liquid crystal layer 240) in plan view. More specifically, the light 1LB in the oblique direction and part of the light 1LA in the front direction out of the light incident on the liquid crystal layer 240 from the backlight 40 are absorbed (attenuated) in the boundary portions (c regions in FIG. 15A) between the overlapping regions 241 and the non-overlapping regions 242 and are transmitted as the attenuated light through the liquid crystal panel 20 (see FIG. 15A). Specifically, mainly in the regions (a regions in FIG. 15A) corresponding to the overlapping regions 241, longitudinal electric fields are generated between the second electrodes 2321 and the third electrodes 2322, and the liquid crystal molecules 2401 are aligned substantially vertically (front view) to the transmission axis of the polarizer 141 of the liquid panel 10, and therefore the incident light is transmitted without being absorbed. Mainly in the regions (a' regions in FIG. 15A) corresponding to the non-overlapping regions 242, longitudinal electric fields are generated between the first electrode 231 and the fourth electrode 233, and the liquid crystal molecules 2401 are aligned substantially vertically (front view) to the transmission axis of the polarizer 141 of the liquid panel 10, and therefore the incident light is transmitted without being absorbed. In contrast thereto, in the boundary portions (c regions in FIG. 15A) between the overlapping regions 241 and the non-overlapping regions 242, transverse electric fields are generated between the first electrode 231 and the second electrodes 2321 and between the third electrodes 2322 and the fourth electrode 233, so that the alignment direction of the liquid crystal molecules 2401 is changed by about 90° in plan view. Therefore, the liquid crystal molecules 2401 are aligned along the electric field direction. In this case, the polarization direction of the light incident through the polarizer 141 of the display panel 10 and the alignment direction of the liquid crystal molecules 2401 are matched with each other, and therefore the incident light is absorbed.

In a state where the region different in the alignment of the liquid crystal molecules 2401 does not appear in the liquid crystal layer 240 in plan view, the polarization direction of the light incident on the liquid crystal layer 240 and the alignment direction of the liquid crystal molecules 2401 in the liquid crystal layer 240 are arranged in a substantially orthogonal arrangement (also referred to as substantially vertical arrangement) in plan view (see FIG. 14B), and therefore the incident light is not absorbed in the liquid crystal layer 240. More specifically, the liquid crystal layer 240 is integrated, and the entire liquid crystal layer 240 enters the transmission state (constitutes a transparent region) (see FIG. 14A). More specifically, the liquid crystal layer 240 enters a state of having the transmittance T1. In this case, omnidirectional light from the backlight 40 is transmitted through the liquid crystal panel 20 (see FIG. 14A). As a result, the light from the back surface side can be transmitted without loss from the low polar angle side to the high polar angle side, and therefore the wide viewing angle mode can be achieved with high luminance.

Herein, to cause the region different in the alignment of the liquid crystal molecules 2401 to appear in the liquid crystal layer 240 (i.e., to cause a region different in the electric field to appear in the liquid crystal layer 240) in plan view, it is important that a voltage difference V1 between the first electrode 231 and the fourth electrode 233, a voltage difference V2 between the second electrodes 2321 and the third electrodes 2322, a voltage difference V3 between the first electrode 231 and the second electrodes 2321, and a voltage difference V4 between the third electrodes 2322 and the fourth electrode 233 are all in sufficient ranges. Thus, by bringing the liquid crystal layer 240 into a state where the region different in the alignment of the liquid crystal molecules 2401 appears in the liquid crystal layer 240, the liquid crystal layer 240 itself acts as the louver. Specifically, V1, V2, V3, and V4 each have a value exceeding 0 V. V1, V2, V3, and V4 each preferably are 2 V or more. The voltage differences V1 and V2 correspond to the voltages of the longitudinal electric fields, and the voltage differences V3 and V4 correspond to the voltages of the transverse electric fields.

Effective voltage application examples of this embodiment include the following aspect.

Figure 15C:
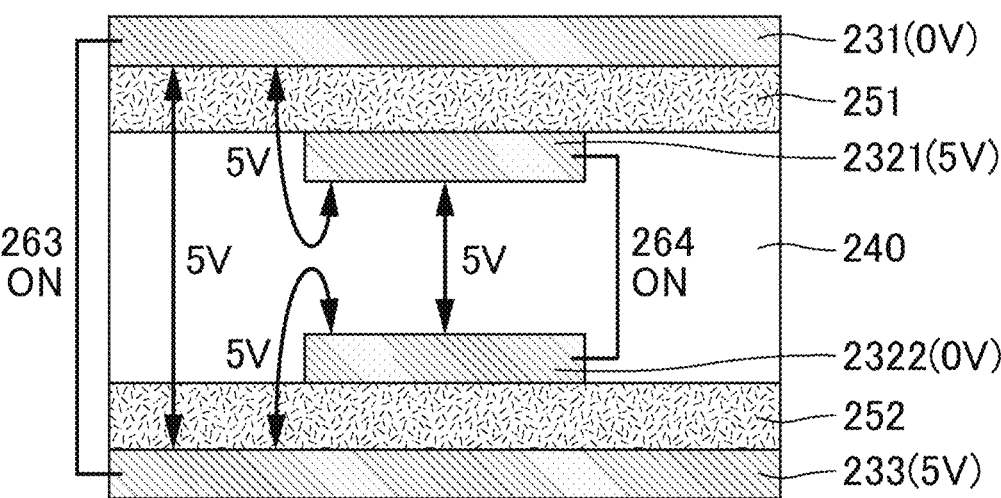
FIG. 15C is an effective voltage application example of the video display device of Embodiment 5.
Figure 15D:
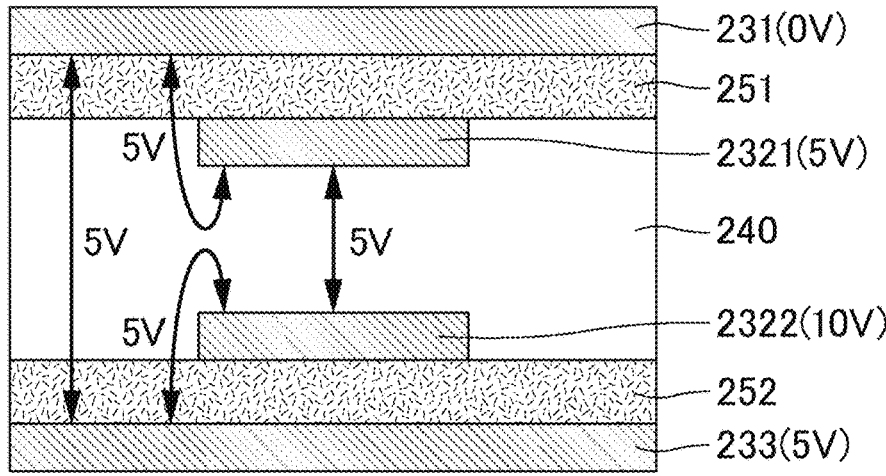
FIG. 15D is an effective voltage application example of the video display device of Embodiment 5.

Examples in which the voltages of the longitudinal electric fields and the transverse electric fields are the same include an aspect in which input voltages to the first electrode 231, the second electrode 2321, the third electrode 2322, and the fourth electrode 233 are set to 0 V, 5 V, 0 V, and 5 V, respectively, as illustrated in FIG. 15C and an aspect in which the input voltages to the first electrode 231, the second electrode 2321, the third electrode 2322, and the fourth electrode 233 are set to 0 V, 5 V, 10 V, and 5 V, respectively, as illustrated in FIG. 15D, for example. In these cases, V1, V2, V3, and V4 are all 5 V.

Figure 15E:
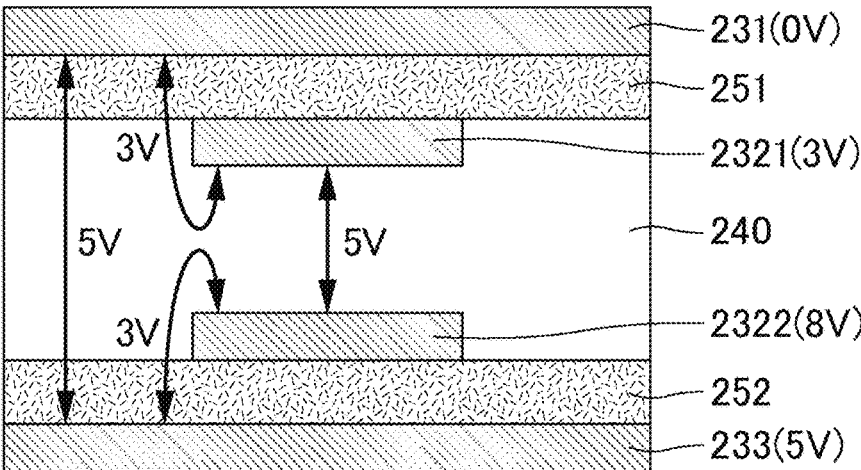
FIG. 15E is an effective voltage application example of the video display device of Embodiment 5.
Figure 15F:
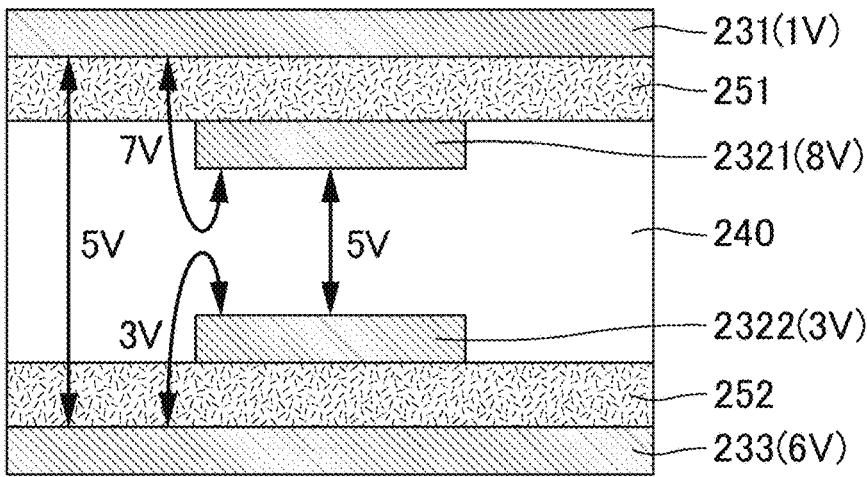
FIG. 15F is an effective voltage application example of the video display device of Embodiment 5.

Examples in which the voltages of the longitudinal electric fields are the same include an aspect in which the input voltages to the first electrode 231, the second electrode 2321, the third electrode 2322, and the fourth electrode 233 are set to 0 V, 3 V, 8 V, and 5 V, respectively, as illustrated in FIG. 15E and an aspect in which the input voltages to the first electrode 231, the second electrode 2321, the third electrode 2322, and the fourth electrode 233 are set to 1 V, 8 V, 3 V, and 6 V, respectively, as illustrated in FIG. 15F, for example. In the former aspect, V1 and V2 are 5 V and V3 and V4 are 3V. In the latter aspect, V1 and V2 are 5 V, V3 is 7 V, and V4 is 3 V.

Figure 15G:
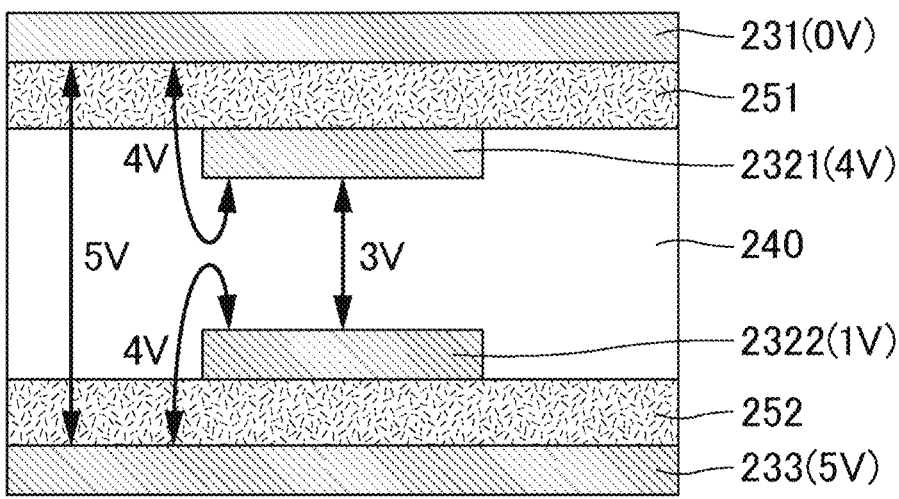
FIG. 15G is an effective voltage application example of the video display device of Embodiment 5.

Examples in which the voltages of the transverse electric fields are the same include an aspect in which the input voltages to the first electrode 231, the second electrode 2321, the third electrode 2322, and the fourth electrode 233 are set to 0 V, 4 V, 1 V, and 5 V, respectively, as illustrated in FIG. 15G, for example. In this case, V1 is 5 V, V2 is 3 V, and V3 and V4 are 4 V.

FIGS. 15C to 15G illustrate the effective voltage application examples of this embodiment. Herein, FIGS. 15C to 15G are examples in which such liquid crystal molecules that the alignment of the liquid crystal molecules sufficiently follows, under the voltage of 3 V, the voltage are used. In these drawings, a portion from the first electrode 231 to the fourth electrode 233 of the liquid crystal panel 20 is focused and illustrated. In each drawing, the voltage value described in the parentheses next to each reference numeral indicating the electrode is the input voltage to the electrode. The voltage values (values attached to the arrows) in the drawings are the voltage differences between the voltages. In FIGS. 15D to 15G, the voltage application units 263 and 264 are omitted.

In contrast thereto, when the voltages of the transverse electric fields are 0 V (e.g., an aspect in which the input voltages to the first electrode 231, the second electrode 2321, the third electrode 2322, and the fourth electrode 233 are set to 5 V, 5 V, 0 V, and 0 V, respectively, or an aspect in which the input voltages to the first electrode 231, the second electrode 2321, the third electrode 2322, and the fourth electrode 233 are set to 0 V, 0 V, 5 V, and 5 V, respectively), the region different in the electric field is not generated in the liquid crystal layer 240. More specifically, the liquid crystal layer 240 enters a state in which the longitudinal electric fields are simply applied, and therefore the liquid crystal layer 240 cannot act as the louver. Cases where the voltages of the longitudinal electric fields and/or the transverse electric fields are 1 V (e.g., an aspect in which the input voltages to the first electrode 231, the second electrode 2321, the third electrode 2322, and the fourth electrode 233 are set to 0 V, 1 V, 0 V, and 1 V, respectively, an aspect in which the input voltages to voltages to the first electrode 231, the second electrode 2321, the third electrode 2322, and the fourth electrode 233 are set to 5 V, 4 V, 0 V, and 1 V, respectively, and an aspect in which the input voltages to voltages to the first electrode 231, the second electrode 2321, the third electrode 2322, and the fourth electrode 233 are set to 0 V, 5 V, 6 V, and 1 V, respectively) are also not effective for causing the louver function by the liquid crystal layer 240 to exhibit.

By switching the voltages or changing the input voltages as appropriate as described above, the regions in the absorption state (switching regions) and the regions in the transmission state (transparent regions) can be formed. Specifically, the regions a and a' in FIG. 15A remain in the transmission state, while the c regions in FIG. 15A enter the absorption state. More specifically, the liquid crystal layer 240 enters a state in which the transparent regions a and a' in FIG. 15A have the transmittances T2 and T3, respectively, and the switching regions c in FIG. 15A have the transmittance T4 due to the absorption (T1≥T2>T4 and T1≥T3>T4). The light 1LA in the front direction out of the light incident on the liquid crystal panel 20 from the backlight 40 is transmitted through the liquid crystal panel 20 without being attenuated (see FIG. 15A). As a result, the light from the backlight 40 is attenuated on the high polar angle side, and the light from the back surface side can be transmitted with the same luminance only on the low polar angle side, and therefore the narrow viewing angle mode can be achieved.

Embodiment 6

This embodiment mainly describes the features peculiar to this embodiment, and omits a description overlapping with the description in Embodiment 1 given above. This embodiment is substantially the same as Embodiment 1, except that the liquid crystal panel 20 has a different electrode structure.

Figure 16:
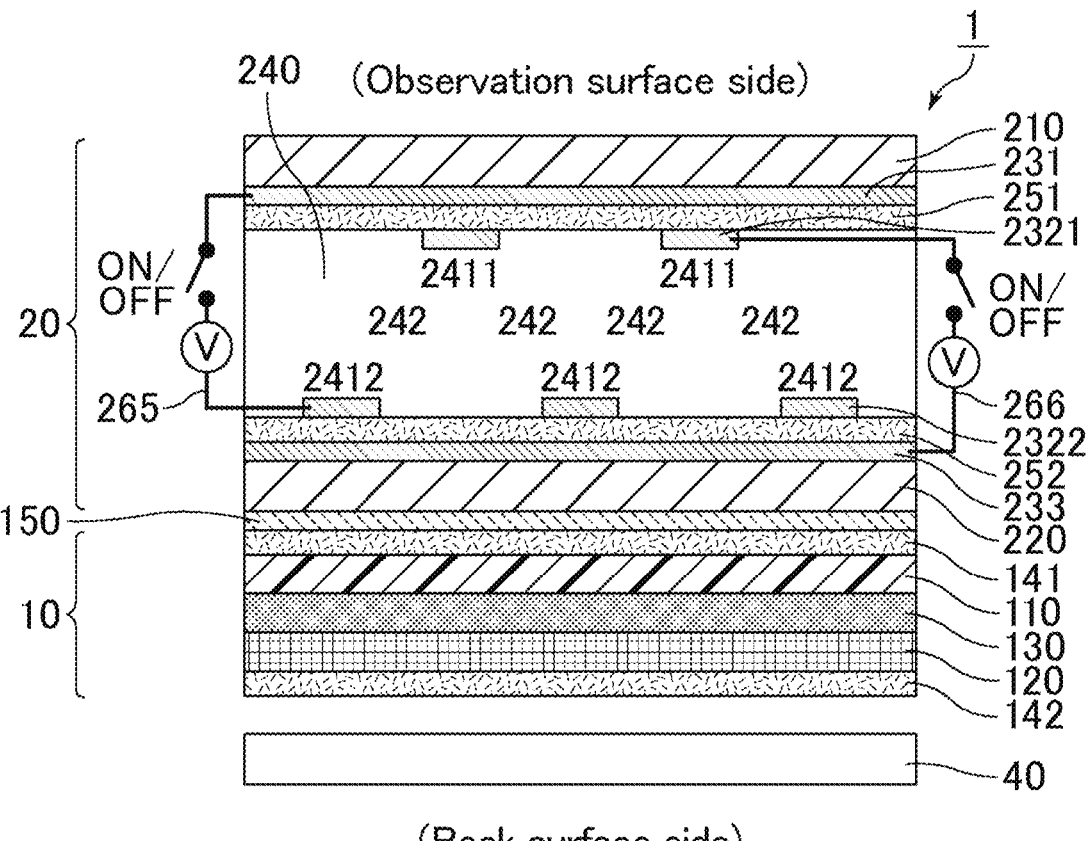
FIG. 16 is a schematic cross-sectional view of a video display device of Embodiment 6.
Figure 17A:
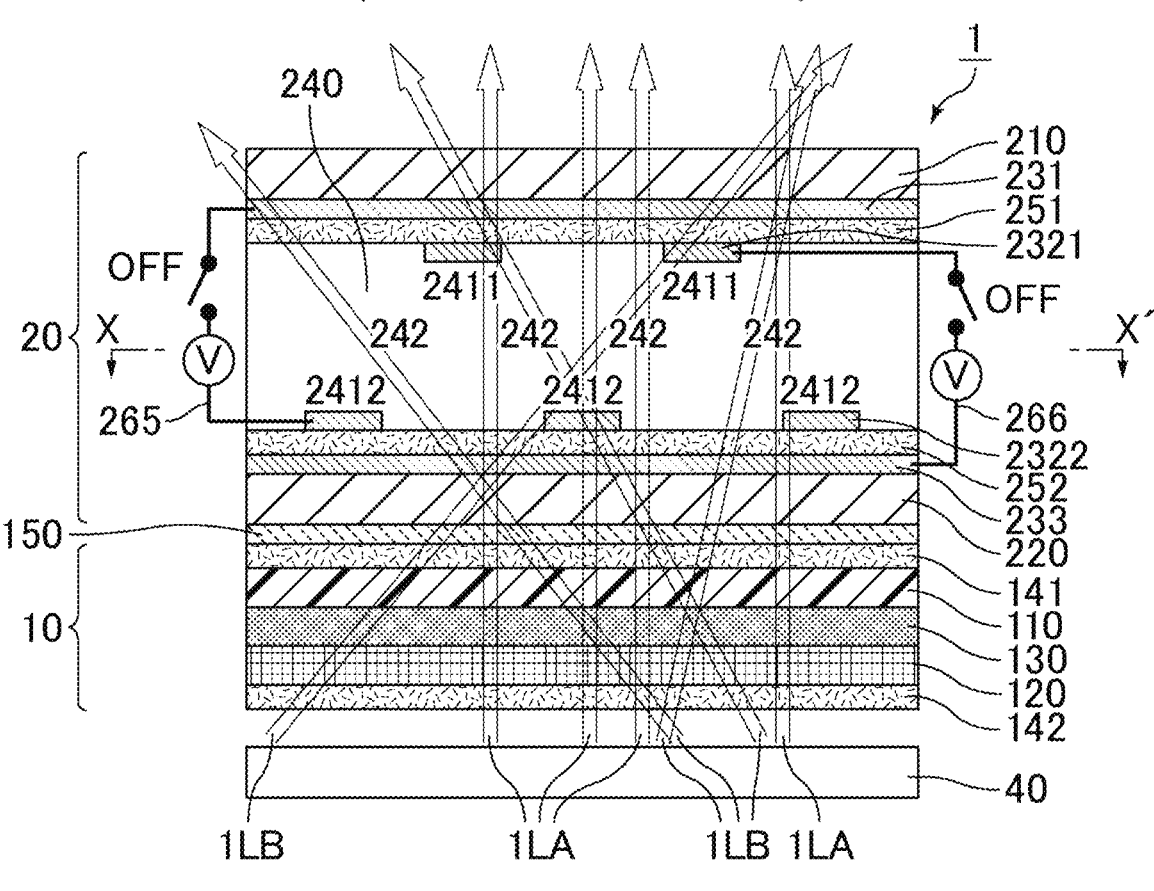
FIG. 17A is a schematic cross-sectional view illustrating the wide viewing angle mode of the video display device of Embodiment 6.
Figure 18A:
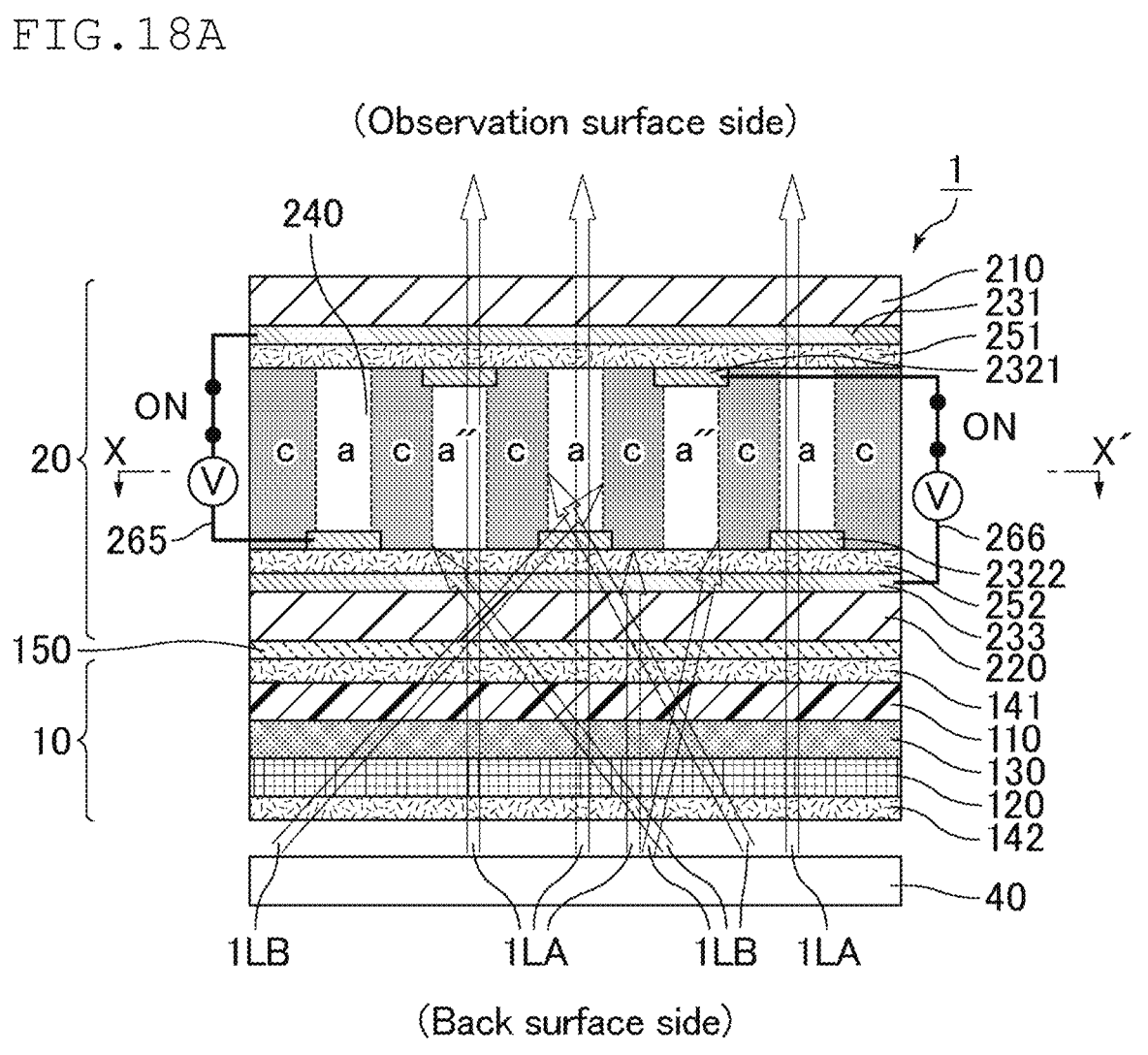

FIG. 16 is a schematic cross-sectional view of a video display device of this embodiment. FIG. 17A is a schematic cross-sectional view illustrating the wide viewing angle mode of the video display device of this embodiment. FIG. 18A is a schematic cross-sectional view illustrating the narrow viewing angle mode of the video display device of this embodiment.

In this embodiment, the liquid crystal panel 20 includes the first transparent substrate 210, the first electrode 231, the first interlayer insulating film 251, the second electrodes 2321, the liquid crystal layer 240, the third electrodes 2322, the second interlayer insulating film 252, the fourth electrode 233, and the second transparent substrate 220 in order from the observation surface side to the back surface side as illustrated in FIG. 16. The liquid crystal panel 20 further includes a first voltage application unit 265 which applies a voltage between the first electrode 231 and the third electrodes 2322 and a second voltage application unit 266 which applies a voltage between the second electrodes 2321 and the fourth electrode 233. The polarizer 141 provided in the display panel 10 is arranged opposite to the liquid crystal panel 20 on the display panel 10 side (back surface side in this embodiment) of the liquid crystal panel 20.

The first electrode 231 is arranged in a planar manner over the entire surface of the first transparent substrate 210. More specifically, the first electrode 231 is a solid electrode covering the first transparent substrate 210. The fourth electrode 233 is arranged in a planar manner over the entire surface of the second transparent substrate 220. More specifically, the fourth electrode 233 is a solid electrode covering the second transparent substrate 220. The first electrode 231 and the fourth electrode 233 may be transparent electrodes. Examples of the transparent electrode are as described above.

The second electrodes 2321 are arranged in a stripe shape in plan view. The third electrodes 2322 are also arranged in a stripe shape in plan view. The second electrodes 2321 and the third electrodes 2322 are arranged in a staggered manner so as not to be opposite to each other. More specifically, the third electrodes 2322 are arranged in the non-overlapping regions of the second electrodes 2321 and the second electrodes 2321 are arranged in the non-overlapping regions of the third electrodes 2322 (see FIG. 16). In this embodiment, both the second electrodes 2321 and the third electrodes 2322 correspond to the electrodes A. Therefore, this embodiment also has a form in which the second electrodes 2321 correspond to the electrodes A and the fourth electrode 233 corresponds to the electrode B or also has a form in which the third electrodes 2322 correspond to the electrodes A and the first electrode 231 corresponds to the electrode B. The second electrodes 2321 and the third electrodes 2322 may be transparent electrodes. Examples of the transparent electrode are as described above.

The electrodes A (second electrodes 2321 and third electrodes 2322 in this embodiment) are arranged in a stripe shape in plan view and the second electrodes 2321 and the third electrodes 2322 are arranged so as not to be opposite to each other, so that the liquid crystal layer 240 has overlapping regions 2411 overlapping the second electrodes 2321, overlapping regions 2412 overlapping the third electrodes 2322, and the non-overlapping regions 242 not overlapping the second electrodes 2321 and the third electrodes 2322.

The width of the electrodes A can be appropriately set considering the desired switching effect or the desired viewing angle. For example, a ratio (W1/W2) between the width W1 of the non-overlapping regions 242 not overlapping the second electrodes 2321 and the third electrodes 2322 and the width W2 of either the overlapping regions 2412 overlapping the second electrodes 2321 or the overlapping regions 2411 overlapping the third electrodes 2322 may be ½ to 1/20 or may be ⅓ to 1/10.

This embodiment is designed to switch the switching regions between the transmission state and the absorption state by applying or not applying a voltage between the first electrode 231 and the third electrodes 2322 (265) and applying or not applying a voltage between the second electrodes 2321 and the fourth electrode 233 (266). The non-overlapping regions 242 (corresponding to c in FIG. 18A) serve as the switching regions. The overlapping regions 2411 (corresponding to a″ in FIG. 18A) overlapping the second electrodes 2321 and the overlapping regions 2412 (corresponding to a in FIG. 18A) overlapping the third electrodes 2322 serve as the transparent regions. Although not explicitly illustrated in the figure, boundary portions between the non-overlapping regions 242 and the overlapping regions 2411 or the overlapping regions 2412 also serve as the switching regions. The voltage application unit may be a power supply that can be turned on and off.

In this embodiment, the liquid crystal layer 240 has a certain degree of transmittance T1 in the wide viewing angle mode (see FIGS. 17A and 17B) as described later. The transparent regions a and a″ in FIG. 18A have transmittances T2 and T3, respectively, and the switching regions c in FIG. 18A have a transmittance T4 due to the absorption in the narrow viewing angle mode (see FIGS. 18A and 18B). T1, T2, T3, and T4 satisfy the relationships of "T1≥T2>T4" and "T1≥T3>T4". The relative magnitudes of T2 and T3 are not limited.

The transmittance T1 may be 100%. The transmittance T4 may be 0%.

Figure 17B:
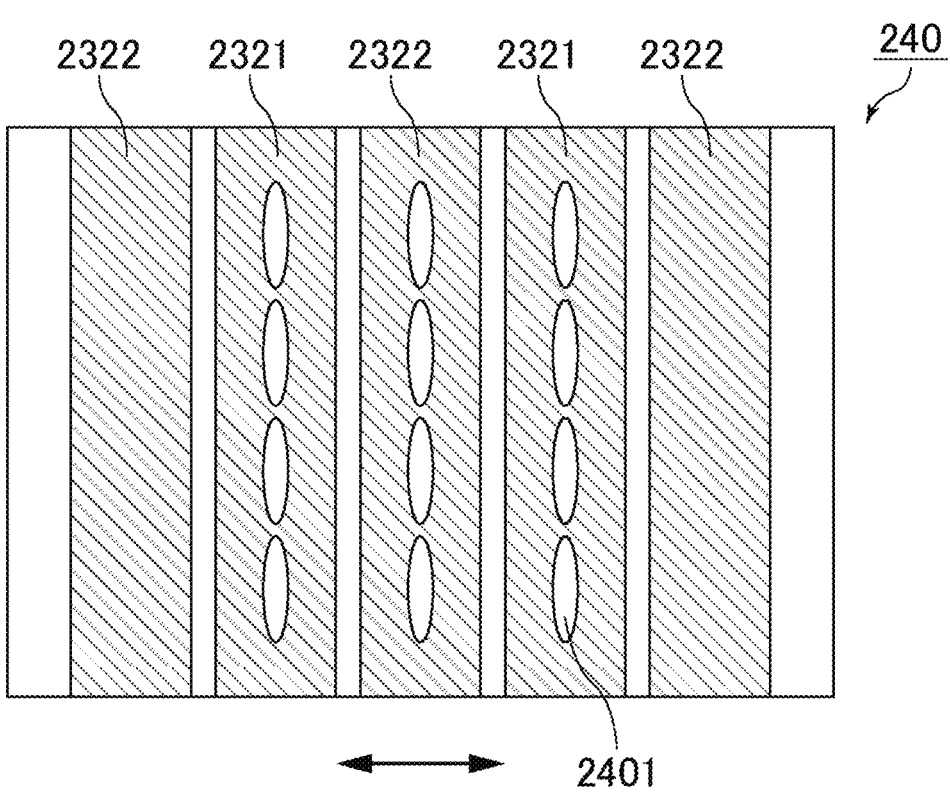
FIG. 17B is a view for explaining the alignment direction of the liquid crystal molecules 2401 in the wide viewing angle mode according to the video display device of Embodiment 6.
Figure 18B:
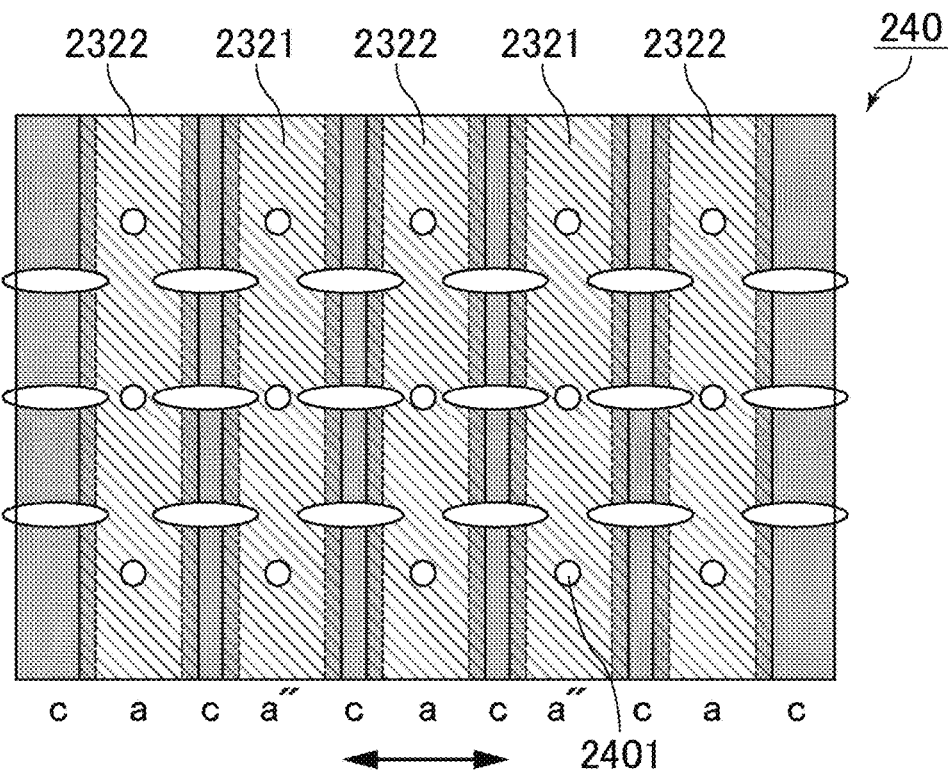
FIG. 18B is a view for explaining the alignment direction of the liquid crystal molecules 2401 in the narrow viewing angle mode according to the video display device of Embodiment 6.

FIG. 17B is a view for explaining the alignment direction (initial alignment direction) of the liquid crystal molecules 2401 in the wide viewing angle mode (FIG. 17A) of this embodiment. Specifically, FIG. 17B is a view (plan view) of a X-X′ portion of the liquid crystal layer 240 in FIG. 17A viewed from the observation surface side. At the bottom of FIG. 17B, the transmission axis direction (plan view) of the polarizer 141 possessed by the display panel 10 is indicated by the arrow. FIG. 18B is a view for explaining the alignment direction of the liquid crystal molecules 2401 in the narrow viewing angle mode (FIG. 18A) of this embodiment. Specifically, FIG. 18B is a view (plan view) of a X-X′ portion of the liquid crystal layer 240 in FIG. 18A viewed from the observation surface side. At the bottom of FIG. 18B, the transmission axis direction (plan view) of the polarizer 141 possessed by the display panel 10 is indicated by the arrow.

As illustrated in FIGS. 17A and 18A, light is incident on the liquid crystal panel 20 via the display panel 10 from the back surface side (specifically the backlight 40). In a state where no voltage is applied between the first electrode 231 and the third electrodes 2322 (265) and no voltage is applied also between the second electrodes 2321 and the fourth electrode 233 (266) (state where no voltage is applied), the polarization direction of the light incident on the liquid crystal layer 240 and the alignment direction of the liquid crystal molecules 2401 in the liquid crystal layer 240 are arranged in the substantially orthogonal arrangement (see FIG. 17B) in plan view, and therefore the incident light is not absorbed in the liquid crystal layer 240. More specifically, the liquid crystal layer 240 is integrated, and the entire liquid crystal layer 240 enters the transmission state (constitutes a transparent region) (see FIG. 17A). More specifically, the liquid crystal layer 240 enters a state of having the transmittance T1. In this case, omnidirectional light from the backlight 40 is transmitted through the liquid crystal panel 20 (see FIG. 17A). As a result, the light from the back surface side can be transmitted without loss from the low polar angle side to the high polar angle side, and therefore the wide viewing angle mode can be achieved with high luminance.

In a state where a voltage is applied between the first electrode 231 and the third electrodes 2322 (265) and a voltage is applied also between the second electrodes 2321 and the fourth electrode 233 (266) (state where a voltage is applied), the liquid crystal layer 240 itself acts as the louver. More specifically, the light 1LB in the oblique direction and part of the light 1LA in the front direction out of the light incident on the liquid crystal layer 240 from the backlight 40 are absorbed (attenuated) in the non-overlapping regions 242 (c regions in FIG. 18A) and are transmitted as the attenuated light through the liquid crystal panel 20 (see FIG. 18A). Specifically, in the overlapping regions 2412 (a regions in FIG. 18A), longitudinal electric fields are generated between the first electrode 231 and the third electrodes 2322, and the liquid crystal molecules 2401 are aligned substantially vertically (front view) to the transmission axis of the polarizer 141 of the liquid panel 10, and therefore the incident light is transmitted without being absorbed. In the overlapping regions 2411 (a″ regions in FIG. 18A), longitudinal electric fields are generated between the second electrodes 2321 and the fourth electrode 233, and the liquid crystal molecules 2401 are aligned substantially vertically (front view) to the transmission axis of the polarizer 141 of the liquid panel 10, and therefore the incident light is transmitted without being absorbed. In contrast thereto, in the non-overlapping regions (c regions in FIG. 18A), transverse electric fields are generated between the first electrode 231 and the second electrodes 2321 and between the third electrode 2322 and the fourth electrode 233, so that the alignment direction of the liquid crystal molecules 2401 is changed by about 90° in plan view. Therefore, the liquid crystal molecules 2401 are aligned along the electric field direction. In this case, the polarization direction of the light incident through the polarizer 141 of the display panel 10 and the alignment direction of the liquid crystal molecules 2401 are matched with each other, and therefore the incident light is absorbed.

By switching the voltages as described above, the regions in the absorption state (switching regions) and the regions in the transmission state (transparent regions) can be formed. Specifically, the a and a" regions in FIG. 18A remain in the transmission state, while the c regions in FIG. 18A enter the absorption state. More specifically, the liquid crystal layer 240 enters a state in which the transparent regions a and a" in FIG. 18A have the transmittances T2 and T3, respectively, and the switching regions c in FIG. 18A have the transmittance T4 due to the absorption ($T1 \geq T2 > T4$ and $T1 \geq T3 > T4$). Further, the light 1LA in the front direction out of the light incident on the liquid crystal panel 20 from the backlight 40 is transmitted through the liquid crystal panel 20 without being attenuated (see FIG. 18A). As a result, the light from the backlight 40 is attenuated on the high polar angle side, and the light from the back surface side can be transmitted with the same luminance only on the low polar angle side, and therefore the narrow viewing angle mode can be achieved.

Embodiment 7

This embodiment mainly describes the features peculiar to this embodiment, and omits a description overlapping with the description in Embodiment 1 given above. This embodiment is substantially the same as Embodiment 1, except that the liquid crystal panel 20 has a different electrode structure.

Figure 19:
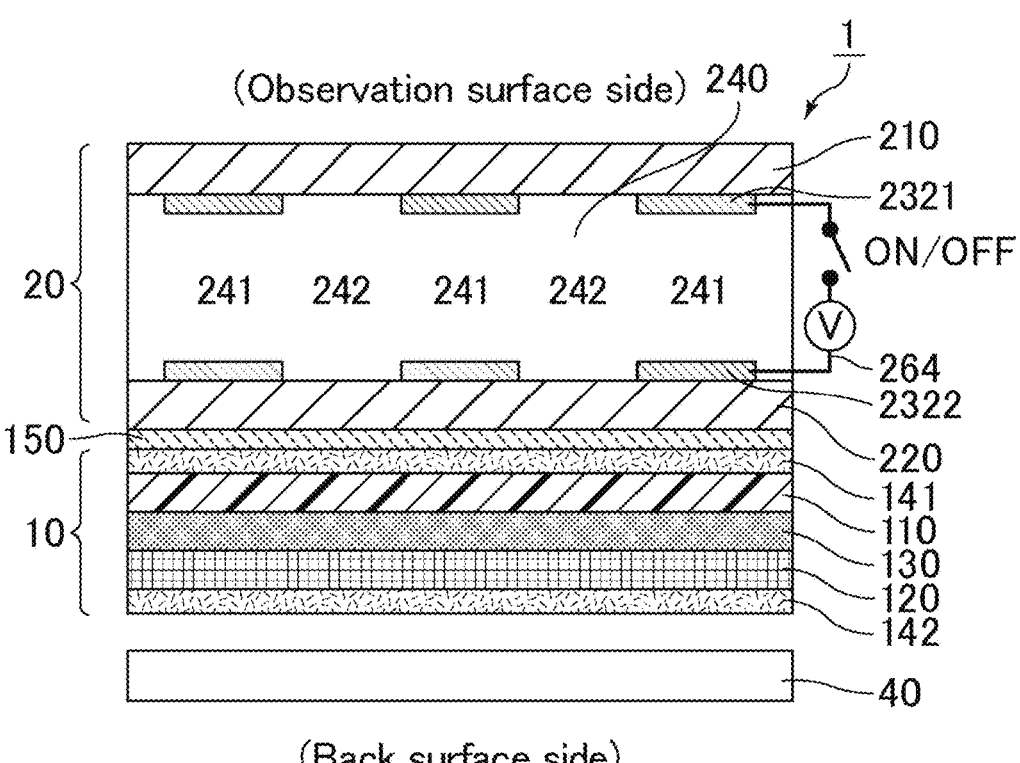
FIG. 19 is a schematic cross-sectional view of a video display device of Embodiment 7.
Figure 20A:
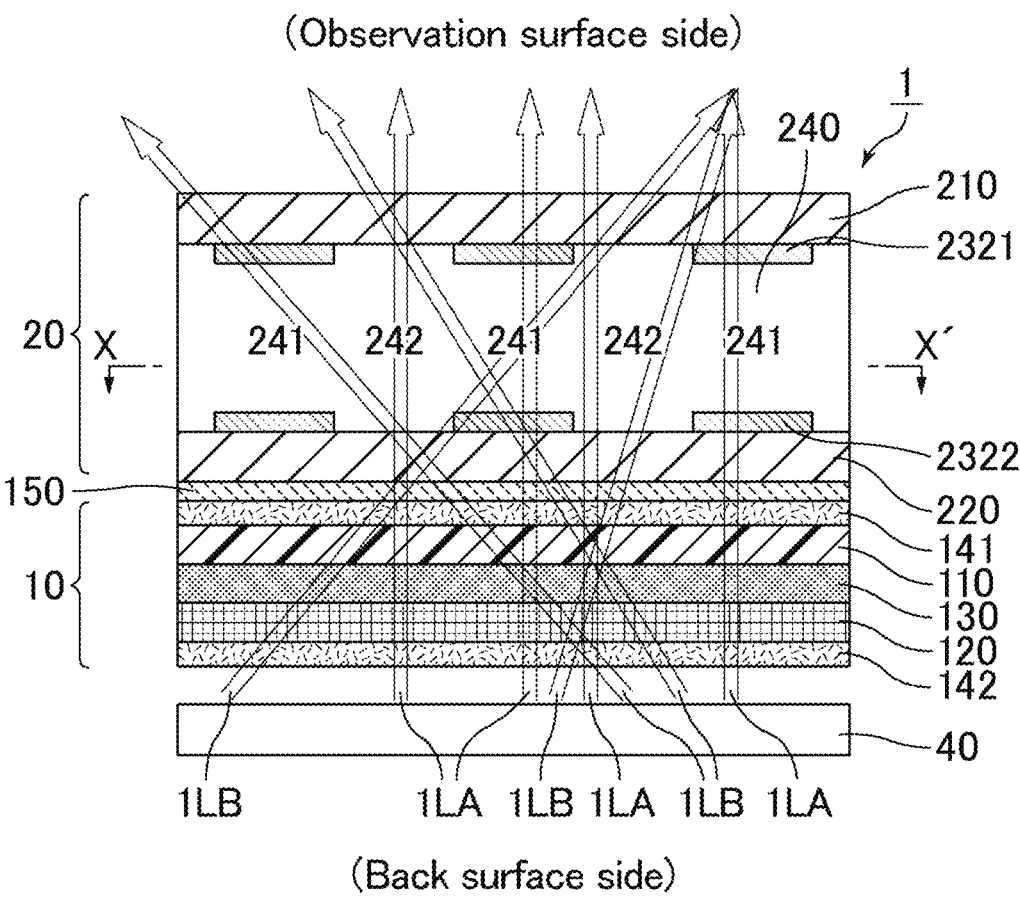
FIG. 20A is a schematic cross-sectional view illustrating the wide viewing angle mode of the video display device of Embodiment 7.
Figure 21A:
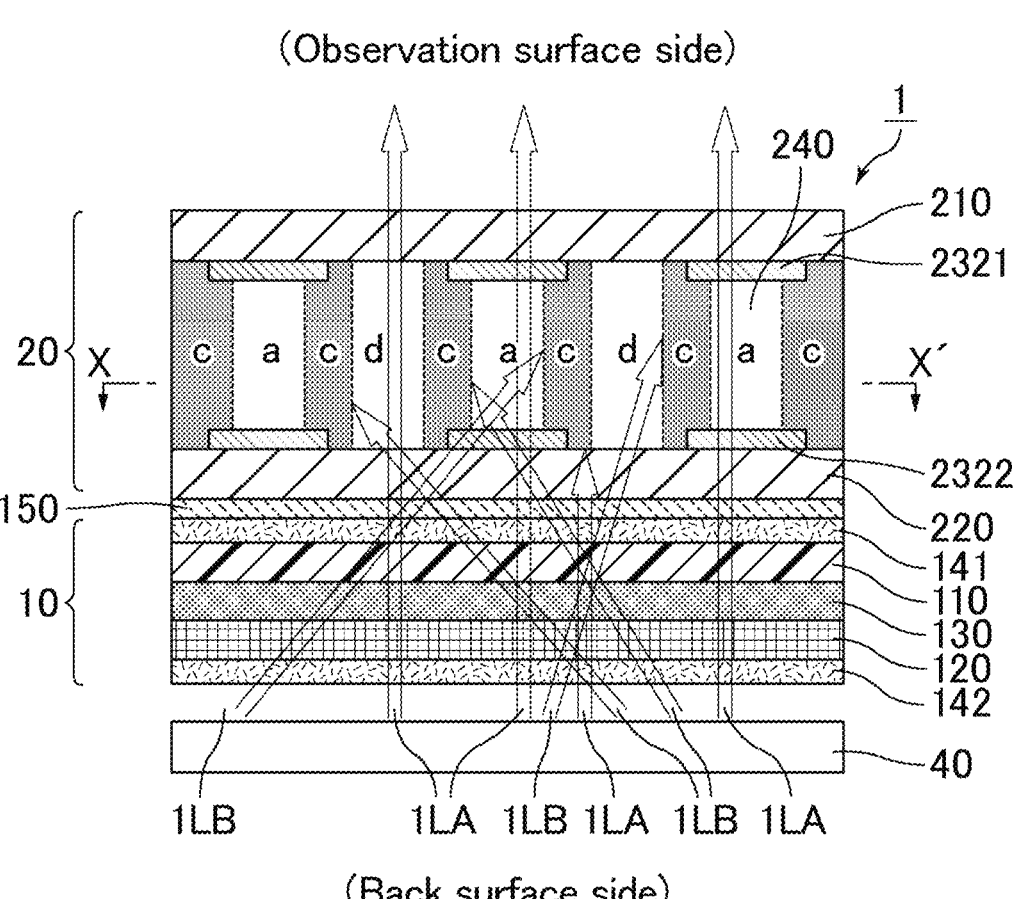
FIG. 21A is a schematic cross-sectional view illustrating the narrow viewing angle mode of the video display device of Embodiment 7.

FIG. 19 is a schematic cross-sectional view of a video display device of this embodiment. FIG. 20A is a schematic cross-sectional view illustrating the wide viewing angle mode of the video display device of this embodiment. FIG. 21A is a schematic cross-sectional view illustrating the narrow viewing angle mode of the video display device of this embodiment.

In this embodiment, the liquid crystal panel 20 includes the first transparent substrate 210, the first electrodes 2321, the liquid crystal layer 240, the second electrodes 2322, and the second transparent substrate 220 in order from the observation surface side to the back surface side as illustrated in FIG. 19. The liquid crystal panel 20 further includes the voltage application unit 264 which applies a voltage between the first electrodes 2321 and the second electrodes 2322. The polarizer 141 provided in the display panel 10 is arranged opposite to the liquid crystal panel 20 on the display panel 10 side (back surface side in this embodiment) of the liquid crystal panel 20.

The first electrodes 2321 are arranged in a stripe shape in plan view. The second electrodes 2322 are also arranged in a stripe shape in plan view. The first electrodes 2321 and the second electrodes 2322 are arranged substantially opposite to each other. In this embodiment, both the first electrodes 2321 and the second electrodes 2322 correspond to the electrodes A. Therefore, this embodiment also has a form in which the first electrodes 2321 correspond to the electrodes A and the second electrodes 2322 correspond to the electrode B or also has a form in which the second electrodes 2322 correspond to the electrodes A and the first electrodes 2321 correspond to the electrode B.

The electrodes A (first electrodes 2321 and second electrodes 2322 in this embodiment) are arranged in a stripe shape in plan view and the first electrodes 2321 and the second electrodes 2322 are arranged substantially opposite to each other, so that the liquid crystal layer 240 has the overlapping regions 241 overlapping the first electrodes 2321 and the second electrodes 2322 and the non-overlapping regions 242 not overlapping the first electrodes 2321 and the second electrodes 2322.

This embodiment is designed to switch the switching regions between the transmission state and the absorption state by applying or not applying a voltage between the first electrodes 2321 and the second electrodes 2322 (264). Boundary portions (corresponding to c in FIG. 21A) between the overlapping regions 241 and the non-overlapping regions 242 serve as the switching regions. Portions (corresponding to a in FIG. 21A) obtained by excluding the boundary portions c from the overlapping regions 241 and portions (corresponding to d in FIG. 21A) obtained by excluding the boundary portions c from the non-overlapping regions 242 serve as the transparent regions. The voltage application unit may be a power supply that can be turned on and off.

In this embodiment, the liquid crystal layer 240 has a certain degree of transmittance T1 in the wide viewing angle mode (see FIGS. 20A and 20B) as described later. The transparent regions a and d in FIG. 21A have transmittances T2 and T3, respectively, and the switching regions c in FIG. 21A have transmittance T4 due to the absorption in the narrow viewing angle mode (see FIGS. 21A and 21B). T1, T2, T3, and T4 satisfy the relationships of "$T1 \geq T2 > T4$" and "$T1 \geq T3 > T4$". The relative magnitudes of T2 and T3 are not limited.

The transmittance T1 may be 100%. The transmittance T4 may be 0%.

Figure 20B:
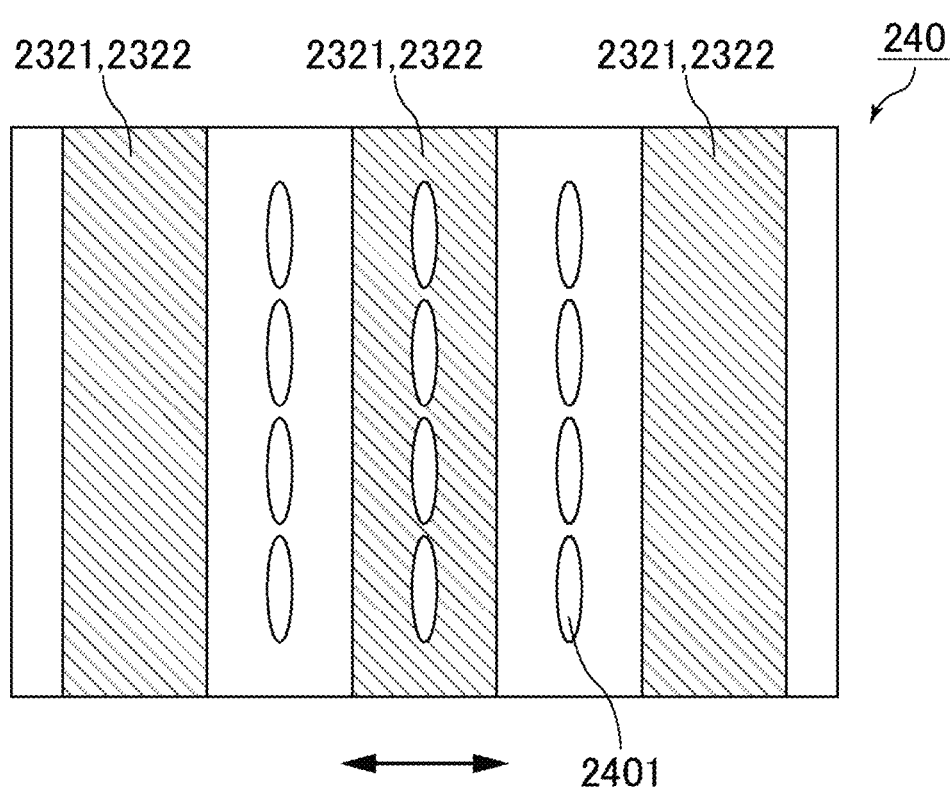
FIG. 20B is a view for explaining the alignment direction of the liquid crystal molecules 2401 in the wide viewing angle mode according to the video display device of Embodiment 7.
Figure 21B:
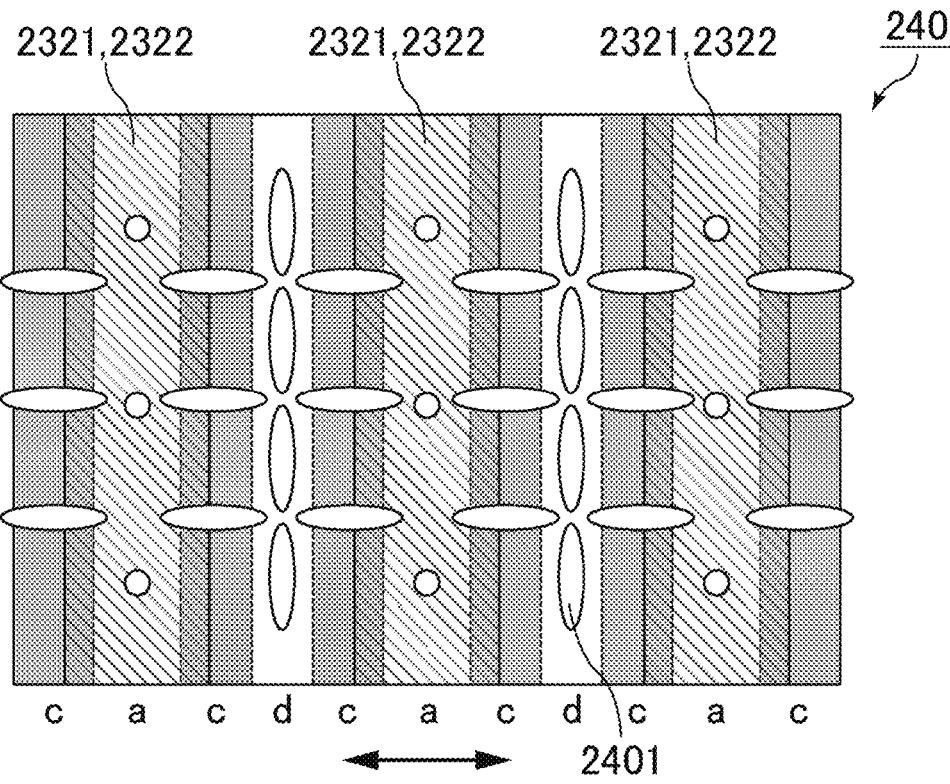
FIG. 21B is a view for explaining the alignment direction of the liquid crystal molecules 2401 in the narrow viewing angle mode according to the video display device of Embodiment 7.
Figure 21C:
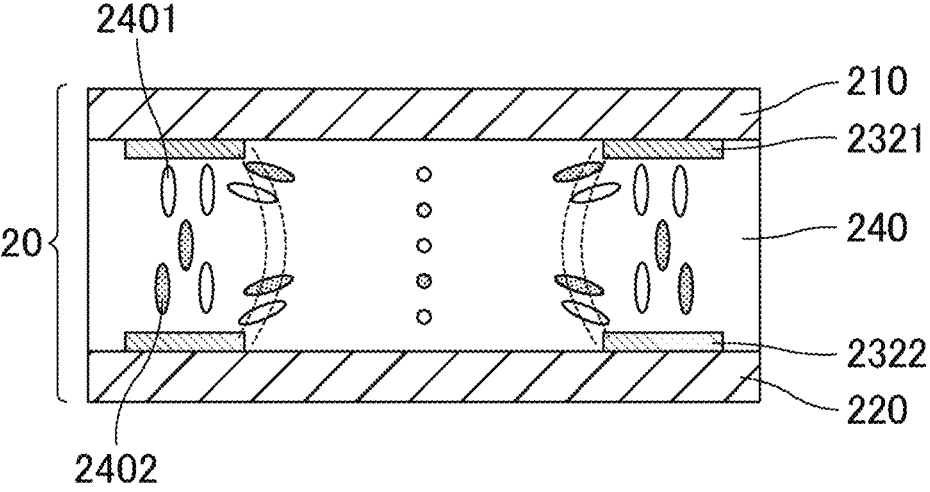
FIG. 21C is a view for explaining the alignment direction of the liquid crystal molecules 2401 in the narrow viewing angle mode according to the video display device of Embodiment 7.

FIG. 20B is a view for explaining the alignment direction (initial alignment direction) of the liquid crystal molecules 2401 in the wide viewing angle mode (FIG. 20A) of this embodiment. Specifically, FIG. 20B is a view (plan view) of a X-X' portion of the liquid crystal layer 240 in FIG. 20A viewed from the observation surface side. At the bottom of FIG. 20B, the transmission axis direction (plan view) of the polarizer 141 possessed by the display panel 10 is indicated by the arrow. FIGS. 21B and 21C are views for explaining the alignment direction of the liquid crystal molecules 2401 in the narrow viewing angle mode (FIG. 21A) of this embodiment. Specifically, FIG. 21B is a view (plan view) of a X-X' portion of the liquid crystal layer 240 in FIG. 21A viewed from the observation surface side. At the bottom of FIG. 21B, the transmission axis direction (plan view) of the polarizer 141 possessed by the display panel 10 is indicated by the arrow. FIG. 21C is a view (cross-sectional view) in which only the liquid crystal panel 20 is extracted from FIG. 21A and with which the alignment of the liquid crystal molecules 2401 is examined. The dotted lines in FIG. 21C indicate lines of electric force.

As illustrated in FIGS. 20A and 21A, light is incident on the liquid crystal panel 20 via the display panel 10 from the back surface side (specifically the backlight 40). In a state where no voltage is applied between the first electrodes 2321 and the second electrodes 2322 (264) (state where no voltage is applied), the polarization direction of the light incident on the liquid crystal layer 240 and the alignment direction of the liquid crystal molecules 2401 in the liquid crystal layer 240 are arranged in the substantially orthogonal arrangement (see FIG. 20B) in plan view, and therefore the incident light is not absorbed in the liquid crystal layer 240. More specifically, the liquid crystal layer 240 is integrated, and the entire liquid crystal layer 240 enters the transmission state (constitutes a transparent region) (see FIG. 20A). More specifically, the liquid crystal layer 240 enters a state of having the transmittance T1. In this case, omnidirectional light from the backlight 40 is transmitted through the liquid crystal panel 20 (see FIG. 20A). As a result, the light from the back surface side can be transmitted without loss from the low polar angle side to the high polar angle side, and therefore the wide viewing angle mode can be achieved with high luminance.

In a state where a voltage is applied between the first electrodes 2321 and the second electrodes 2322 (264) (state where a voltage is applied), the liquid crystal layer 240 itself acts as the louver. More specifically, the light 1LB in the oblique direction and part of the light 1LA in the front direction out of the light incident on the liquid crystal layer 240 from the backlight 40 are absorbed (attenuated) in the boundary portions (c regions in FIG. 21B) between the overlapping regions 241 and the non-overlapping regions 242 and are transmitted as the attenuated light through the liquid crystal panel 20 (see FIG. 21B).

Specifically, mainly in the regions (a regions in FIG. 21A) corresponding to the overlapping regions 241, longitudinal electric fields are generated between the first electrodes 2321 and the second electrodes 2322, and the liquid crystal molecules 2401 are aligned substantially vertically (front view) to the transmission axis of the polarizer 141 of the liquid panel 10 (see a regions in FIG. 21C), and therefore the incident light is transmitted without being absorbed. Mainly in the regions (d regions in FIG. 21A) corresponding to the non-overlapping regions 242, no voltage is applied, and therefore the regions are not affected by any electric field, and thus the liquid crystal molecules 2401 maintain the initial alignment (see d regions in FIG. 21C), and therefore the incident light is transmitted without being absorbed. In contrast thereto, the boundary portions (c regions in FIG. 21A) between the overlapping regions 241 and the non-overlapping regions 242, the liquid crystal molecules 2401 are aligned along the electric field lying out of the electrode width between the first electrodes 2321 and the second electrodes 2322 (see c regions in FIG. 21C). In this case, the polarization direction of the light incident through the polarizer 141 of the display panel 10 and the alignment direction of the 0065 liquid crystal molecules 2401 are matched with each other, and therefore the incident light is absorbed.

By switching the voltages as described above, the regions in the absorption state (switching regions) and the regions in the transmission state (transparent regions) can be formed. Specifically, the a and d regions in FIG. 21A remain in the transmission state, while the c regions in FIG. 21A enter the absorption state. More specifically, the liquid crystal layer 240 enters a state in which the transparent regions a and d in FIG. 21A have the transmittances T2 and T3, respectively, and the switching regions c in FIG. 21A have the transmittance T4 due to the absorption (T1≥T2>T4 and T1≥T3>T4). Further, the light 1LA in the front direction out of the light incident on the liquid crystal panel 20 from the backlight 40 is transmitted through the liquid crystal panel 20 without being attenuated (see FIG. 21A). As a result, the light from the backlight 40 is attenuated on the high polar angle side, and the light from the back surface side can be transmitted with the same luminance only on the low polar angle side, and therefore the narrow viewing angle mode can be achieved.

Embodiment 8

This embodiment mainly describes the features peculiar to this embodiment, and omits a description overlapping with the description in Embodiment 1 given above. This embodiment is substantially the same as Embodiment 1, except that the display panel 10 is a self-luminous display panel.

Figure 22:
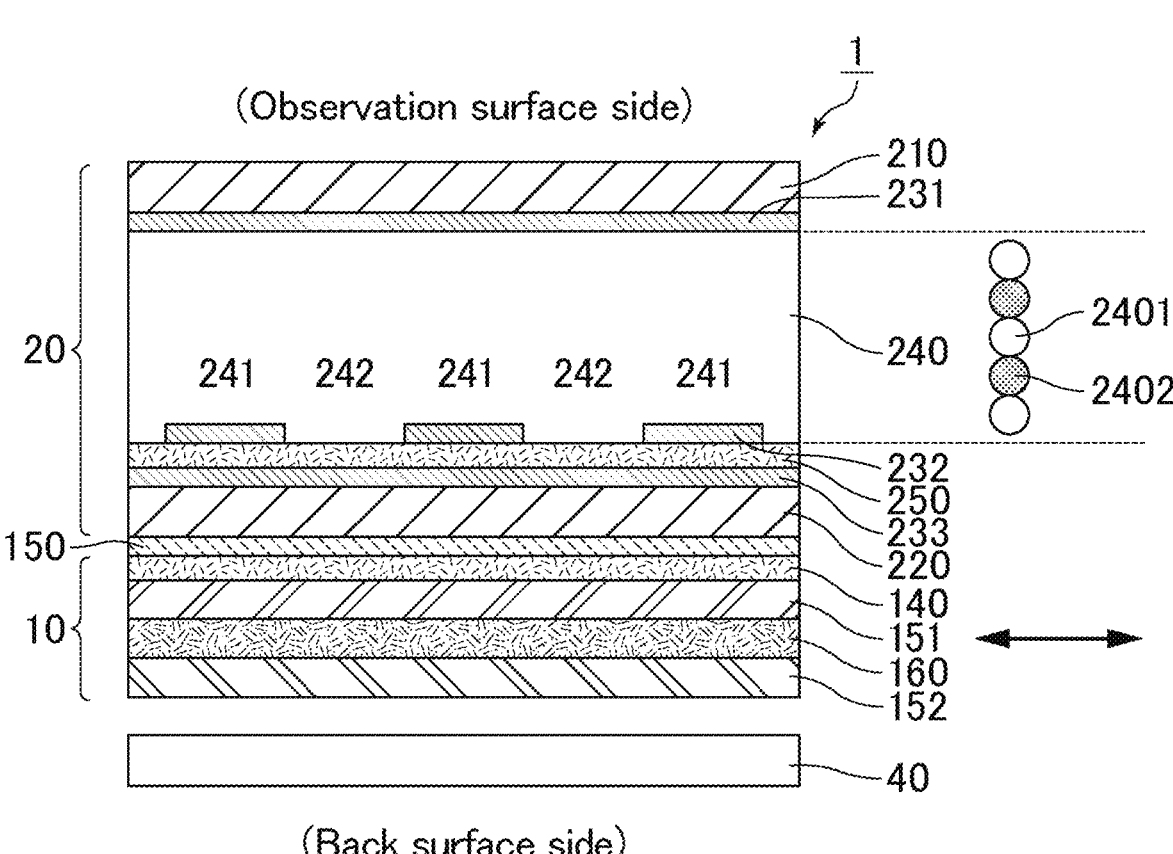
FIG. 22 is a schematic cross-sectional view of a video display device of Embodiment 8.

FIG. 22 is a schematic cross-sectional view of a video display device according to this embodiment. As illustrated in FIG. 22, the video display device 1 of this embodiment includes the liquid crystal panel 20 of this embodiment (voltage application unit is not illustrated), and a self-luminous display panel as the display panel 10 displaying images. Between the display panel 10 and the liquid crystal panel 20, the adhesive layer 150 for attaching the display panel 10 and the liquid crystal panel 20 together is provided. The video display device of this embodiment has the self-luminous display panel as the display panel 10, and therefore requires no backlight.

The display panel 10 (self-luminous display panel) has a structure in which a self-luminous layer is interposed between a pair of substrates in this embodiment (see FIG. 22), but is not limited to the structure insofar as it is a self-luminous display panel. For example, the display panel includes an organic electroluminescent (EL) display panel, a display panel containing minute LEDs on the micrometer (μm) scale as RGB elements, and the like. The present invention can control the viewing angle by the liquid crystal panel 20 regardless of the presence or absence of the backlight. Therefore, the liquid crystal panel 20 and the self-luminous display panel can be combined, which is very useful.

Although the embodiments of the present invention are described above, all of the individual matters described above are applicable to the entire present invention.

EXAMPLES

The present invention is described in more detail below with reference to Examples and Comparative Examples, but the present invention is not limited to only these examples. Image display devices of the examples described below were adaptive to common liquid crystal processes, did not cause a moire, and had excellent viewing angle performance and an excellent louver function. In addition, the video display devices were able to achieve the wide viewing angle mode with high luminance, and were able to reduce or prevent an increase in the thickness, weight, and manufacturing cost of each of the video display devices.

Example 1

A video display device of Example 1 corresponds to the video display device of Embodiment 1 described above (see FIGS. 1 to 4C). The size of the display panel 10 was set to 11 inches, the resolution was set to the FHD, and the pixel pitch (Pixel width in extension direction of gate lines×Pixel width in extension direction of source lines) was set to 42 μm×126 μm. Table 1 shows various design values of the liquid crystal panel 20.

In the examples described later, the same display panel and the same backlight as the display panel 10 and the backlight 40, respectively, of Example 1 were used unless otherwise specified. Various designs and structures of the liquid crystal panel 20 are the same as those of Example 1 unless otherwise specified.

TABLE 1

| | | Example 1 |
|---|---|---|
| Display panel 10 | Size | 11 inches |
| | Resolution | FHD |
| | Pixel pitch [μm] | 42 × 126 |
| Liquid crystal panel 20 | Viewing angle θ [°] | 33 |
| | Width W1 of non-overlapping region [μm] | 3 |
| | Width W2 of overlapping region [μm] | 3 |
| | Pitch of non-overlapping region [μm] | 6 |
| | Height of non-overlapping region [μm] | 10 |

Figure 23A:
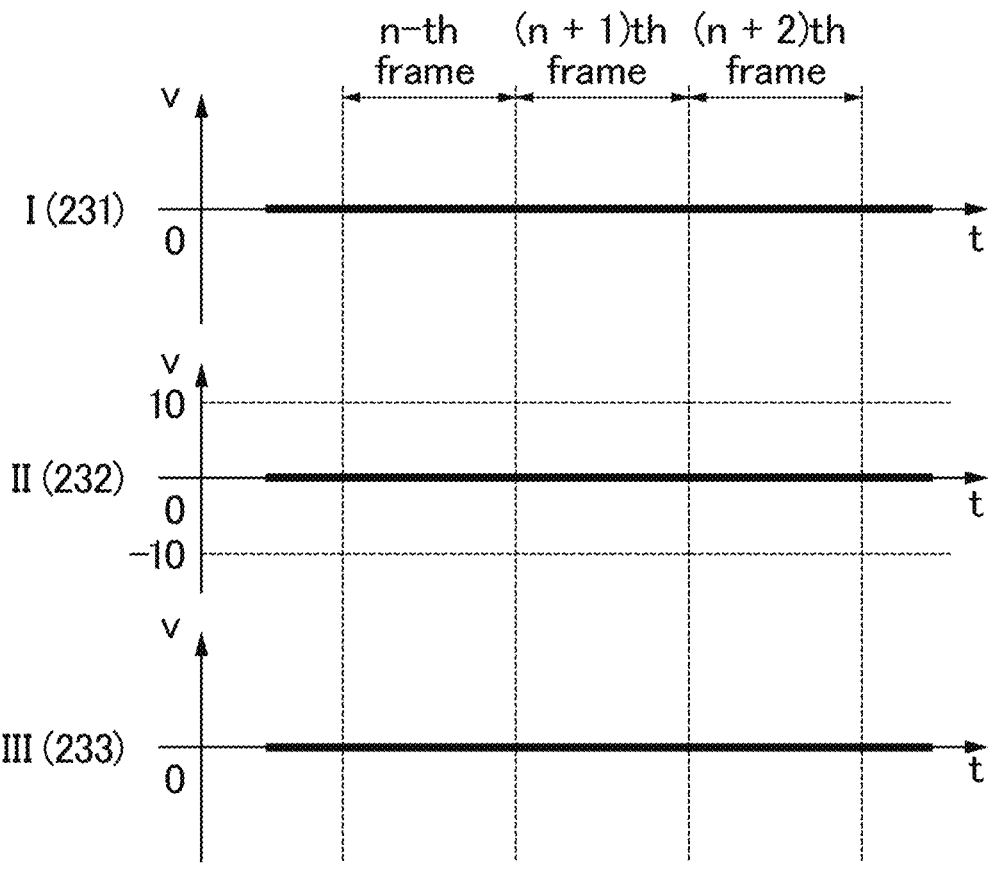
FIG. 23A illustrates waveform views of voltages of electrodes in the wide viewing angle mode in a video display device of Example 1.
Figure 23B:
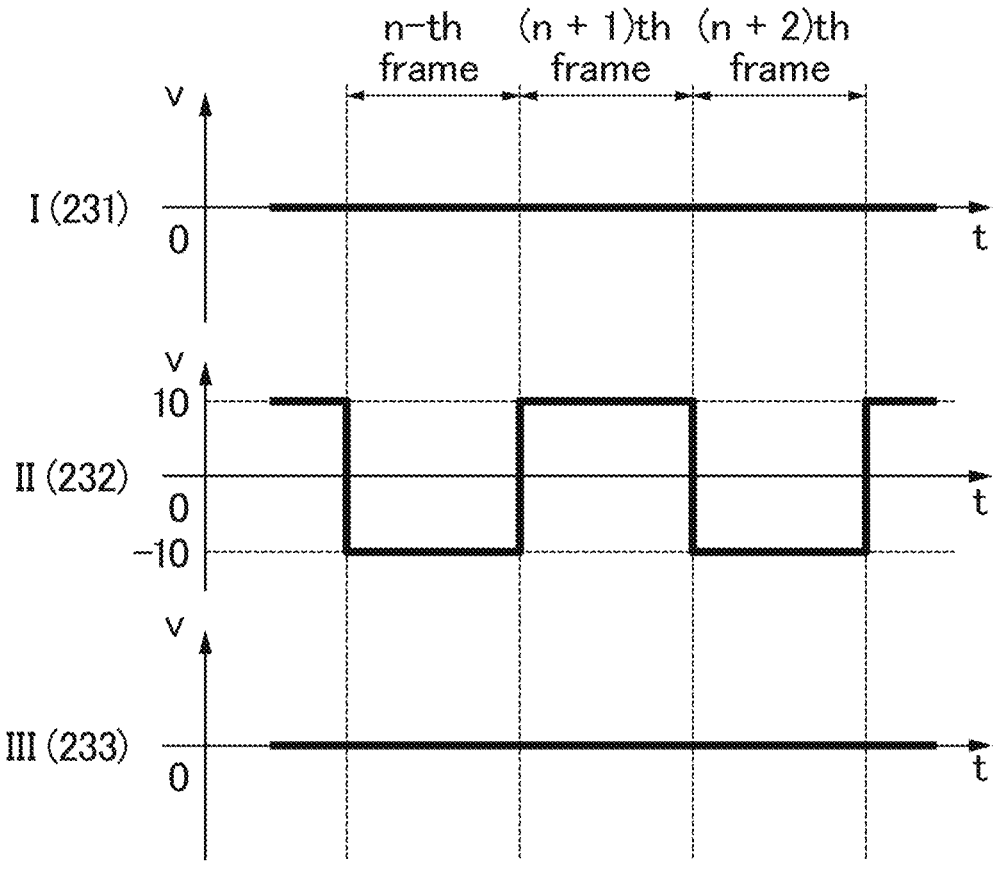
FIG. 23B illustrates waveform views of voltages of the electrodes in the narrow viewing angle mode in the video display device of Example 1.

FIG. 23A illustrates waveform views of voltages of electrodes in the wide viewing angle mode in the video display device of this example. FIG. 23B illustrates waveform views of voltages of electrodes in the narrow viewing angle mode in the video display device of this example. I (231) is the waveform view of the voltage of the first electrode 231. II (232) is the waveform view of the voltage of the second electrode 232. III (233) is the waveform view of the voltage of the third electrode 233. The horizontal axis represents time, and the vertical axis represents the voltage (V). The driving voltage is not limited to this voltage setting, and may be set as appropriate.

In this example, the first electrode 231 (I) functioned as a common electrode, the non-overlapping regions 242 were electrically controlled by the voltage application unit between the first electrode 231 (I) and the third electrode 233 (III), and the overlapping regions 241 were electrically controlled by the voltage application unit between the first electrode 231 (I) and the second electrodes 232 (II). In this example, the a and b regions in FIG. 4A serve as the transparent regions, and the c regions in FIG. 4A serve as the switching regions.

Example 2

A video display device of this example corresponds to the video display device of Embodiment 2 described above (see FIGS. 2B, and 7A to 9B). Example 2 is similar to Example 1 described above, except for using liquid crystal molecules in which the dielectric anisotropy (Δε) has a negative value as the liquid crystal molecules 2401.

Example 3

A video display device of this example corresponds to the video display device of Embodiment 3 described above (see FIGS. 2B, 2C, and 10). Example 3 is similar to Example 1 described above, except that the arrangement of the liquid crystal panel 20 and the display panel 10 is reversed to that of Example 1, and the transmission axis of the polarizer 142 provided on the liquid crystal panel 20 side in the display panel 10 is substantially vertical to the initial alignment direction of the liquid crystal molecules 2401 contained in the liquid crystal layer 240 of the liquid crystal panel 20 in plan view.

Example 4

A video display device of this example corresponds to the video display device of Embodiment 4 described above (see FIGS. 2B, 2C, and 11). Example 4 is similar to Example 1 described above, except that the liquid crystal panel 20 has a different layer structure (layer arrangement). The transmission axis of the polarizer 141 provided on the liquid crystal panel 20 side in the display panel 10 is substantially vertical to the initial alignment direction of the liquid crystal molecules 2401 contained in the liquid crystal layer 240 of the liquid crystal panel 20 in plan view.

Example 5

A video display device of this example corresponds to the video display device of Embodiment 5 described above (FIGS. 2B, 2C, and 13 to 15C). Example 5 is substantially the same as Example 1 described above, except that the liquid crystal panel 20 has a different layer structure (layer arrangement). In this example, the input voltages to the first electrode 231, the second electrode 2321, the third electrode 2322, and the fourth electrode 233 are set to 0 V, 10 V, 0 V, and 10 V, respectively (see FIG. 15C: In FIG. 15C, the input voltages to the second and fourth electrodes each are described as 5 V, but are set to 10 V in this example as described above.).

Figure 24A:
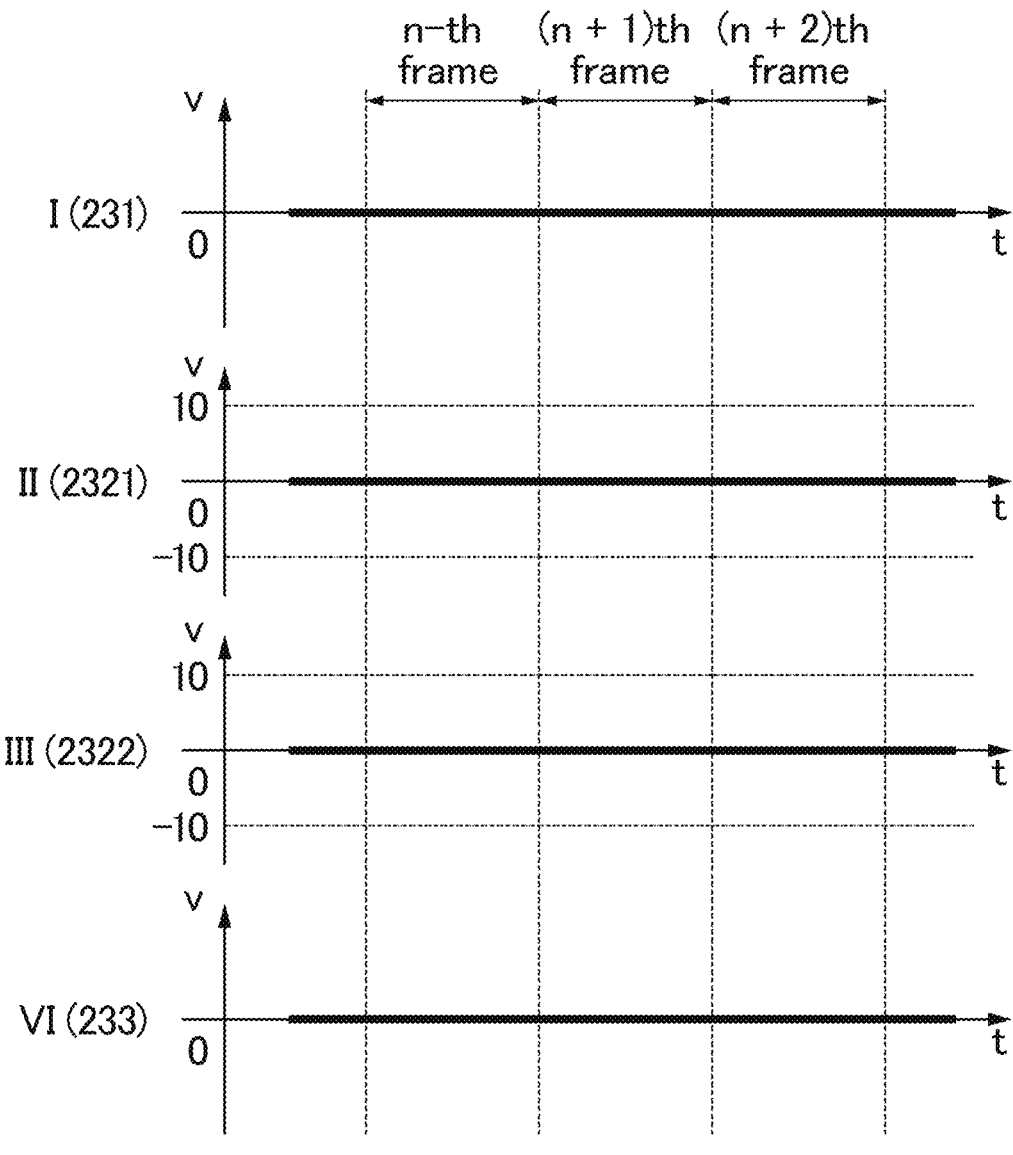
FIG. 24A illustrates waveform views of voltages of electrodes in the wide viewing angle mode in a video display device of Example 5.
Figure 24B:
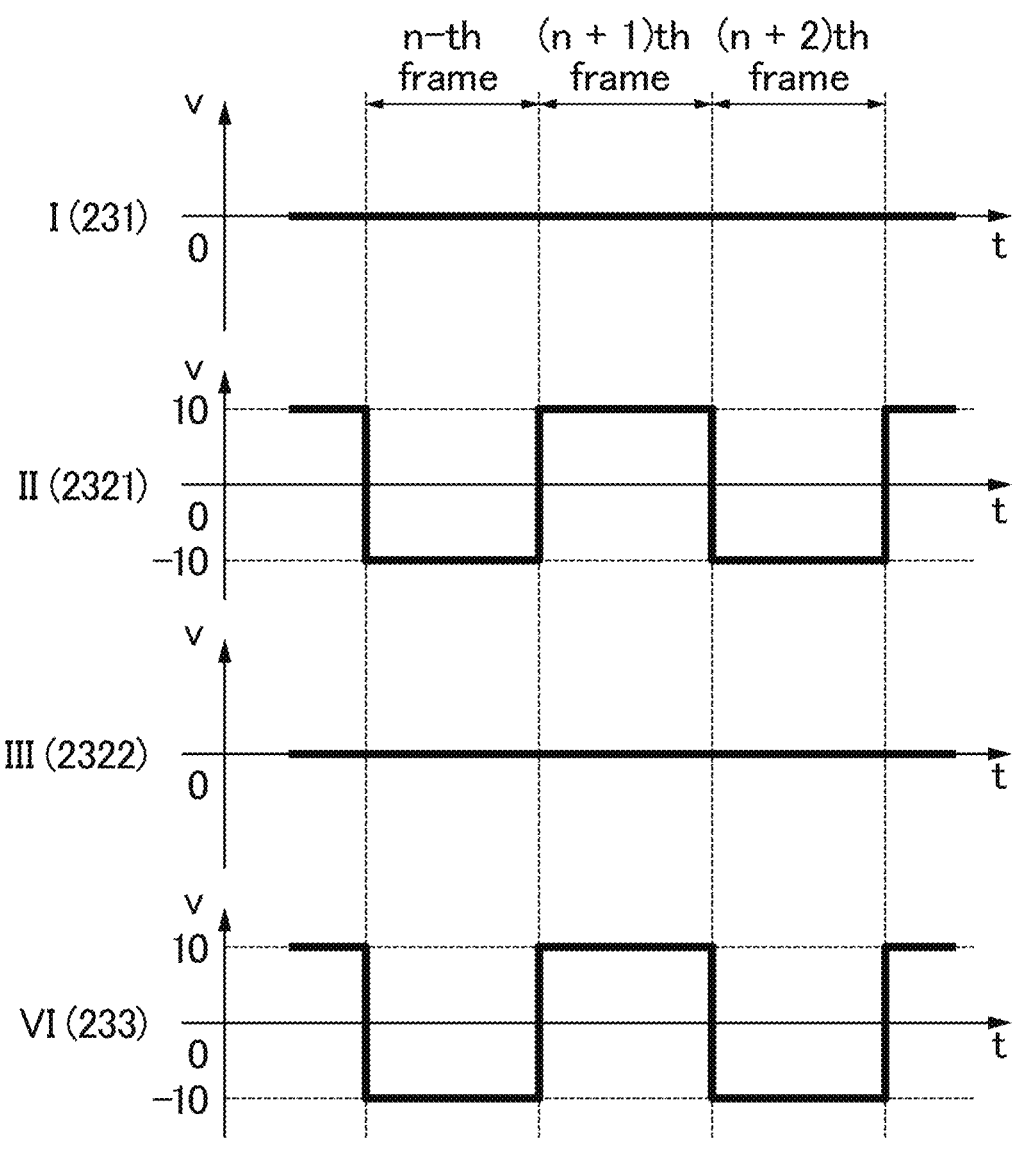
FIG. 24B illustrates waveform views of voltages of the electrodes in the narrow viewing angle mode in the video display device of Example 5.

FIG. 24A illustrates waveform views of voltages of electrodes in the wide viewing angle mode in the video display device of this example. FIG. 24B illustrates waveform views of voltages of electrodes in the narrow viewing angle mode in the video display device of this example. I (231) is the waveform view of the voltage of the first electrode 231. II (2321) is the waveform view of the voltage of the second electrode 2321. III (2322) is the waveform view of the voltage of the third electrode 2322. IV (233) is the waveform view of the voltage of the fourth electrode 233. The horizontal axis represents time, and the vertical axis represents the voltage (V). The driving voltage is not limited to this voltage setting, and may be set as appropriate.

In this example, the non-overlapping regions 242 were electrically controlled by the voltage application unit between the first electrode 231 (I) and the fourth electrode 233 (IV), and the overlapping regions 241 were electrically controlled by the voltage application unit between the second electrodes 2321 (II) and the third electrodes 2322 (III). In this example, the regions a and a' in FIG. 15A serve as the transparent regions, and the c regions in FIG. 15A serve as the switching regions.

Example 6

A video display device of this example corresponds to the video display device of Embodiment 6 described above (see FIGS. 2B, 2C, and 16 to 18B). Example 6 is substantially the same as Embodiment 1, except that the liquid crystal panel 20 has a different electrode structure.

Figure 25A:
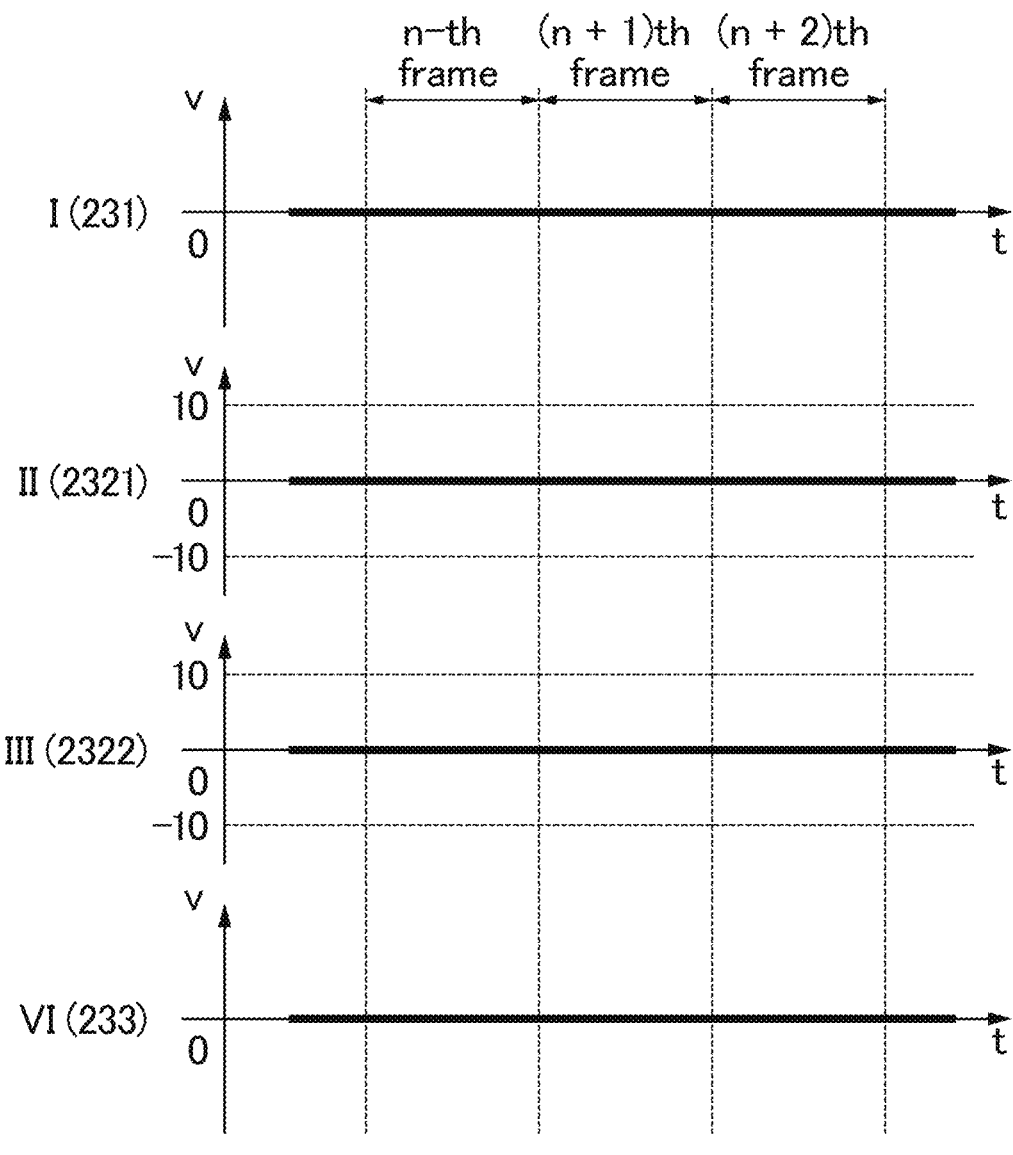
FIG. 25A illustrates waveform views of voltages of electrodes in the wide viewing angle mode in a video display device of Example 6.
Figure 25B:
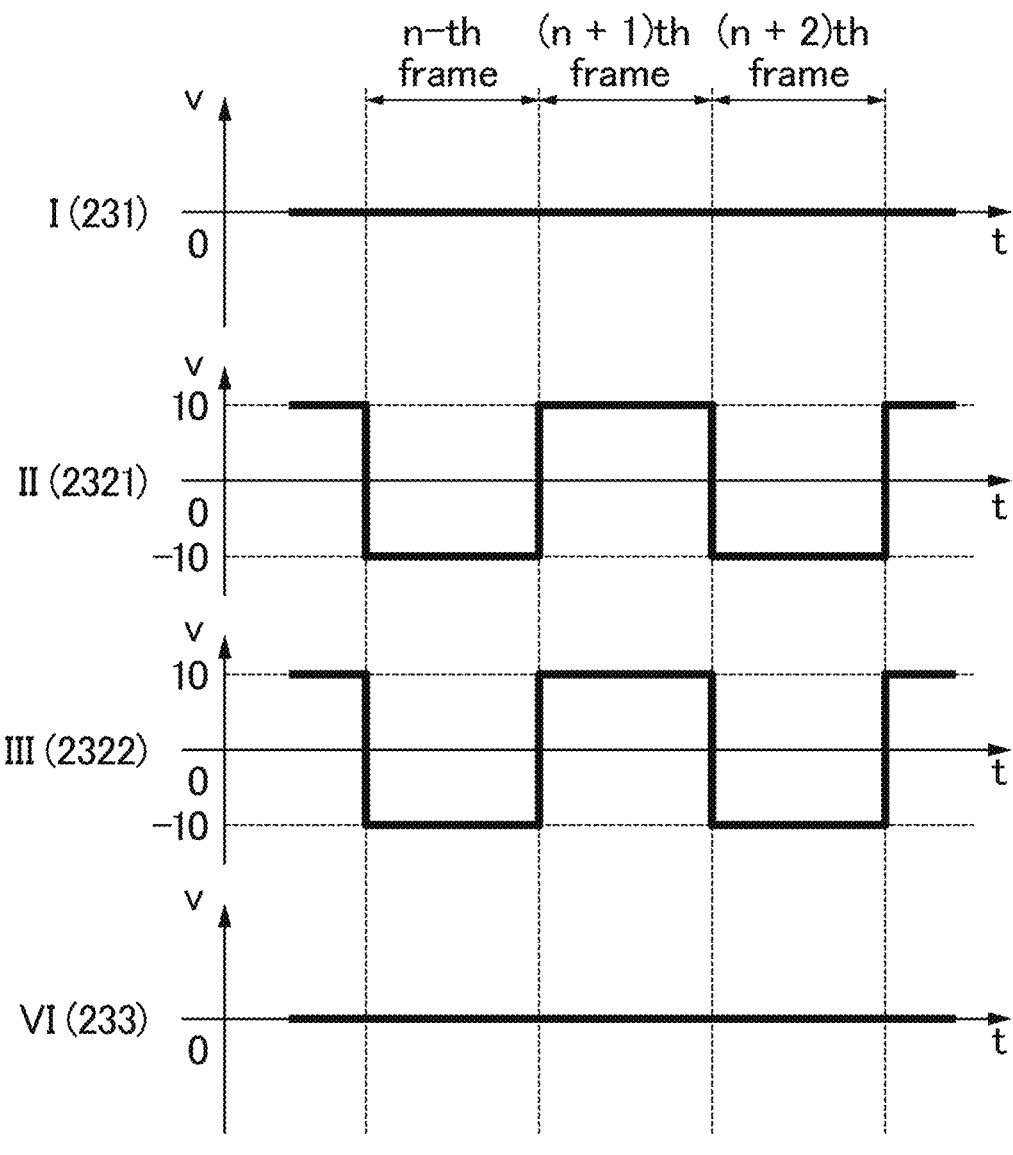
FIG. 25B illustrates waveform views of voltages of the electrodes in the narrow viewing angle mode in the video display device of Example 6.

FIG. 25A illustrates waveform views of voltages of electrodes in the wide viewing angle mode in the video display device of this example. FIG. 25B illustrates waveform views of voltages of electrodes in the narrow viewing angle mode in the video display device of this example. I (231) is the waveform view of the voltage of the first electrode 231. II (2321) is the waveform view of the voltage of the second electrode 2321. III (2322) is the waveform view of the voltage of the third electrode 2322. IV (233) is the waveform view of the voltage of the fourth electrode 233. The horizontal axis represents time, and the vertical axis represents the voltage (V). The driving voltage is not limited to this voltage setting, and may be set as appropriate.

In this example, the overlapping regions 241 were electrically controlled by the voltage application unit between the first electrode 231 (I) and the third electrodes 2322 (III) and the voltage application unit between the second electrodes 2321 (II) and the fourth electrode 233 (IV). In this example, the regions a and a'' in FIG. 18A serve as the transparent regions, and the c regions in FIG. 18A serve as the switching regions.

Example 7

A video display device of this example corresponds to the video display device of Embodiment 7 described above (see FIGS. 2B, 2C, and 19 to 21C). Example 7 is substantially the same as Embodiment 1, except that the liquid crystal panel 20 has a different electrode structure.

Figure 26A:
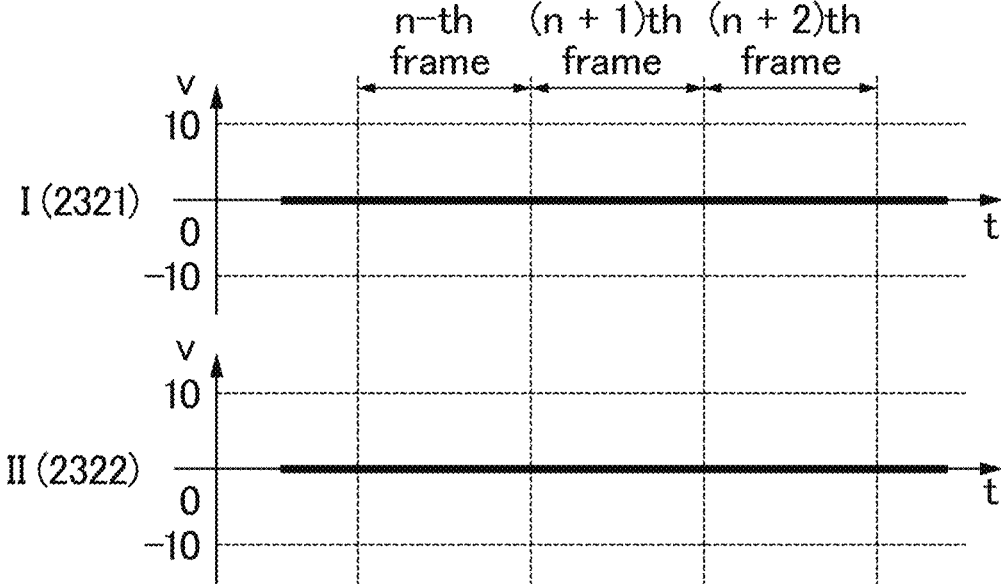
FIG. 26A illustrates waveform views of voltages of electrodes in the wide viewing angle mode in a video display device of Example 7.
Figure 26B:
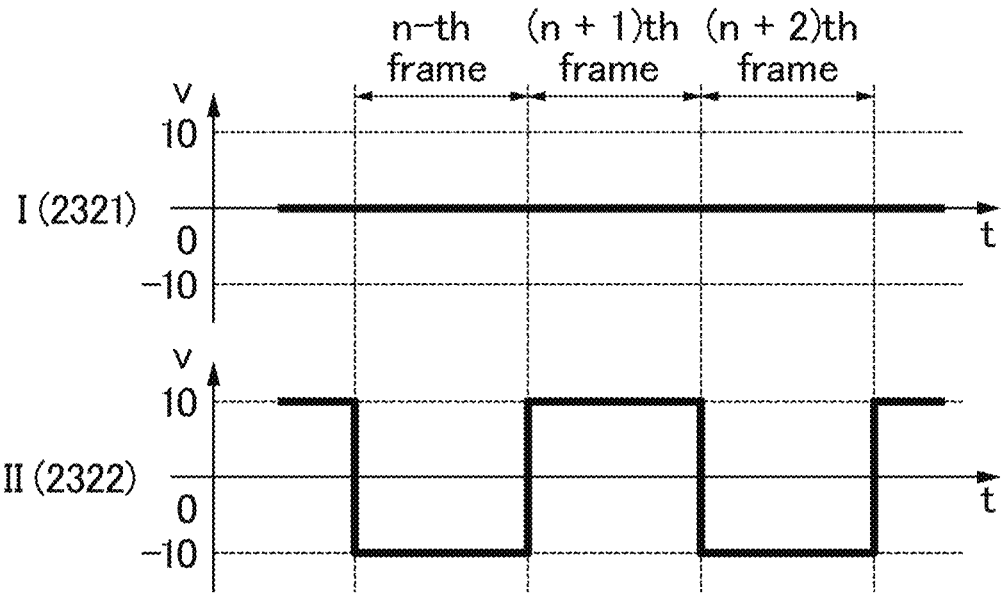
FIG. 26B illustrates waveform views of voltages of the electrodes in the narrow viewing angle mode in the video display device of Example 7.

FIG. 26A illustrates waveform views of voltages of electrodes in the wide viewing angle mode in the video display device of this example. FIG. 26B illustrates waveform views of voltages of electrodes in the narrow viewing angle mode in the video display device of this example. I (2321) is the waveform view of the voltage of the first electrode 2321. II (2322) is the waveform view of the voltage of the second electrode 2322. The horizontal axis represents time, and the vertical axis represents the voltage (V). The driving voltage is not limited to this voltage setting, and may be set as appropriate.

In this example, the overlapping regions 241 and the non-overlapping regions 242 were electrically controlled by the voltage application unit between the first electrodes 2321 (I) and the second electrodes 2322 (II). In this example, the regions a and d in FIG. 21A serve as the transparent regions, and the c regions in FIG. 21A serve as the switching regions.

Example 8

A video display device of this example corresponds to the video display device of Embodiment 8 described above (see FIGS. 2B, 2C, and 22). Even when the liquid crystal panel 20 and the self-luminous display panel are combined with each other, the video display device having excellent viewing angle performance was able to be achieved while an increase in the thickness, weight, and manufacturing cost was reduced or prevented.

The aspects of the present invention described above may be combined as appropriate without deviating from the gist of the present invention.

REFERENCE SIGNS LIST 1, 1R: video display device
1LA: light in front direction
1LB: light in oblique direction
10, 10R: display panel
20, 20R: liquid crystal panel
40: backlight
110: color filter (CF) substrate
120: thin-film transistor (TFT) substrate
130: liquid crystal layer
141, 142: polarizer
150: adhesive layer
210, 220: transparent substrate
231, 232, 2321, 2322, 233: electrode
240: liquid crystal layer
241, 2411, 2412: overlapping region
242: non-overlapping region 250, 251, 252: interlayer insulating film
261, 262, 263, 264, 265, 266: electrode application unit
2401: liquid crystal molecule
2402: dichroic dye

What is claimed is:

1. A video display device comprising:
   a display panel including a polarizer, and configured to display an image; and
   a liquid crystal panel, including:
      a first transparent substrate, a first electrode, a first interlayer insulating film, a second electrode, a liquid crystal layer, a third electrode, a second interlayer insulating film, a fourth electrode, and a second transparent substrate, arranged in this stated order,
      a set of electrodes A arranged at intervals in a plan view,
      an electrode B arranged opposite the set of electrodes A, wherein the set of electrodes A and the electrode B are arranged between the first and second transparent substrates, with the liquid crystal layer arranged between the set of electrodes A and the electrode B, and
      a first voltage application unit configured to apply a first voltage between the set of electrodes A and the electrode B, wherein one of the second electrode and the third electrode comprises the set of electrodes A, and the other one of the second electrode and the third electrode comprises the electrode B, and
      a second voltage application unit configured to apply a second voltage between the first electrode and the fourth electrode,
   wherein:
      the polarizer is arranged opposite the liquid crystal panel on a display panel side of the liquid crystal panel,
      the liquid crystal layer is a guest-host liquid crystal layer that contains a dichroic dye and liquid crystal molecules, and that includes overlapping regions that overlap the set of electrodes A, and non-overlapping regions that do not overlap the set of electrodes A, and
      a transmission axis of the polarizer is substantially vertical to an initial alignment direction of the liquid crystal molecules in the plan view.

2. The video display device according to claim 1, wherein the liquid crystal layer includes a transparent region, and a switching region that is switchable between a transmission state and an absorption state.

3. The video display device according to claim 2, wherein the transparent region and the switching region are formed of a same material.

4. The video display device according to claim 1, wherein the set of electrodes A is arranged in a stripe shape in the plan view.

5. The video display device according to claim 1, wherein the non-overlapping regions have a thickness of 30 μm or less.

6. The video display device according to claim 5, wherein the first electrode, the second electrode, and the third electrode are transparent electrodes.

7. The video display device according to claim 1, wherein the electrodes A and the electrode B are transparent electrodes.

8. The video display device according to claim 1, wherein the first electrode, the second electrode, the third electrode, and the fourth electrode are transparent electrodes.

9. The video display device according to claim 1, further comprising a backlight.

10. The video display device according to claim 9, wherein the backlight has a local dimming function.

11. A video display device comprising:

a display panel including a polarizer, and configured to display an image; and a liquid crystal panel, including:

a first transparent substrate, a first electrode, a first interlayer insulating film, a second electrode, a liquid crystal layer, a third electrode, a second interlayer insulating film, a fourth electrode, and a second transparent substrate, arranged in this stated order, a set of electrodes A arranged at intervals in a plan view, an electrode B arranged opposite the set of electrodes A, wherein the set of electrodes A and the electrode B are arranged between the first and second transparent substrates, with the liquid crystal layer arranged between the set of electrodes A and the electrode B, and a voltage application unit configured to apply a voltage between the set of electrodes A and the electrode B, wherein at least one of the second electrode or the third electrode comprises the set of electrodes A, and at least one of the first electrode or the fourth electrode comprises the electrode B, the voltage application unit comprising:

a first voltage application unit configured to apply a first voltage between the second electrode and the fourth electrode, and a second voltage application unit configured to apply a second voltage between the first electrode and third electrode, wherein:

the polarizer is arranged opposite the liquid crystal panel on a display panel side of the liquid crystal panel, the liquid crystal layer is a guest-host liquid crystal layer that contains a dichroic dye and liquid crystal molecules, and that includes overlapping regions overlapping the set of electrodes A, and non-overlapping regions that do not overlap the set of electrodes A, and a transmission axis of the polarizer is substantially vertical to an initial alignment direction of the liquid crystal molecules in the plan view.

12. The video display device according to claim 11, wherein the first electrode, the second electrode, the third electrode, and the fourth electrode are transparent electrodes.

13. The video display device according to claim 12, further comprising a backlight.

14. The video display device according to claim 11, wherein the liquid crystal layer includes a transparent region, and a switching region switchable between a transmission state and an absorption state.

15. The video display device according to claim 11, wherein the transparent region and the switching region are formed of a same material.

16. The video display device according to claim 11, wherein the electrodes A are arranged in a stripe shape in the plan view.

17. The video display device according to claim 11, wherein the non-overlapping regions have a thickness of 30 μm or less.

18. The video display device according to claim 17, wherein the first electrode, the second electrode, and the third electrode are transparent electrodes.

19. The video display device according to claim 11, wherein the electrodes A and the electrode B are transparent electrodes.

* * * * *